US010987621B1

(12) United States Patent
Lee et al.

(10) Patent No.: US 10,987,621 B1
(45) Date of Patent: Apr. 27, 2021

(54) SYSTEM AND METHOD FOR REMOVING HARMFUL GAS IN DISCHARGED CLEANING SOLUTION OF EXHAUST GAS TREATMENT APPARATUS

(71) Applicant: PANASIA CO., LTD, Busan (KR)

(72) Inventors: Soo-Tae Lee, Busan (KR); Su-Kyu Lee, Busan (KR); Keun-Jae Yook, Gyeongsangnam-do (KR); Seong-Jae Chin, Busan (KR); In-Hyeok Song, Busan (KR); Jae-Bong Sung, Busan (KR)

(73) Assignee: Panasia Co., Ltd., Busan (KR)

( * ) Notice: Subject to any disclaimer, the term of this patent is extended or adjusted under 35 U.S.C. 154(b) by 68 days.

(21) Appl. No.: 16/612,254

(22) PCT Filed: May 10, 2018

(86) PCT No.: PCT/KR2018/005393
§ 371 (c)(1),
(2) Date: Nov. 8, 2019

(87) PCT Pub. No.: WO2018/212506
PCT Pub. Date: Nov. 22, 2018

(30) Foreign Application Priority Data

May 18, 2017 (KR) ........................ 10-2017-0061746

(51) Int. Cl.
*B01D 53/14* (2006.01)
*B01D 53/78* (2006.01)
(Continued)

(52) U.S. Cl.
CPC ......... *B01D 53/1425* (2013.01); *B01D 47/06* (2013.01); *B01D 53/1406* (2013.01);
(Continued)

(58) Field of Classification Search
CPC .. B01D 53/1481; B01D 53/50; B01D 53/504; B01D 53/78; B01D 53/96;
(Continued)

(56) References Cited

U.S. PATENT DOCUMENTS 6,200,179 B1 * 3/2001 Widmann .............. B63H 21/32
440/89 B
9,272,241 B2 3/2016 Konigsson
(Continued)

FOREIGN PATENT DOCUMENTS

JP 2010-167330 A 8/2010
KR 10-2014-0073279 A 6/2004
(Continued)

OTHER PUBLICATIONS

International Search Report dated Sep. 7, 2018, issued in PCT Application No. PCT/KR2018/005393, filed May 10, 2018.
(Continued)

*Primary Examiner* — Timothy C Vanoy
(74) *Attorney, Agent, or Firm* — Workman Nydegger

(57) ABSTRACT

The present disclosure relates to a system and a method for removing noxious gas from cleaning liquid discharged from an exhaust gas treatment apparatus and, more particularly, to a system and a method for removing noxious gas from cleaning liquid discharged from an exhaust gas treatment apparatus, which are capable of adjusting the discharge rate of the cleaning liquid in a noxious gas removal unit, which removes noxious gas remaining in a gaseous state in the cleaning liquid discharged from the exhaust gas treatment apparatus and discharges the cleaning liquid from which the noxious gas in the gaseous state has been removed, on the basis of a result of measurement of the level of the cleaning liquid in the noxious gas removal unit.

25 Claims, 35 Drawing Sheets

(51) Int. Cl.
  *B01D 53/18*   (2006.01)
  *B01D 53/96*   (2006.01)
  *B01D 53/50*   (2006.01)
  *B01D 53/75*   (2006.01)
  *B01D 47/06*   (2006.01)
  *B01F 7/00*    (2006.01)
  *F01N 3/20*    (2006.01)

(52) U.S. Cl.
  CPC ..... *B01D 53/1412* (2013.01); *B01D 53/1481* (2013.01); *B01D 53/1493* (2013.01); *B01D 53/185* (2013.01); *B01D 53/501* (2013.01); *B01D 53/75* (2013.01); *B01D 53/78* (2013.01); *B01D 53/96* (2013.01); *B01F 7/0025* (2013.01); *F01N 3/208* (2013.01); *B01D 2252/1035* (2013.01); *F01N 2610/146* (2013.01); *F01N 2900/1812* (2013.01); *F01N 2900/1814* (2013.01)

(58) Field of Classification Search
  CPC .......... B01D 2221/08; B01D 2257/302; B01D 2258/012; B01J 4/008; B01J 2204/005; B01J 2219/00164; B01J 2219/00182; B01J 2219/00225; B01J 2219/00959; B01J 2219/00984; F01N 3/04; F01N 2390/00; F01N 2570/04; F01N 2590/02; F01N 2590/021; F01N 2900/18
  See application file for complete search history.

(56) References Cited

U.S. PATENT DOCUMENTS

| | | | |
|---|---|---|---|
| 10,898,866 B2* | 1/2021 | Bishop | B01F 15/0035 |
| 2015/0292379 A1* | 10/2015 | Molgaard | B01D 53/1406 60/274 |
| 2016/0317968 A1* | 11/2016 | Takahashi | B01D 53/30 |

FOREIGN PATENT DOCUMENTS

| | | |
|---|---|---|
| KR | 20-2009-0003314 A | 4/2009 |
| KR | 10-152175 A | 6/2015 |
| KR | 10-2015-0123263 A | 11/2015 |

OTHER PUBLICATIONS

Written Opinion dated Sep. 7, 2018, issued in PCT Application No. PCT/KR2018/005393, filed May 10, 2018.

* cited by examiner

SYSTEM AND METHOD FOR REMOVING HARMFUL GAS IN DISCHARGED CLEANING SOLUTION OF EXHAUST GAS TREATMENT APPARATUS

BACKGROUND OF THE INVENTION

1. Field of the Invention

The present disclosure relates to a system and a method for removing noxious gas from cleaning liquid discharged from an exhaust gas treatment apparatus and, more particularly, to a system and a method for removing noxious gas from cleaning liquid discharged from an exhaust gas treatment apparatus, which are capable of adjusting the discharge rate of the cleaning liquid from a noxious gas removal unit, which removes noxious gas remaining in a gaseous state in the cleaning liquid discharged from the exhaust gas treatment apparatus and discharges the cleaning liquid from which the noxious gas in the gaseous state has been removed, on the basis of a result of measurement of the level of the cleaning liquid in the noxious gas removal unit.

2. Description of the Prior Art

Most modern ships have engines and boilers to satisfy their own power and heating requirements. In order to drive the engine and the boiler, fuel must be burned, and exhaust gas generated during the combustion process contains harmful substances such as sulfur oxides (SOx), nitrogen oxides (NOx), particulate matter (PM), and the like.

Sulfur oxides and nitrogen oxides may act on the mucous membranes of the human body, thereby causing respiratory diseases, and are also pollutants designated as Class 1 carcinogens by the International Agency for Research on Cancer under the World Health Organization (WHO). In addition, if SOx or NOx is released untreated into the air, it reacts with moisture (H20) in the atmosphere to become sulfuric acid (H2SO4) and nitric acid (HNO3), respectively, which are major causes of acid rain.

PM is in the form of small particles, compared to gaseous pollutants. If PM in the exhaust gas is released into the air untreated, it may cause visibility problems of reducing the visible distance, or fine particles may enter the human body through the lungs or respiratory organs and cause various diseases. Fine dust, which has recently been a major issue in Korea, is also caused by PM, and PM may be regarded as a major cause of air pollution.

Therefore, it is necessary to prevent the emission of harmful substances in exhaust gas. In particular, in the case of ships having a huge engine capacity, it is known that an engine thereof emits 130 times as much exhaust gas as a passenger car. Thus, in order to prevent the emission of a huge amount of harmful matter, specific and practical measures for treating the exhaust gas from a ship are required.

Accordingly, the International Maritime Organization (hereinafter, referred to as "IMO") has designated Emission Control Areas (hereinafter, referred to as "ECAs") to limit the emission of harmful substances in the corresponding areas. In particular, the SOx Emission Control Areas (hereinafter, referred to as "SECAs") are more broadly regulated than ECAs, in which other harmful substances such as NOx are also regulated, meaning that tougher sanctions are applied.

Furthermore, as of Jan. 1, 2015, regulations were further tightened to limit the sulfur content of fuels that causes environmental pollution to 0.1% for all ships passing through SECAs (IMO 184(59)). SECAs were extended from the Baltic Sea and the North Sea to North America through the amendment of the Marine Pollution Prevention Convention in August 2011, and the coast of China was also designated as a SECA as of Apr. 1, 2016. Therefore, sulfur oxide management is expected to become more important in consideration of the extension of the SECAs as described above.

In addition, legislation to lower the SOx content of exhaust gas in oceans around the world, in addition to ECAs, from 3.5% to 0.5% was passed at the IMO General Assembly held on Oct. 28, 2016, and will come into effect in 2020. Thus, the need for sulfur oxide management is increasing, regardless of the region.

In order to comply with such international regulations, low-sulfur oil is used, LNG propulsion vessels, which use a natural gas with low sulfur oxide emissions, are used, or scrubbers for reducing sulfur oxides in the exhaust gas are also used.

If exhaust gas is treated using a scrubber, it is possible to prevent environmental pollution even when using a low-cost fuel having relatively high sulfur content while satisfying the above regulations, and it is thus economical. The scrubber ionizes SOx with cleaning liquid. In this case, if seawater of about pH 8.3 or fresh water containing alkaline additives is used as cleaning liquid, it is possible to neutralize the ionized sulfur oxides. In addition, the particulate matter may be aggregated and discharged together with the cleaning liquid, thereby preventing release thereof into the air.

Conventional scrubbers have insufficient measures to remove SOx, which is not dissolved in the cleaning liquid but remains in a gaseous state, when discharging the cleaning liquid, which is sprayed therein and used to neutralize the ionized sulfur oxides, to the outside. Accordingly, demand for technology for effectively removing the gaseous SOx, which is a noxious gas, from the cleaning liquid discharged from the scrubber while maintaining the level of the cleaning liquid at a predetermined level in the scrubber is increasing.

[Prior patent 1] U.S. Pat. No. 9,272,241 "COMBINED CLEANING SYSTEM AND METHOD FOR REDUCTION OF SOx AND Nox IN EXHAUST GASES FROM A COMBUSTION ENGINE"

SUMMARY OF THE INVENTION

The present disclosure has been made in order to solve the problems with the prior art described above, and an objective of the present disclosure is to provide a system and a method for removing noxious gas from cleaning liquid discharged from an exhaust gas treatment apparatus, which adjust the discharge rate of the cleaning liquid in a noxious gas removal unit on the basis of a result of measurement of the level of the cleaning liquid in the noxious gas removal unit, which removes noxious gas remaining in a gaseous state from the cleaning liquid discharged from the exhaust gas treatment apparatus and discharges the cleaning liquid from which the noxious gas in the gaseous state has been removed, thereby removing the noxious gas from the cleaning liquid discharged from the exhaust gas treatment apparatus.

Another objective of the present disclosure is to provide a system and a method for removing noxious gas from cleaning liquid discharged from an exhaust gas treatment apparatus, which adjust the discharge rate of the cleaning liquid in real time such that the cleaning liquid level in the noxious gas removal unit falls within a predetermined range, thereby maintaining the level of the cleaning liquid discharged from the exhaust gas treatment apparatus at an appropriate value.

Another objective of the present disclosure is to provide a system and a method for removing noxious gas from cleaning liquid discharged from an exhaust gas treatment apparatus, which enable the level of the cleaning liquid in the noxious gas removal unit to be precisely measured on the basis of the pressure in the noxious gas removal unit.

Another objective of the present disclosure is to provide a system and a method for removing noxious gas from cleaning liquid discharged from an exhaust gas treatment apparatus, which enable a determination as to whether or not the level of the cleaning liquid remaining in the exhaust gas treatment apparatus, which is to move to the noxious gas removal unit, reaches a predetermined threshold level.

Another objective of the present disclosure is to provide a system and a method for removing noxious gas from cleaning liquid discharged from an exhaust gas treatment apparatus, which enable appropriate countermeasures to be executed if the level of the cleaning liquid remaining in the exhaust gas treatment apparatus, which is to move to the noxious gas removal unit, reaches a predetermined threshold level.

Another objective of the present disclosure is to provide a system and a method for removing noxious gas from cleaning liquid discharged from an exhaust gas treatment apparatus, which are capable of efficiently removing noxious gas from the cleaning liquid discharged from an exhaust gas treatment apparatus using an exhaust gas treatment apparatus having improved space utilization and harmful-substance removal efficiency.

Another objective of the present disclosure is to provide a system and a method for removing noxious gas from cleaning liquid discharged from an exhaust gas treatment apparatus, which can be applied to a ship and can efficiently remove harmful substances including sulfur oxides (SOx) from the exhaust gas discharged from the engine, boiler, or the like of the ship.

The present disclosure may be implemented as embodiments having the following configuration in order to attain the above objectives.

According to an embodiment of the present disclosure, a system for removing noxious gas from cleaning liquid discharged from an exhaust gas treatment apparatus of the present disclosure may include: an exhaust gas treatment apparatus configured to receive exhaust gas generated by the combustion and flowing thereinto, remove noxious gas from the exhaust gas by spraying cleaning liquid to the exhaust gas, and discharge the sprayed cleaning liquid; a noxious gas removal unit connected to the exhaust gas treatment apparatus and configured to remove the noxious gas remaining in a gaseous state in the cleaning liquid discharged from the exhaust gas treatment apparatus and discharge the cleaning liquid from which the noxious gas in the gaseous state has been removed; a level measuring unit configured to measure the level of the cleaning liquid in the noxious gas removal unit; and a flow rate regulator configured to adjust the discharge rate of the cleaning liquid in the noxious gas removal unit on the basis of the result of measurement by the level measuring unit.

According to another embodiment of the present disclosure, the level measuring unit may measure the level of the cleaning liquid in the noxious gas removal unit on the basis of pressure in the noxious gas removal unit.

According to another embodiment of the present disclosure, the flow rate regulator may adjust the discharge rate of the cleaning liquid in real time such that the level of the cleaning liquid in the noxious gas removal unit falls within a predetermined range.

According to another embodiment of the present disclosure, the noxious gas removal unit may include a conduit having one end leading to a cleaning liquid outlet of the exhaust gas treatment apparatus and an opposite end connected to the flow rate regulator.

According to another embodiment of the present disclosure, the system for removing noxious gas from cleaning liquid discharged from an exhaust gas treatment apparatus of the present disclosure may further include a level determiner configured to determine whether or not the level of the cleaning liquid remaining in the exhaust gas treatment apparatus, which is to move to the noxious gas removal unit, reaches a predetermined threshold level.

According to another embodiment of the present disclosure, the system for removing noxious gas from cleaning liquid discharged from an exhaust gas treatment apparatus of the present disclosure may further include a countermeasure unit configured to, if the level of the cleaning liquid remaining in the exhaust gas treatment apparatus, which is to move to the noxious gas removal unit, reaches a predetermined threshold level as a result of a determination by the level determiner, perform at least one of generation of a danger warning and control so as to stop spraying of the cleaning liquid in the exhaust gas treatment apparatus.

According to another embodiment of the present disclosure, the level determiner may be disposed to lead to a cleaning liquid outlet of the exhaust gas treatment apparatus.

According to another embodiment of the present disclosure, the system for removing noxious gas from cleaning liquid discharged from an exhaust gas treatment apparatus may be installed in a ship.

According to another embodiment of the present disclosure, the noxious gas may be sulfur oxides (SOx), and the cleaning liquid may be seawater or fresh water containing alkaline additives.

According to another embodiment of the present disclosure, the exhaust gas treatment apparatus may include: a preprocessor configured to primarily reduce harmful substances in the exhaust gas produced by combustion; and a postprocessor configured to further remove harmful substances from preprocessed gas, which is the exhaust gas from which the harmful substances have been primarily reduced by the preprocessor, and connected to the noxious gas removal unit, and the preprocessor may include: a preprocessor housing having an exhaust gas inlet through which the exhaust gas is introduced and a preprocessed gas outlet through which the preprocessed gas, which is the exhaust gas from which the harmful substances have been primarily reduced by the preprocessor, is discharged and forming a flow path of the exhaust gas therein; an agitator configured to cause the exhaust gas in the flow path to flow in a curved pattern; a first preprocessor sprayer disposed between the exhaust gas inlet and the agitator and configured to spray cleaning liquid to the exhaust gas introduced through the exhaust gas inlet; and a second preprocessor sprayer disposed between the agitator and the preprocessed gas outlet and configured to spray cleaning liquid to the exhaust gas that flows in a curved pattern through the agitator in the flow path.

According to another embodiment of the present disclosure, the postprocessor may include: a postprocessor housing having a preprocessed gas inlet through which the preprocessed gas is introduced and a postprocessed gas outlet through which postprocessed gas from which harmful substances have been removed by the postprocessor is discharged and forming a flow path of the preprocessed gas therein; and a droplet blocker configured to block droplets that rise along an inner wall of the postprocessor housing and are discharged through the postprocessed gas outlet.

According to another embodiment of the present disclosure, the postprocessor may further include: a first postprocessor sprayer disposed in the flow path of the preprocessed gas below the drop blocker and configured to spray cleaning liquid to the preprocessed gas; and a second postprocessor sprayer disposed in the flow path of the preprocessed gas below the drop blocker and configured to spray cleaning liquid to the preprocessed gas and operate independently from the first postprocessor sprayer.

According to another embodiment of the present disclosure, the postprocessor may further include: a packing disposed under the first postprocessor sprayer and the second postprocessor sprayer in the postprocessor housing; and a packing support configured to support the packing at the bottom thereof and having a function of diffusing the preprocessed gas under the packing.

According to another embodiment of the present disclosure, the postprocessor may further include a diffuser disposed adjacent to the preprocessed gas inlet and configured to diffuse the preprocessed gas introduced through the preprocessed gas inlet.

According to another embodiment of the present disclosure, the exhaust gas treatment apparatus may include a diffuser, and the diffuser may include a gas diffuser having a shape that gets wider as it goes upwards so that the exhaust gas introduced through the gas inlet is widely dispersed in the housing to enable an efficient cleaning operation and to prevent pressure loss caused by the falling cleaning liquid and pressure loss by the diffuser itself.

According to another embodiment of the present disclosure, the exhaust gas treatment apparatus may further include a cleaning liquid sprayer above the diffuser, and the sprayer may include a lateral sprayer configured to spray cleaning liquid to the side, thereby improving work efficiency by increasing the contact area between the exhaust gas dispersed by the diffuser and the cleaning liquid and improving space utilization by reducing the height of the housing.

According to another embodiment of the present disclosure, the exhaust gas treatment apparatus may further include a distributor above the sprayer, and the distributor may be configured as a mesh structure including a plurality of small through-holes and may have an inclined portion of which the diameter increases as it goes upwards and a large inlet opening formed in the lower portion of the inclined portion so as to evenly distribute the flow of the exhaust gas deflected to the inner wall, thereby improving treatment efficiency.

According to another embodiment of the present disclosure, the exhaust gas treatment apparatus may include a multi-sprayer having a first sprayer, a second sprayer, and a third sprayer above the distributor, and the first sprayer, the second sprayer, and the third sprayer may be alternately arranged in the vertical direction to increase the contact area with the exhaust gas, and may selectively operate according to a load of an engine or a boiler, thereby enabling efficient operation.

According to another embodiment of the present disclosure, the exhaust gas treatment apparatus may include a droplet separator above the multi-sprayer, and the droplet separator may include a guide part through which exhaust gas enters at the center thereof and one or more blades formed at the upper portion of the guide part so as to induce a spiral flow of the exhaust gas exiting from the guide part.

According to another embodiment of the present disclosure, the exhaust gas treatment apparatus may include a droplet collector configured to collect the droplets separated by the droplet separator to prevent harmful substances from being discharged into the air.

According to another embodiment of the present disclosure, the exhaust gas treatment apparatus may include a droplet blocker configured to block droplets rising along the inclined surface of the housing above the droplet separator, and the droplet blocker may include a blocking wall extending downwards from one side of the inclined surface to effectively block droplets rising along the inner wall.

According to another embodiment of the present disclosure, a method for removing noxious gas from cleaning liquid discharged from an exhaust gas treatment apparatus may include: a level measuring step in which a level measuring unit measures a level of cleaning liquid in a noxious gas removal unit for removing noxious gas remaining in a gaseous state in cleaning liquid discharged from an exhaust gas treatment apparatus, which receives exhaust gas generated by combustion, removes the noxious gas from the exhaust gas by spraying the cleaning liquid to the exhaust gas, and discharges the sprayed cleaning liquid, and discharging the cleaning liquid from which the gaseous noxious gas has been removed; and a flow rate adjustment step in which a flow rate regulator adjusts a discharge rate of the cleaning liquid in the noxious gas removal unit on the basis of a result of measurement of the level measuring unit.

According to another embodiment of the present disclosure, the flow rate adjustment step may be performed in such a manner that the flow rate regulator adjusts the discharge rate of the cleaning liquid in real time such that the level of the cleaning liquid in the noxious gas removal unit falls within a predetermined range.

According to another embodiment of the present disclosure, the method for removing noxious gas from cleaning liquid discharged from an exhaust gas treatment apparatus may further include a level determining step in which the level determiner determines whether or not the level of the cleaning liquid remaining in the exhaust gas treatment apparatus, which is to move to the noxious gas removal unit, reaches a predetermined threshold level after or at the same time as the flow rate adjustment step.

According to another embodiment of the present disclosure, the method for removing noxious gas from cleaning liquid discharged from an exhaust gas treatment apparatus may further include a countermeasure step in which, if the level of the cleaning liquid remaining in the exhaust gas treatment apparatus, which is to move to the noxious gas removal unit, reaches a predetermined threshold level as a result of a determination by the level determiner, a countermeasure unit performs at least one of generation of a danger warning and control so as to stop spraying of the cleaning liquid in the exhaust gas treatment apparatus.

The present disclosure has the following effects through the above-described configuration.

The present disclosure has an effect of providing a system and a method for removing noxious gas from cleaning liquid discharged from an exhaust gas treatment apparatus, which adjust the discharge rate of the cleaning liquid in a noxious gas removal unit on the basis of a result of measurement of the level of the cleaning liquid in the noxious gas removal unit that removes noxious gas remaining in a gaseous state in the cleaning liquid discharged from the exhaust gas treatment apparatus and discharges the cleaning liquid from which the noxious gas in the gaseous state has been removed, thereby removing the noxious gas from the cleaning liquid discharged from the exhaust gas treatment apparatus.

The present disclosure has an effect of providing a system and a method for removing noxious gas from cleaning liquid discharged from an exhaust gas treatment apparatus, which adjust the discharge rate of the cleaning liquid in real time such that the cleaning liquid level in the noxious gas removal unit falls within a predetermined range, thereby maintaining the level of the cleaning liquid discharged from the exhaust gas treatment apparatus at an appropriate value.

The present disclosure has an effect of providing a system and a method for removing noxious gas from cleaning liquid discharged from an exhaust gas treatment apparatus, which enable the level of the cleaning liquid in the noxious gas removal unit to be precisely measured on the basis of the pressure in the noxious gas removal unit.

The present disclosure has an effect of providing a system and a method for removing noxious gas from cleaning liquid discharged from an exhaust gas treatment apparatus, which enable a determination as to whether or not the level of the cleaning liquid remaining in the exhaust gas treatment apparatus, which is to move to the noxious gas removal unit, reaches a predetermined threshold level.

The present disclosure has an effect of providing a system and a method for removing noxious gas from cleaning liquid discharged from an exhaust gas treatment apparatus, which enable appropriate countermeasures to be performed if the level of the cleaning liquid remaining in the exhaust gas treatment apparatus, which is to move to the noxious gas removal unit, reaches a predetermined threshold level.

The present disclosure has an effect of providing a system and a method for removing noxious gas from cleaning liquid discharged from an exhaust gas treatment apparatus, which are capable of efficiently removing noxious gas from the cleaning liquid discharged from an exhaust gas treatment apparatus using an exhaust gas treatment apparatus having improved space utilization and harmful-substance removal efficiency.

The present disclosure has an effect of providing a system and a method for removing noxious gas from cleaning liquid discharged from an exhaust gas treatment apparatus, which can be applied to a ship, and can efficiently remove harmful substances including sulfur oxides (SOx) from the exhaust gas discharged from the engine, boiler, or the like of the ship.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, a system and method for removing noxious gas from cleaning liquid discharged from an exhaust gas treatment apparatus according to the present disclosure will be described in detail with reference to the accompanying drawings. Unless otherwise defined, all terms in this specification are equivalent to the general meanings of the terms understood by those of ordinary skill in the art to which the present disclosure pertains, and if the terms conflict with the meanings of the terms used herein, they should be interpreted according to the definition used in the present specification. In addition, a detailed description of well-known functions and configurations that may unnecessarily obscure the subject matter of the present disclosure will be omitted.

In the present disclosure, "exhaust gas" refers to gas generated in the process of burning fuel to drive an engine, a boiler, or the like, and the harmful substances in the exhaust gas are sulfur oxides (SOx), nitrogen oxides (NOx), particulate matter (PM), and the like, which are contained in the exhaust gas. A system and a method for removing noxious gas from cleaning liquid discharged from an exhaust gas treatment apparatus according to the present disclosure are primarily intended to process the exhaust gas in a ship, but the application of the disclosure is not limited to ships.

Figure 1:
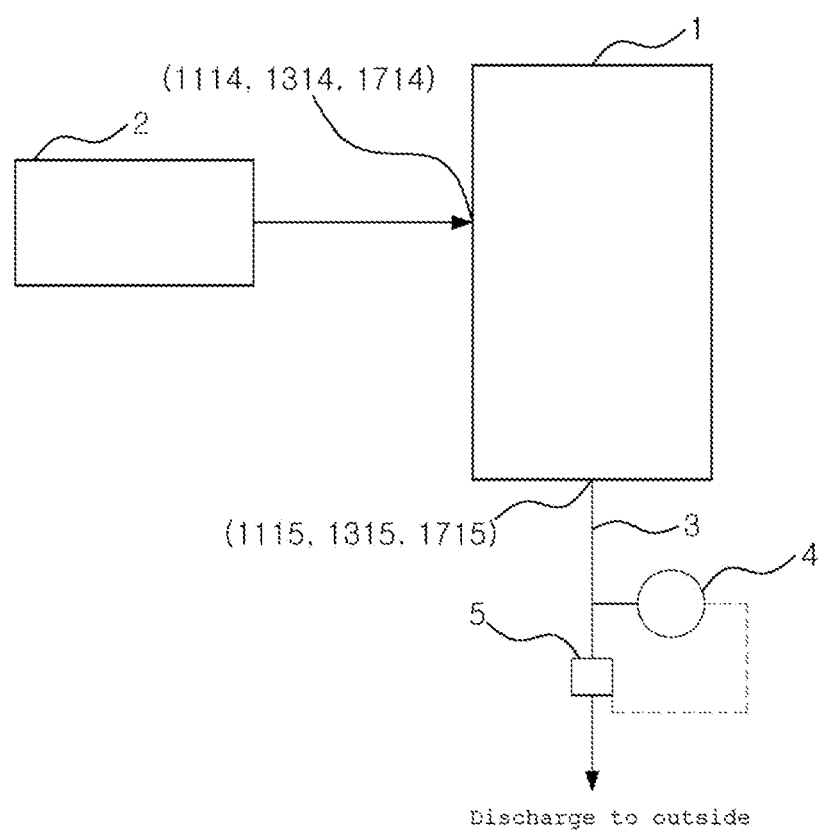
FIG. 1 is a diagram illustrating the configuration of a system for removing noxious gas from the cleaning liquid discharged from an exhaust gas treatment apparatus according to an embodiment of the present disclosure.

FIG. 1 is a diagram illustrating the configuration of a system for removing noxious gas from the cleaning liquid discharged from an exhaust gas treatment apparatus according to an embodiment of the present disclosure. Referring to the drawing, a system for removing noxious gas from the cleaning liquid discharged from an exhaust gas treatment apparatus of the present disclosure includes an exhaust gas treatment apparatus 1, a cleaning liquid supply unit 2, noxious gas removal unit 3, a level measuring unit 4, and a flow rate regulator 5.

The exhaust gas treatment apparatus 1 receives exhaust gas generated by combustion and introduced therein, sprays cleaning liquid to the exhaust gas to remove noxious gas from the exhaust gas, and discharges the sprayed cleaning liquid. The exhaust gas treatment apparatus 1 receives and sprays seawater or fresh water containing alkali additives as cleaning liquid to dissolve sulfur oxides (SOx) of the exhaust gas in the cleaning liquid, thereby removing and discharging the toxic substances. In the case where the present disclosure is applied to a ship, the noxious gas may be sulfur oxides (SOx), and the cleaning liquid may be seawater or fresh water containing alkaline additives.

The exhaust gas treatment apparatus 1 will be described below with reference to a first embodiment 1a and a second embodiment 1b. In the first embodiment 1a and the second embodiment 1b, the cleaning liquid is introduced through cleaning liquid inlets 1114, 1314, and 1714, and the cleaning liquid is discharged through cleaning liquid outlets 1115, 1315, and 1715.

The cleaning liquid supply unit 2 serves to supply the cleaning liquid to the exhaust gas treatment apparatus 1. As described above, the cleaning liquid supply unit 2 may supply seawater or fresh water containing alkaline additives as the cleaning liquid. In addition, the cleaning liquid supply unit 2 may operate in an open mode in which cleaning liquid is supplied by pumping seawater and is then discharged to the outside without recirculating the same or in a closed mode in which fresh water containing alkaline additives is supplied as the cleaning liquid and then the discharged cleaning liquid is recirculated for reuse.

The noxious gas removal unit 3 is connected to the exhaust gas treatment apparatus 1 and serves to remove noxious gas remaining in the gaseous state in the cleaning liquid discharged from the exhaust gas treatment apparatus and to discharge the cleaning liquid from which the noxious gas in the gaseous state has been removed. The noxious gases in the exhaust gas, such as sulfur oxides (SOx), are mostly dissolved in the cleaning liquid discharged from the exhaust gas treatment apparatus 1 in the state in which the toxicity is eliminated, but some noxious gas may remain in the gaseous state while being captured in the cleaning liquid. If such gaseous noxious gas is contained in the cleaning liquid and discharged to the outside, it may cause environmental pollution, and thus it needs to be removed. The noxious gas removal unit 3 allows the cleaning liquid to be discharged from the exhaust gas treatment apparatus 1 to the outside in the state in which the gaseous noxious gas contained in the cleaning liquid has been removed.

The noxious gas removal unit 3 may include a conduit having one end leading to a cleaning liquid outlet of the exhaust gas treatment apparatus and the opposite end connected with the flow rate regulator 5. The conduit serves as a reservoir capable of storing the cleaning liquid discharged from the exhaust gas treatment apparatus 1. The noxious gas removal unit 3 may further include a noxious gas discharge unit for collecting or discharging the noxious gas separated from the cleaning liquid in the reservoir. The discharge rate of the cleaning liquid in the noxious gas removal unit 3 is adjusted under the control of the flow rate regulator 5, which will be described later.

The level measuring unit 4 serves to measure the level of the cleaning liquid in the noxious gas removal unit 3. The cleaning liquid discharged from the exhaust gas treatment apparatus 1 stays in the noxious gas removal unit 3 for a predetermined period of time and the noxious gas remaining in the gaseous state in the cleaning liquid is removed therein. The level measuring unit 4 measures the level of the cleaning liquid (i.e., a water level) remaining in the noxious gas removal unit 3, thereby enabling operation conforming to the processing capacity of the noxious gas removal unit 3.

The level measuring unit 4 may measure the level of the cleaning liquid in the noxious gas removal unit 3 on the basis of the pressure in the noxious gas removal unit 3. In this case, the level measuring unit 4 may include a pressure sensor for detecting a change in the pressure according to the level change of the cleaning liquid inside the noxious gas removal unit 3 (i.e., a transducer), an amplifier for amplifying an electric signal transmitted from the transducer, and a connector for connecting the amplifier to the transducer.

The level measuring unit 4 may employ any of various measuring methods, such as a method using ultrasonic waves, in addition to the measuring method based on the pressure described above, and the detailed configuration thereof may vary according thereto. That is, the method in which the level measuring unit 4 measures the level of the cleaning liquid in the noxious gas removal unit 3 is not limited to any specific method.

The flow rate regulator 5 may regulate the discharge rate of the cleaning liquid in the noxious gas removal unit 3 on the basis of the result of measurement of the level measuring unit 4. The flow rate regulator 5 may include a controller connected to the level measuring unit 4 by circuits or by wired/wireless communication and adjustment means for adjusting the discharge rate of noxious gas removal unit 3 under the control of the controller. A throttle valve may be applied as the regulation means.

The flow rate regulator 5 preferably adjusts the discharge rate of the cleaning liquid in real time such that the level of the cleaning liquid in the noxious gas removal unit falls within a predetermined range. Accordingly, it is possible to maintain the level of the cleaning liquid remaining in the noxious gas removal unit 3 at a level suitable for removal of the noxious gas.

Figure 2:
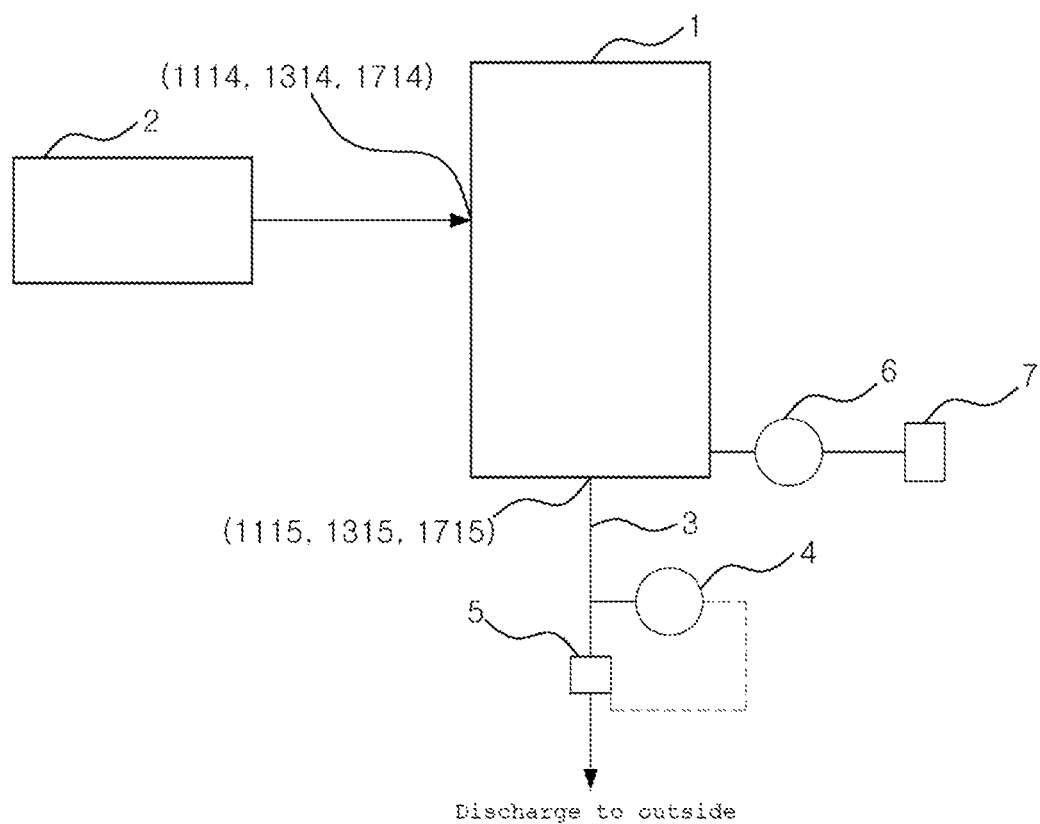
FIG. 2 is a diagram illustrating the configuration of a system for removing noxious gas from the cleaning liquid discharged from an exhaust gas treatment apparatus according to another embodiment of the present disclosure.

FIG. 2 is a diagram illustrating the configuration of a system for removing noxious gas from the cleaning liquid discharged from an exhaust gas treatment apparatus according to another embodiment of the present disclosure. Compared to the system shown in FIG. 1, the system for removing noxious gas according to the present embodiment further includes a level determiner 6 and a countermeasure unit 7, in addition to the exhaust gas treatment apparatus 1, the cleaning liquid supply unit 2, the noxious gas removal unit 3, the level measuring unit 4, and the flow rate regulator 5. The elements other than the level determiner 6 and the countermeasure unit 7 have been described above, and thus the level determiner 6 and the countermeasure unit 7 will be described below.

The level determiner 6 may determine whether or not the level of the cleaning liquid remaining in the exhaust gas treatment apparatus 1, which is to move to the noxious gas removal unit 3, reaches a predetermined threshold level. The level determiner 6 may include a level switch that is provided at a position at which it is possible to measure the level of the cleaning liquid in the exhaust gas treatment apparatus 1, and if the cleaning liquid level reaches a specific level, gives notification thereof.

The noxious gas removal unit 3 is designed in consideration of the capacity of the cleaning liquid discharged from the exhaust gas treatment apparatus 1. Therefore, in general, the level of the cleaning liquid in the exhaust gas treatment apparatus 1 is also maintained at an appropriate level by regulating the discharge rate of the cleaning liquid in the noxious gas removal unit 3. However, if the cleaning liquid is not appropriately discharged through the noxious gas removal unit 3 due to the malfunction of at least one of the noxious gas removal unit 3, the level measuring unit 4, and the flow rate regulator 5, and if the level of the cleaning liquid exceeds a threshold level in the exhaust gas treatment apparatus 1 according thereto, the durability or performance of the exhaust gas treatment apparatus 1 may deteriorate. The level determiner 6 is intended to prevent this problem.

As a result of a determination by the level determiner 6, if the level of the cleaning liquid remaining in the exhaust gas treatment apparatus 1, which is to move to the noxious gas removal unit 3, reaches a predetermined threshold level, the countermeasure unit 7 may perform at least one of generation of a danger warning and control so as to stop spraying of the cleaning liquid in the exhaust gas treatment apparatus 1. The countermeasure unit 7 may include a controller that is connected to the level determiner 6 through circuits or wired/wireless communication and generates a warning or controls the exhaust gas treatment apparatus or the like.

The countermeasure unit 7 may generate the danger warning through visible and audible means, and may stop the overall operation of the exhaust gas treatment apparatus 1 in order to stop the spray of cleaning liquid in the exhaust gas treatment apparatus 1. The above operation of the countermeasure unit 7 may prevent deterioration of durability or failure of the exhaust gas treatment apparatus 1 due to backflow of the cleaning liquid.

Meanwhile, hereinafter, a first embodiment 1*a* and a second embodiment 1*b* will be described as specific embodiments of the exhaust gas treatment apparatus 1, which can be applied to a system for removing noxious gas from the cleaning liquid discharged from an exhaust gas treatment apparatus of the present disclosure.

Figure 3:
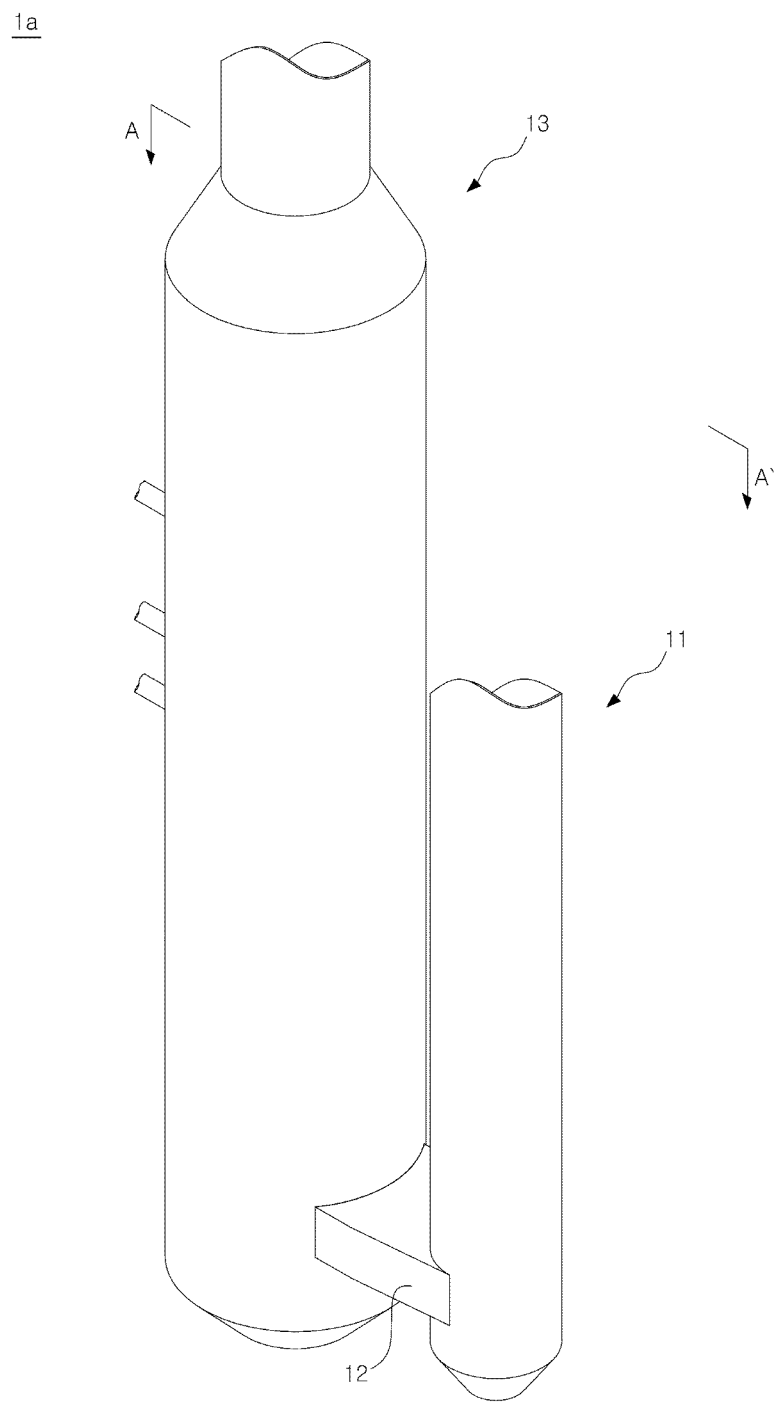
FIG. 3 is a perspective view of an exhaust gas treatment apparatus according to a first embodiment.
Figure 4:
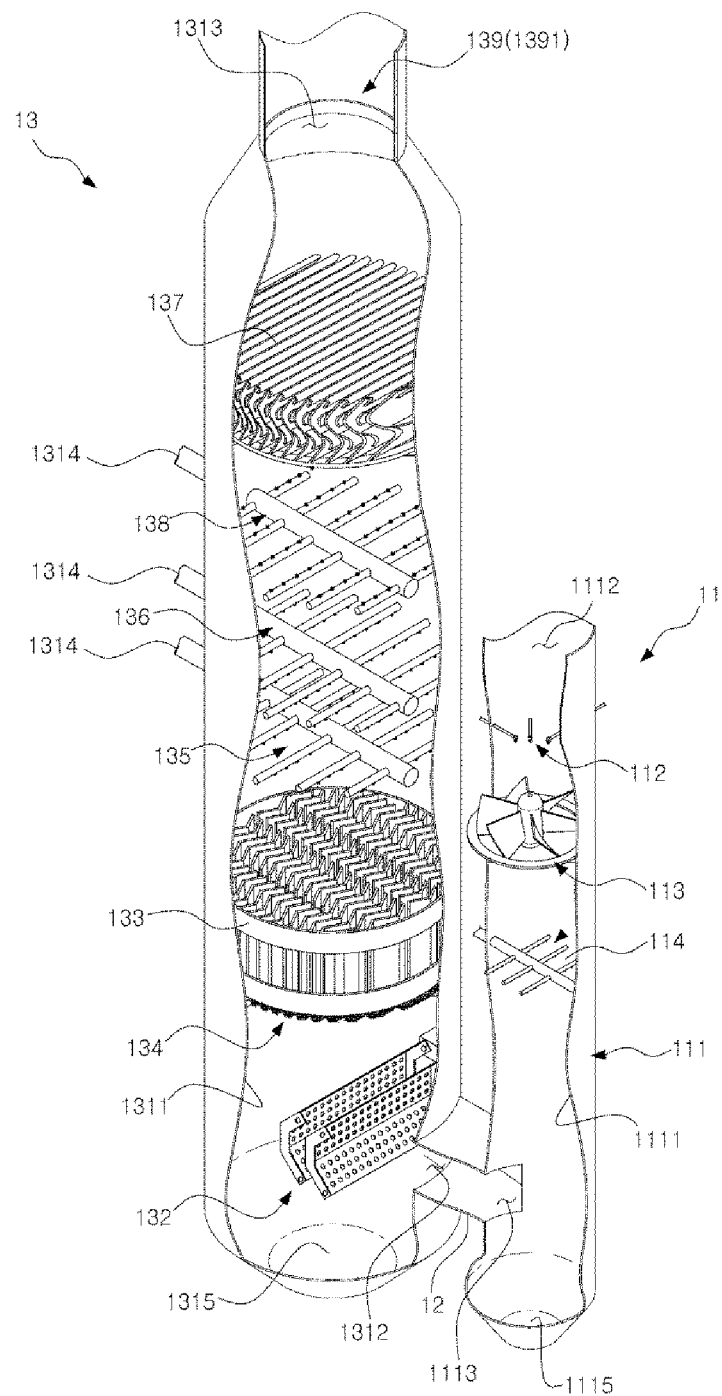
FIG. 4 is a cutaway perspective view of an exhaust gas treatment apparatus according to a first embodiment.
Figure 5:
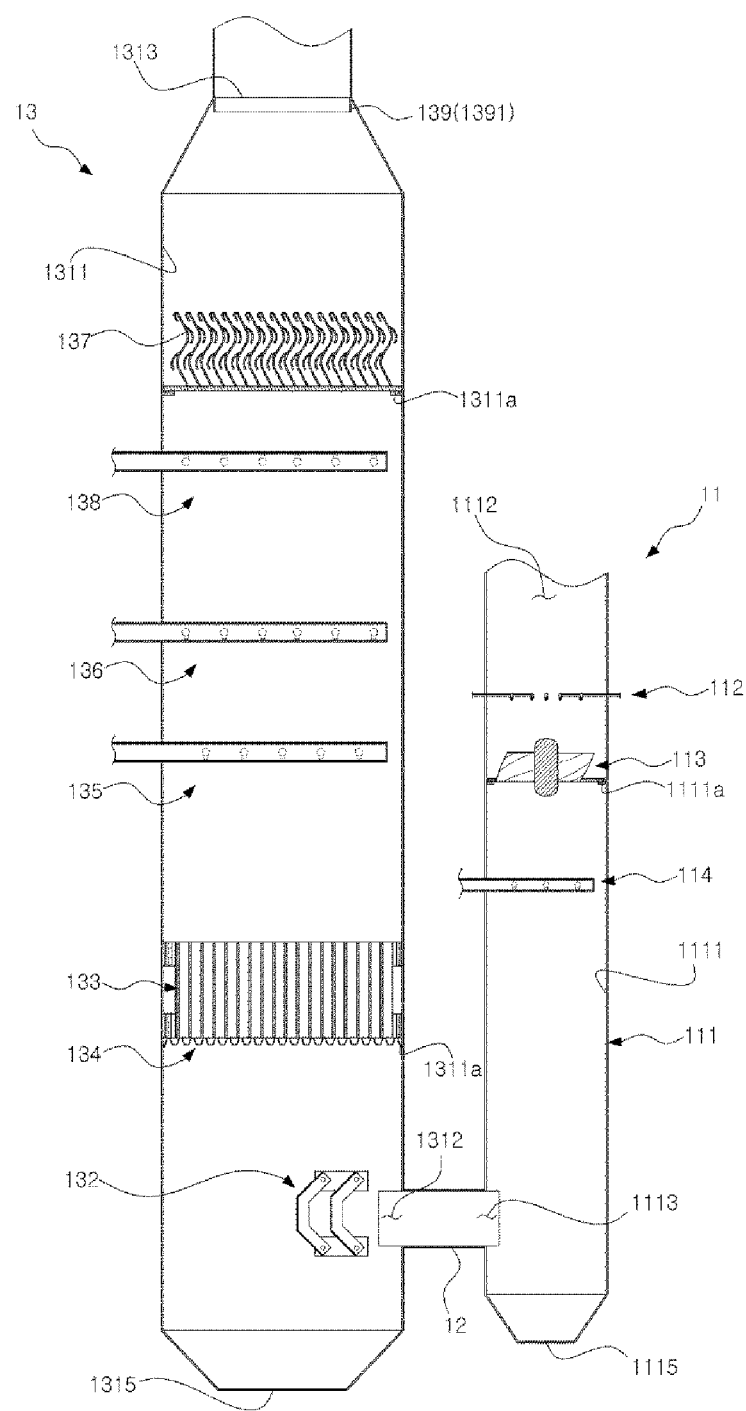
FIG. 5 is a cross-sectional view taken along the line A-A' in FIG. 1.

Referring to FIGS. 3 to 5, the exhaust gas treatment apparatus 1a according to a first embodiment includes a preprocessor 11, a connection part 12, and a postprocessor 13.

Figure 6:
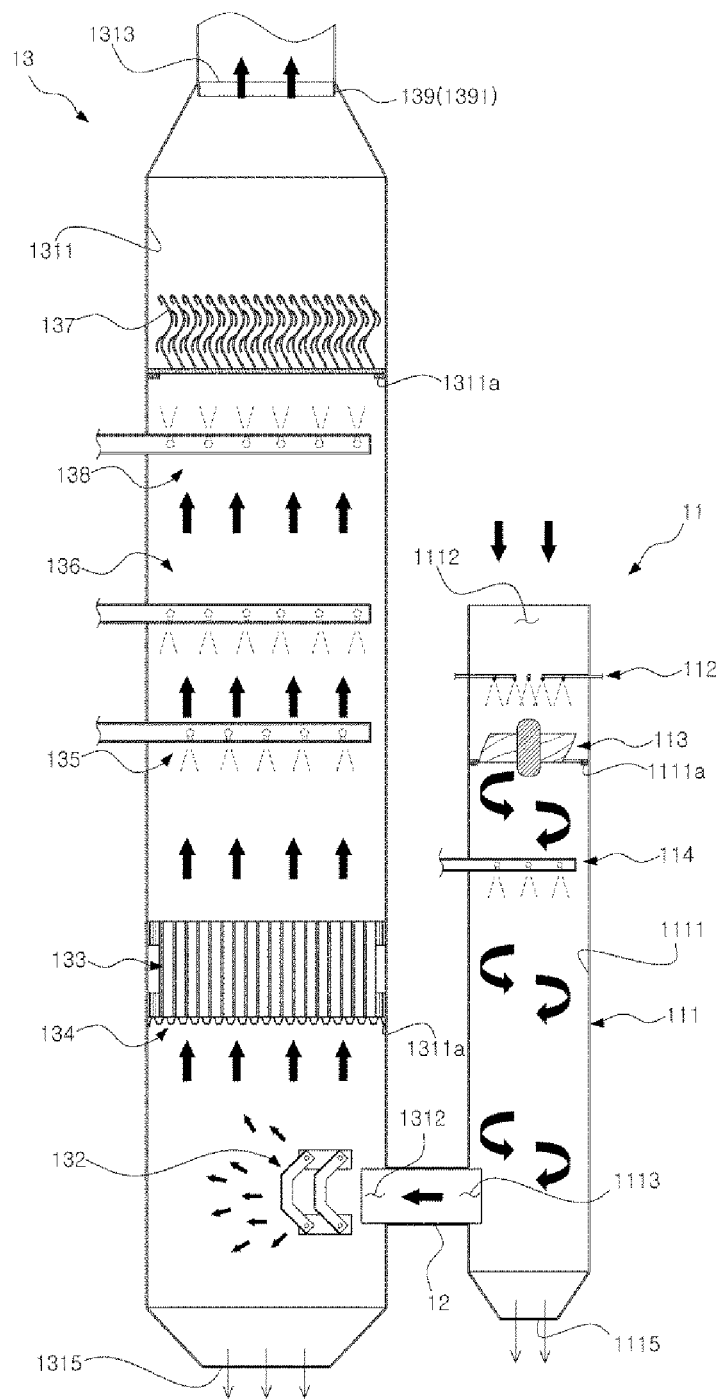
FIG. 6 is a reference diagram illustrating a process of processing an exhaust gas in the cross-section view in FIG. 5.

A procedure of processing the exhaust gas performed by the exhaust gas treatment apparatus 1a will be briefly described with reference to FIG. 6. In FIG. 6, the thick arrow indicates the flow of gas, the dotted line indicates the cleaning liquid to be sprayed, and the thin arrow indicates the cleaning liquid to be discharged.

If exhaust gas generated by combustion is introduced through an exhaust gas inlet 1112, the preprocessor 11 processes the exhaust gas into preprocessed gas from which the harmful substances are primarily reduced and discharges the same through a preprocessed gas outlet 1113. The connection part 12 moves the preprocessed gas to the postprocessor 13. The postprocessor 13 further removes harmful substances from the preprocessed gas introduced through a preprocessed gas inlet 1312 and discharges the same through a postprocessed gas outlet 1313.

The cleaning liquid introduced through a cleaning liquid inlet 1114 of the preprocessor 11 and used in the removal of harmful substances from the exhaust gas in the preprocessor 11 and the cleaning liquid introduced through a cleaning liquid inlet 1314 of the postprocessor 13 and used in the removal of harmful substances from the preprocessed gas in the postprocessor 13 are discharged through cleaning liquid outlets 1115 and 1315, respectively, which are formed in the bottoms of the preprocessor 11 and the postprocessor 13.

In the case where the present disclosure is applied to a ship, seawater or fresh water mixed with alkaline additives may be used as the cleaning liquid, and the exhaust gas may be generated during combustion in an engine or a boiler of the ship. In addition, the harmful substances may be sulfur oxides (SOx) and PM.

The preprocessor 11 serves to primarily reduce harmful substances in the exhaust gas generated by combustion. As can be seen in FIGS. 4 to 7, the preprocessor 11 includes a preprocessor housing 111, a first preprocessor sprayer 112, an agitator 113, and a second preprocessor sprayer 114.

The preprocessor housing 111 forms the external shape of the preprocessor 11 and forms a flow path of the exhaust gas therein. The preprocessor housing 111 includes an inner wall 1111, an exhaust gas inlet 1112, a preprocessed gas outlet 1113, a cleaning liquid inlet 1114, and a cleaning liquid outlet 1115. Referring to FIGS. 3 to 7, in an embodiment of the present disclosure, the preprocessor housing 111 is formed as a cylindrical tower and provides a flow path through which the introduced exhaust gas flows from the top of the preprocessor housing 111 to the bottom thereof, thereby primarily removing harmful substances from the exhaust gas.

The inner wall 1111 is a portion that forms a flow path of the exhaust gas inside the preprocessor housing 111. Referring to FIG. 4, in an embodiment of the present disclosure, the inner wall 1111 forms a cylindrical flow path of the exhaust gas inside the preprocessor housing 111.

The exhaust gas is introduced into the preprocessor housing 111 through the exhaust gas inlet 1112. As can be seen in FIGS. 4 to 7, the exhaust gas inlet 1112 is formed at an upper end of the preprocessor housing 111, and the exhaust gas introduced through the exhaust gas inlet 1112 flows down along the cylindrical flow path formed by the inner wall 1111.

The preprocessed gas, which is the exhaust gas from which harmful substances have primarily been removed in the preprocessor 11, is discharged through the preprocessed gas outlet 1113. As shown in FIGS. 4 to 7, the preprocessed gas outlet 1113 is formed at one lower side of the preprocessor housing 111, and the preprocessed gas discharged through the preprocessed gas outlet 1113 flows to the postprocessor 13 through the connection part 12.

Figure 7:
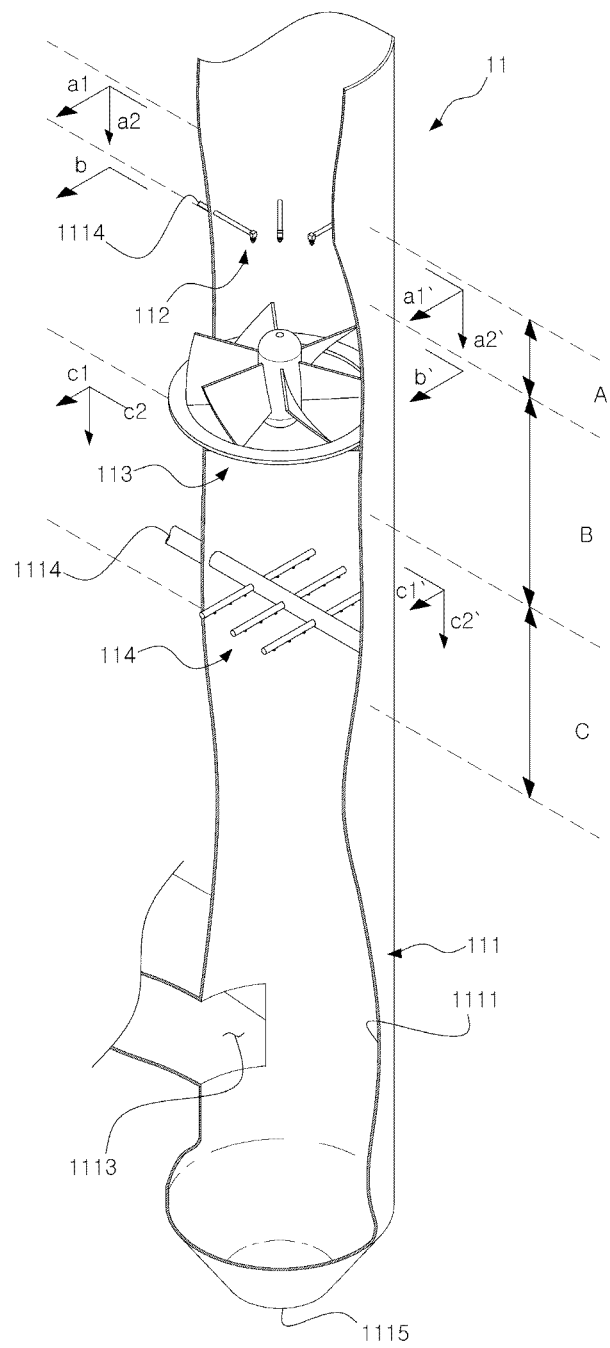
FIG. 7 is a cutaway perspective view of a preprocessor of an exhaust gas treatment apparatus according to a first embodiment.

The cleaning liquid to be sprayed in the preprocessor 11 is introduced through the cleaning liquid inlet 1114. As shown in FIG. 7, the cleaning liquid inlet 1114 is connected to the first preprocessor sprayer 112 and the second preprocessor sprayer 114, respectively, or is formed therein, which will be described later.

The cleaning liquid sprayed by first preprocessor sprayer 112 and the second preprocessor sprayer 114 in order to remove harmful substances from the exhaust gas introduced into the preprocessor housing 111 through the exhaust gas inlet 1112, is discharged through the cleaning liquid outlet 1115. As shown in FIGS. 4 to 7, the cleaning liquid outlet 1114 is formed at the lower end of the preprocessor housing 111, and the cleaning liquid sprayed by the first preprocessor sprayer 112 and the second preprocessor sprayer 114 may capture harmful substances in the exhaust gas, and may move to the lower end of the preprocessor housing 111 to then be discharged to the outside through the cleaning liquid outlet 1114. The lower end of the preprocessor housing 111 may be preferably formed in a shape that converges toward the cleaning liquid outlet 1114 in order to facilitate discharge of the cleaning liquid.

The first preprocessor sprayer 112 is disposed near the exhaust gas inlet 1112 inside the preprocessor housing 111 and sprays cleaning liquid to the exhaust gas introduced through the exhaust gas inlet 1112. As described above, seawater, fresh water mixed with alkaline additives, and the like may be used as the cleaning liquid.

The first preprocessor sprayer 112 cools the exhaust gas introduced through the exhaust gas inlet 1112. The exhaust gas introduced through the exhaust gas inlet 1112 generally has a temperature of 250 degrees C. to 350 degrees C., and the temperature thereof may be lowered to 50 degrees C. to 60 degrees C. by the cleaning liquid sprayed from the first preprocessor sprayer 112, and the volume thereof may be reduced.

In addition, the first preprocessor sprayer 112 allows, in particular, PM, among the harmful substances in the exhaust gas, to be primarily captured by the cleaning liquid. The exhaust gas in contact with the cleaning liquid sprayed by the first preprocessor sprayer 112 changes its flow path from a straight pattern to a spiral pattern while passing through the agitator 113, and comes into contact with the cleaning liquid sprayed by the second preprocessor sprayer 114, which will be described later. Accordingly, the cleaning liquid, which is sprayed by the first preprocessor sprayer 112 and captures the harmful substances, is increased in size and is moved to the lower portion of the preprocessor housing 111 by gravity.

Preferably, the first preprocessor sprayer 112 sprays the cleaning liquid in the form of microdroplets, unlike the second preprocessor sprayer 114. Specifically, the first preprocessor sprayer 112 may spray the cleaning liquid in the form of droplets having a particle diameter of 100 to 200 μm. Among the harmful substances in the exhaust gas, PM has a particle diameter of 0.1 to 0.5 μm, and if the cleaning liquid is sprayed in the form of droplets having a particle diameter of 100 to 200 μm, the cleaning liquid can effectively capture and aggregate the PM.

Figure 8:
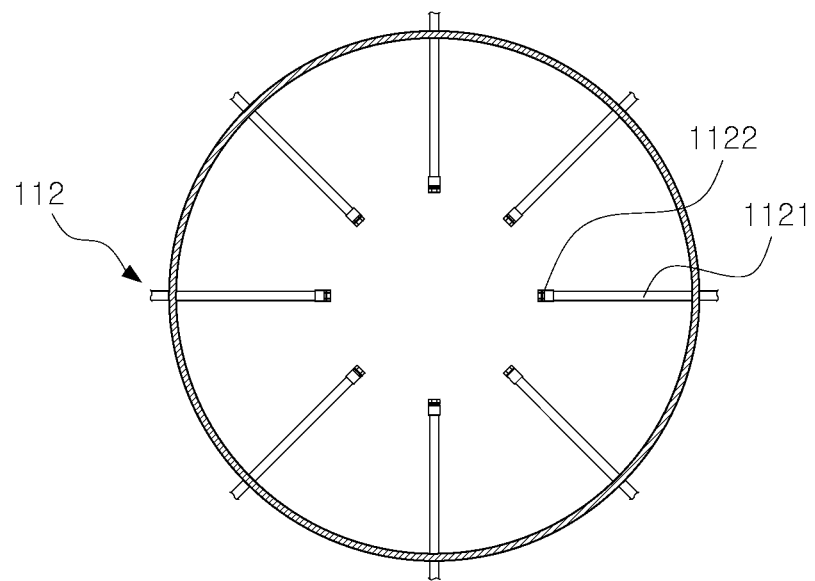
FIG. 8 is a cross-sectional view taken along the line a1-a1' in the section A in FIG. 7.
Figure 9:
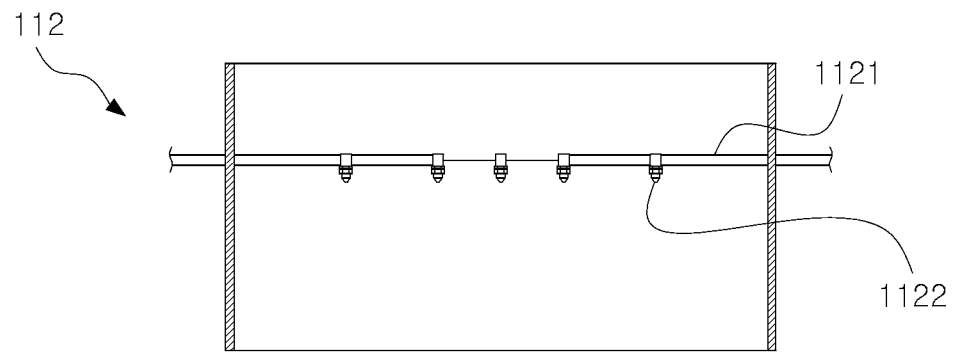
FIG. 9 is a cross-sectional view taken along the line a2-a2' in the section A in FIG. 7.

Referring to FIGS. 8 and 9, in an embodiment of the present disclosure, the first preprocessor sprayer 112 includes a rod-type spray body 1121 and a spray nozzle 1122 formed at one end of the spray body 1121. The spray body 1121 may be supplied with cleaning liquid and compressed air from a cleaning liquid supply means (not shown) through the cleaning liquid inlet 1114. The spray body 1121 receives cleaning liquid together with compressed air and delivers the same to the spray nozzle 1122, and the spray nozzle 1122 sprays the cleaning liquid to the exhaust gas.

Meanwhile, a plurality of first preprocessor sprayers 112 is disposed parallel to the cross section perpendicular to the flow direction of the exhaust gas in the flow path of the exhaust gas, which is formed by the inner wall 1111 of the preprocessor housing 111. The plurality of first preprocessor sprayers 112 is arranged so as to protrude from the inner wall 1111 toward the center of the flow path at a predetermined angular interval relative to each other. The above arrangement may enable the cleaning liquid to be efficiently sprayed to the exhaust gas introduced through the exhaust gas inlet 1112 and flowing to the agitator 113.

The specific shape and arrangement of the first preprocessor sprayer 112 may vary depending on the spray capacity of the first preprocessor sprayer 112 and the overall designed length of the preprocessor 11.

The agitator 113 is disposed between the first preprocessor sprayer 112 and the second preprocessor sprayer 114 in the preprocessor housing 111 and serves to allow the exhaust gas to flow in a curve, preferably in a spiral, in the flow path thereof. In an embodiment of the present disclosure, the preprocessor housing 111 forms a flow path of the exhaust gas in the vertical direction from the top to the bottom, and the agitator 113 changes the flow of the exhaust gas, which is introduced through the exhaust gas inlet 1112 and flows down straight, into a curved pattern, preferably a spiral pattern.

When the flow path of the exhaust gas is changed from a straight pattern to a curved pattern by the agitator 113, the flow path becomes longer, and as a result thereof, the contact time between the exhaust gas and the cleaning liquid sprayed from the second preprocessor sprayer 114 may be increased. Accordingly, the proportion of harmful substances, such as PM, SOx, and the like, in the exhaust gas captured by the cleaning liquid is increased. Therefore, the agitator 113 is preferably disposed adjacent to the exhaust gas inlet 1112.

As described above, it is possible to increase the time during which harmful substances are removed from the exhaust gas relative to the internal space of the preprocessor housing 111 using the agitator 113, and it is possible to improve the efficiency of removal of harmful substances from the exhaust gas without increasing the height of the preprocessor 11, even if the height thereof is reduced. As a result, the equipment can be miniaturized.

Figure 10:
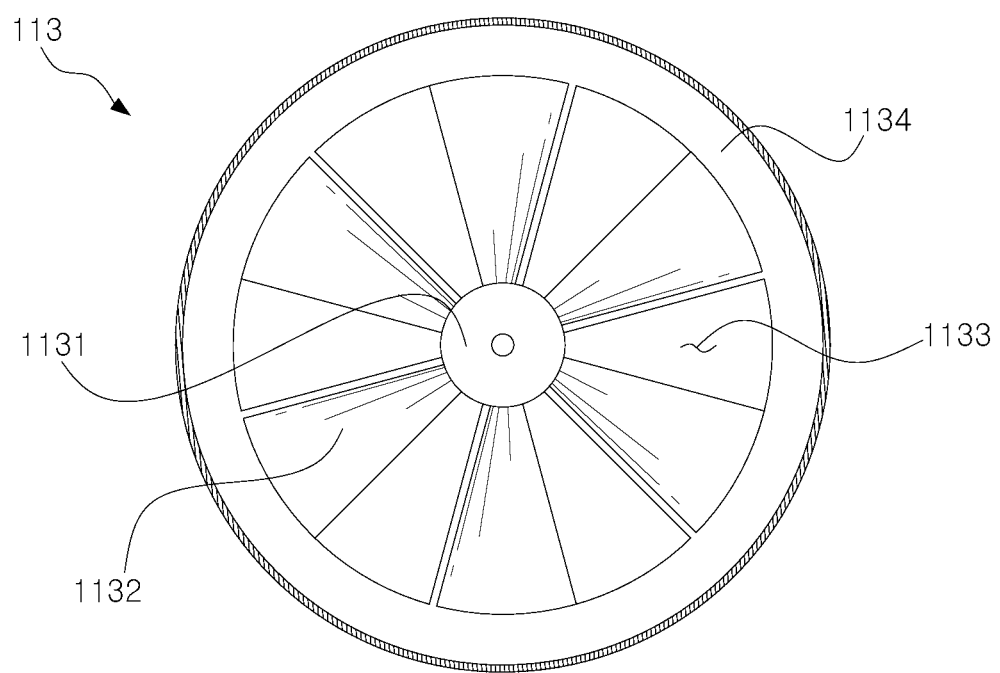
FIG. 10 is a cross-sectional view taken along the line b-b' in the section B in FIG. 7.
Figure 11:
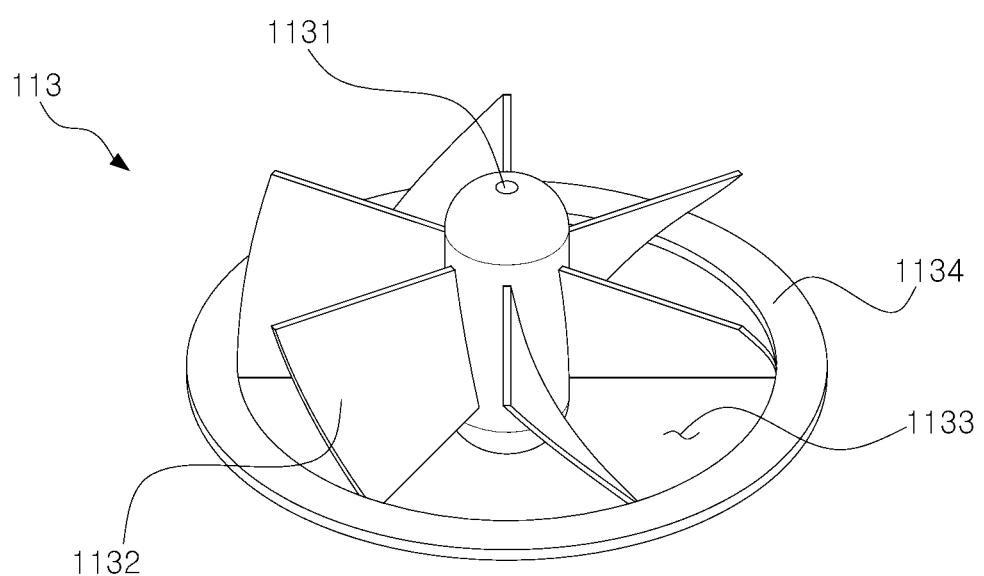
FIG. 11 is a perspective view of an agitator of an exhaust gas treatment apparatus according to a first embodiment.

Referring to FIGS. 10 and 11, the agitator 113 is disposed so as to cover the flow path and includes a central body 1131, a plurality of blades 1132, and space portions 1133. The agitator 113 is placed on protrusion supports 1111a formed on the inner wall 1111 of the preprocessor housing 111 by means of a flange 1134 coupled to the outer side of the blades 1132. The agitator 113 may be arranged to be coupled to the inner wall 1111 of the preprocessor housing 111 by welding or the like, as necessary.

The body 1131 is the center of the agitator 113, and the blades 1132 are radially coupled to the body 1131 at a predetermined torsion angle. In addition, the exhaust gas may pass through the space portions 1133 between the blades 1132 without colliding therewith.

As shown in FIG. 10, in an embodiment of the present disclosure, the agitator 113 has six blades 1132 coupled to the body 1131 at an interval of 30 degrees along the outer surface thereof so as to be twisted at a predetermined angle, and the space portions 1133 are formed between the blades 1132.

With the configuration of the agitator 113 described above, the exhaust gas passing through the agitator 113 may have a spiral flow to be symmetric with respect to the center of the flow path of the exhaust gas formed by the inner wall 1111 of the preprocessor housing 111 and to be smooth so that harmful substances in the exhaust gas, which are captured by the cleaning liquid sprayed by the first preprocessor sprayer 112 and the second preprocessor sprayer 114, may flow down along the inner wall 1111 of the housing 111.

On the other hand, if the space portions 1133 are not provided between the blades 1132, the exhaust gas introduced through the exhaust gas inlet 1112 may exhibit excessive pressure loss when passing through the agitator 113, which is undesirable in terms of the flow of the exhaust gas.

In addition, the agitator 113 may be preferably fixed and preventing from rotating. This is due to the fact that the exhaust gas introduced through the exhaust gas inlet 1112 generally has a sufficient fluid supply speed toward the preprocessed gas outlet 1113 so that separate propulsion energy is not required for the exhaust gas in the flow path.

The second preprocessor sprayer 114 is disposed between the agitator 113 and the preprocessed gas outlet 1113 in the preprocessor housing 111, and sprays cleaning liquid to the exhaust gas passing through the agitator 113 and flowing spirally through the flow path.

The second preprocessor sprayer 114 further sprays cleaning liquid to the exhaust gas, which passes through the agitator 113 and flows in a curve pattern, preferably in a spiral pattern, toward the preprocessed gas outlet 1113 located in the lower portion of the preprocessor housing 111, so as to facilitate aggregation of the cleaning liquid, which was sprayed by the first preprocessor sprayer 112 and which captured harmful substances, such as PM or the like, contained in the exhaust gas, thereby increasing the size thereof. Thus, the aggregated cleaning liquid flows down along the inner wall 1111 of the preprocessor housing 111 or effectively falls down to the bottom of the preprocessor housing 111.

As described above, the second preprocessor sprayer 114 preferably sprays cleaning liquid having a larger particle diameter than the cleaning liquid sprayed by the first preprocessor sprayer 112 in order to increase the size of the droplets of the cleaning liquid, which was sprayed by the first preprocessor sprayer 112 and captured harmful substances, such as PM or the like, in the exhaust gas. Specifically, the second preprocessor sprayer 114 preferably sprays the cleaning liquid in the form of droplets having a particle diameter of 500 µm to 1,000 µm.

Figure 12:
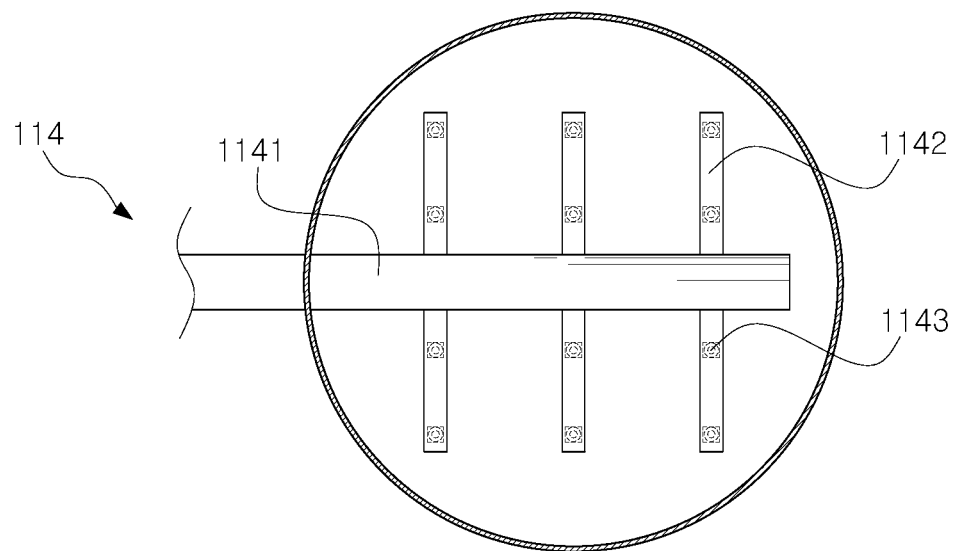
FIG. 12 is a cross-sectional view taken along the line c1-c1' in the section C in FIG. 7.
Figure 13:
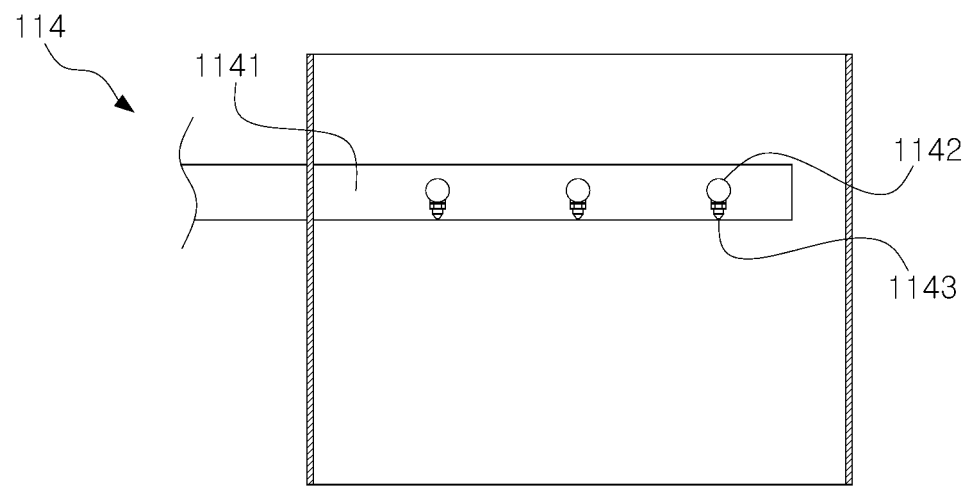
FIG. 13 is a cross-sectional view taken along the line c2-c2' in the section C in FIG. 7.

Referring to FIGS. 12 and 13, in an embodiment of the present disclosure, the second preprocessor sprayer 114 includes a rod-type spray body 1141, a plurality of spray rods 1142 branching side by side from the spray body 1141 at a predetermined interval, and a plurality of spray nozzles 1143 formed at a predetermined interval on the respective spray rods 1142. The spray body 1141 may be supplied with a cleaning liquid and compressed air from the cleaning liquid supply means (not shown) through the cleaning liquid inlet 1114. The spray body 1141 receives the cleaning liquid together with the compressed air and delivers the same to the respective spray rods 1142, and the spray nozzles 1143 spray the cleaning liquid to the exhaust gas.

The second preprocessor sprayer 114 has a structure in which the spray nozzles 1143 for spraying the cleaning liquid are more densely arranged than the first preprocessor sprayer 112, which is advantageous for evenly spraying the cleaning liquid to the exhaust gas passing through the agitator 113 and flowing in a spiral through the flow path without a dead zone.

Like the first preprocessor sprayer 112 described above, the specific shape and arrangement of the second preprocessor sprayer 114 may also vary depending on the spray capacity of the second preprocessor sprayer 114, the overall designed length of the processor 11, and the like.

The connection part 12 moves the preprocessed gas, which is the exhaust gas from which harmful substances are primarily reduced, from the preprocessor 11 to the postprocessor 13. Referring to FIGS. 4 to 6, the connection part 12 includes a passage having one end leading to the preprocessed gas outlet 1113 of the preprocessor housing 111 and the opposite end leading to the preprocessed gas inlet 1312 of the postprocessor housing 131.

The postprocessor 13 further removes harmful substances from the preprocessed gas, which is the exhaust gas from which the harmful substances are primarily reduced by the preprocessor 11. Referring to FIGS. 3 to 5 and 14, the postprocessor 13 includes a postprocessor housing 131, a diffuser 132, a packing 133, a packing support 134, a first postprocessor sprayer 135, a second postprocessor sprayer 136, a gas/liquid separator 137, a washing means 138, and a droplet blocker 139.

Figure 14:
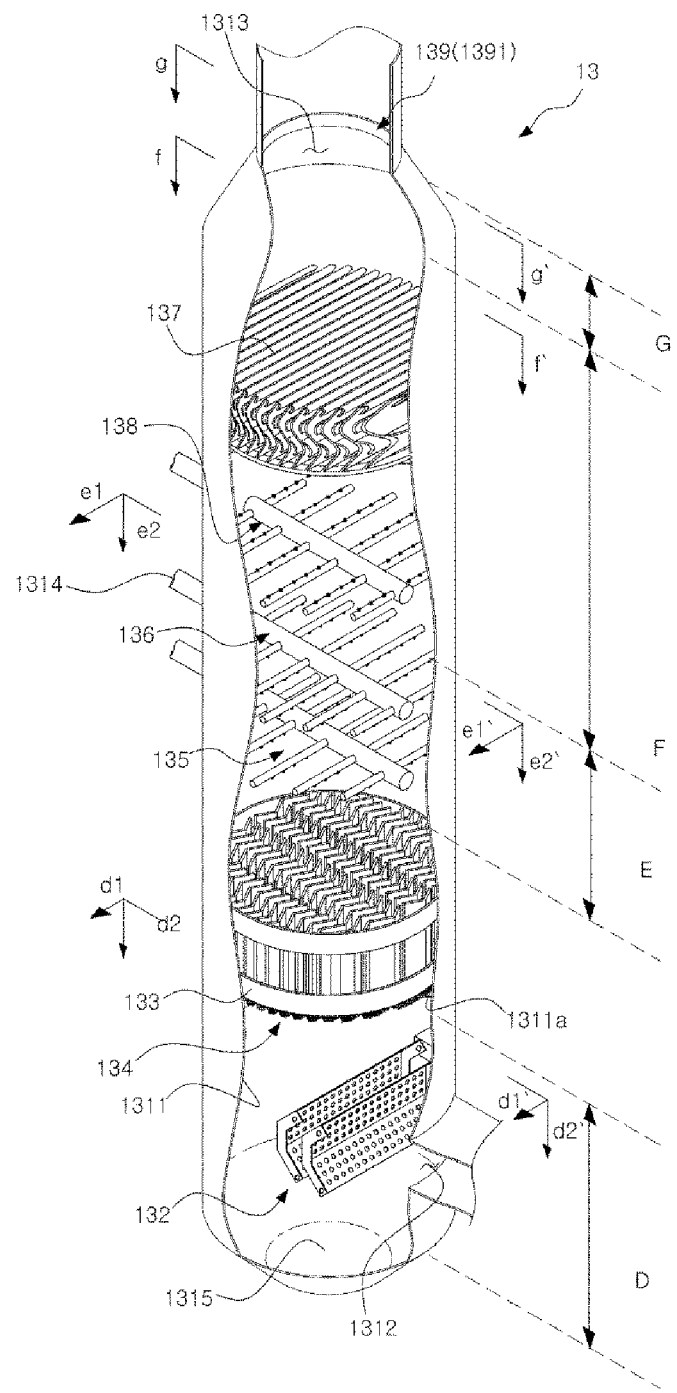
FIG. 14 is a cutaway perspective view of a postprocessor of an exhaust gas treatment apparatus according to a first embodiment.

The postprocessor housing 131 forms the external shape of the postprocessor 13 and forms a flow path of the preprocessed gas therein. The postprocessor housing 131 includes an inner wall 1311, a preprocessed gas inlet 1312, a postprocessed gas outlet 1313, and a cleaning liquid outlet 1315. As shown in FIGS. 4 and 14, in an embodiment of the present disclosure, the postprocessor housing 131 is formed as a cylindrical tower and provides a flow path for moving the preprocessed gas introduced through one lower side thereof in the upward direction and allowing harmful substances to be further removed from the preprocessed gas.

The inner wall 1311 forms a flow path of the preprocessed gas inside the postprocessor housing 131. Referring to FIGS. 4 and 14, the inner wall 1311 forms a cylindrical flow path of the exhaust gas inside the postprocessor housing 131.

The preprocessed gas flows into the postprocessor housing 131 through the preprocessed gas inlet 1312. As shown in FIGS. 4 to 6 and 14, the preprocessed gas inlet 1312 is formed at one lower side of the postprocessor housing 131, and the preprocessed gas introduced through the preprocessed gas inlet 1312 moves upwards along the cylindrical flow path formed by the inner wall 1311.

The postprocessed gas, which is the preprocessed gas from which harmful substances have been further removed in the postprocessor 13, is discharged through the postprocessed gas outlet 1313. As shown in FIGS. 4 to 6 and 14, the postprocessed gas outlet 1313 is formed at an upper portion of the postprocessor housing 131, and the postprocessed gas obtained by removing harmful substances from the exhaust gas by the preprocessor 11 and the postprocessor 13 may be discharged through the postprocessed gas outlet 1313 into the air.

The cleaning liquid to be sprayed is introduced into the postprocessor 13 through the cleaning liquid inlet 1314. As can be seen in FIGS. 4 and 14, the cleaning liquid inlet 1314 is connected to the first postprocessor sprayer 135, the second postprocessor sprayer 136, and the washing means 138, which will be described later, or is formed therein.

The cleaning liquid, which is sprayed by the first postprocessor sprayer 135 or the second postprocessor sprayer 136 to remove harmful substances from the preprocessed gas introduced into the postprocessor housing 131 through the preprocessed gas inlet 1312, is discharged through the cleaning liquid outlet 1315. As can be seen through FIGS. 4 to 6 and 14, the cleaning liquid outlet 1315 may be formed at the lower end of the postprocessor housing 131, and the cleaning liquid sprayed by the first postprocessor sprayer 135 and the second postprocessor sprayer 136 may capture harmful substances in the preprocessed gas, and may flow to the lower end of the postprocessor housing 131 to then be discharged to the outside through the cleaning liquid outlet 1315. The lower end of the postprocessor housing 131 may be preferably formed in a shape that converges toward the cleaning liquid outlet 1315 in order to facilitate the discharge of the cleaning liquid.

Figure 15:
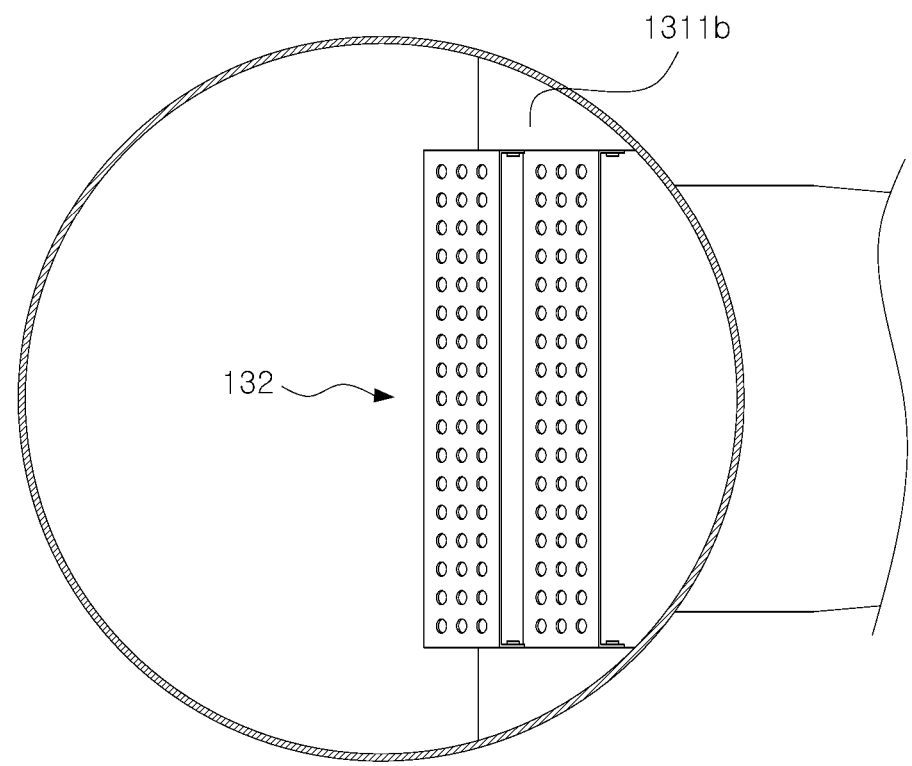
FIG. 15 is a cross-sectional view taken along the line d1-d1' in the section D in FIG. 14.
Figure 16:
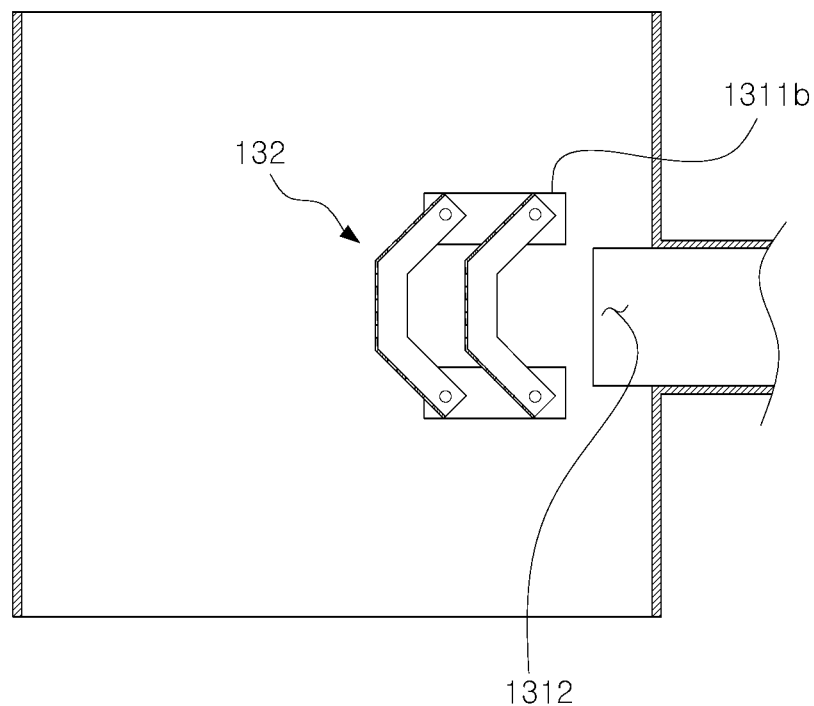
FIG. 16 is a cross-sectional view taken along the line d2-d2' in the section D in FIG. 14.
Figure 17:
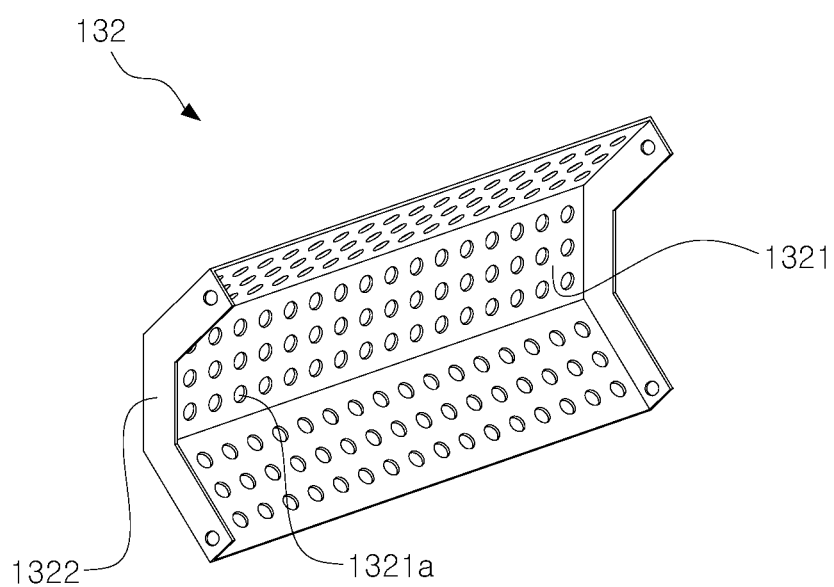
FIG. 17 is a perspective view of a diffuser of an exhaust gas treatment apparatus according to a first embodiment.

The diffuser 132 is disposed adjacent to the preprocessed gas inlet 1312 in the postprocessor housing 131 in order to diffuse the preprocessed gas introduced through the preprocessed gas inlet 1312. Referring to FIGS. 15 to 17, the diffuser 132 is disposed in front of the preprocessed gas inlet 1312 so as to be spaced therefrom and includes a body 1321 and a fastening part 1322.

The body 1321 is a member that is disposed to cover the front of the preprocessed gas inlet 1312 and has a diffusion part 1321a through which the preprocessed gas may pass. The body 1321 may be formed of a plate member. As shown in FIGS. 16 and 17, the body 1321 may be formed in its entirety so as to vertically cover the front of the preprocessed gas inlet 1312, and the upper and lower ends of the body 1321 may be inclined or curved toward the preprocessed gas inlet 1312.

More specifically, the upper end of the body 1321 is inclined up toward the preprocessed gas inlet 1312, and the lower end of the body 1321 is inclined down toward the preprocessed gas inlet 1312. The body 1321 in the above shape may uniformly diffuse the preprocessed gas introduced through the preprocessed gas inlet 1312 forward, upwards, and downwards. The overall shape of the body 1321 may be formed to be curved, instead of being formed such that only the upper and lower ends are inclined or curved.

The diffusion part 1321a may include a plurality of through-holes. The diffusion part 1321a may include a plurality of uniformly formed through-holes. However, the diffusion part 1321a is not limited to through-holes, and the diffusion part 1321a may be configured in the form of a slit or the like.

The area or shape of the body 1321, or the size, shape, number, and the like of the diffusion part 1321a may vary depending on the processing capacity of the postprocessor 13.

The fastening part 1322 is fastened to a fixing part 1311b formed inside the postprocessor housing 131, thereby fixing the diffuser 132 to the inside of the postprocessor housing 131. Referring to FIGS. 15 and 16, the fastening part 1322 is vertically extended or bent from the left and right ends of the body 1321 toward the preprocessed gas inlet 1312 and is fastened to the fixing part 1311b formed inside the postprocessor housing 131 using a fastening means, such as a bolt, thereby fixing the diffuser 132 to the inside of the postprocessor housing 131.

Since the preprocessed gas, which is the exhaust gas from which harmful substances are primarily reduced by the preprocessor 11, has a spiral flow path that was changed by the agitator 113, the preprocessed gas also has some rotational energy even when the preprocessed gas is discharged through the preprocessed gas outlet 1113 and introduced into the preprocessed gas inlet 1312 via the connection part 12. Therefore, the flow of the preprocessed gas is concentrated on the side of the preprocessed gas inlet 1312 on the inner wall 1311 of the postprocessor housing 131 while entering the postprocessor housing 131, and the preprocessed gas may not be evenly distributed over the flow path of the preprocessed gas formed inside the postprocessor housing 131.

The diffuser 132 may serve as a nozzle to narrow the cross-sectional area of the preprocessed gas when the preprocessed gas flows into the postprocessor housing 131, thereby allowing the preprocessed gas to uniformly diffuse to the inside of the postprocessor housing 131. Accordingly, the preprocessed gas may be evenly distributed over the flow path of the preprocessed gas formed inside the postprocessor housing 131. That is, since the diffuser 132 may evenly disperse the preprocessed gas introduced into the packing 133, it is possible to increase the absorption efficiency of SOx in the preprocessed gas by the packing 133 and to improve the capture efficiency of other harmful substances.

Meanwhile, as shown in FIGS. 15 and 16, two diffusers 132 may be disposed in sequence in front of the preprocessed gas inlet 1312, thereby facilitating uniform diffusion by the diffuser 132.

The packing 133 is intended to increase the contact area between the cleaning liquid sprayed by the first postprocessor sprayer 135 and the second postprocessor sprayer 136, which will be described later, and the preprocessed gas. The packing 133 is disposed above the diffuser 132 in the flow path of the preprocessed gas inside the postprocessor housing 131 and increases the gas/liquid contact area between the preprocessed gas and the cleaning liquid, thereby facilitating the dissolution of SOx, which is a harmful substance in the preprocessed gas, in the cleaning liquid including seawater or fresh water containing alkaline additives.

The packing 133 has a structure including a plurality of fillers, and the filler may be made of steel, ceramic, plastic, or the like. In addition, the packing 133 may be configured as a random packing in which fillers are gathered without a specific pattern or as a structured packing having a specific pattern. The packing 133 may vary in the type and shape thereof depending on the processing capacity and the designed length of the postprocessor 13.

Figure 18:
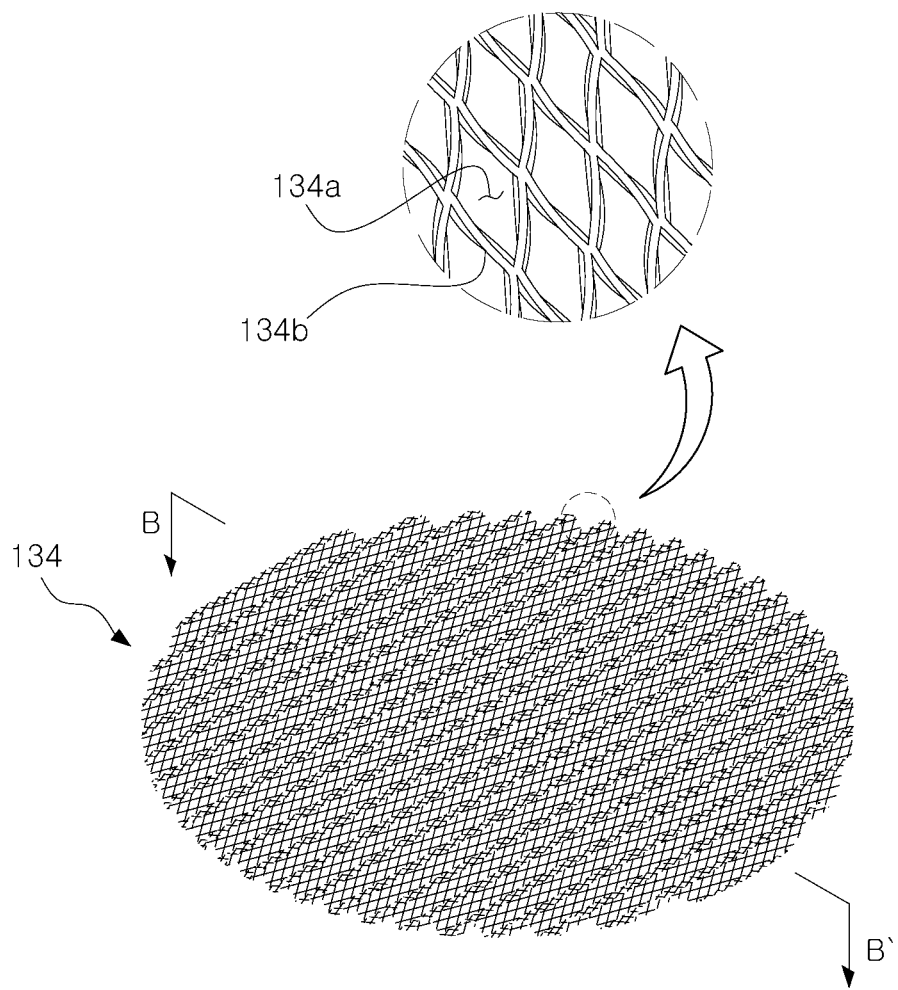
FIG. 18 is a perspective view of a packing support of an exhaust gas treatment apparatus according to a first embodiment.
Figure 19:
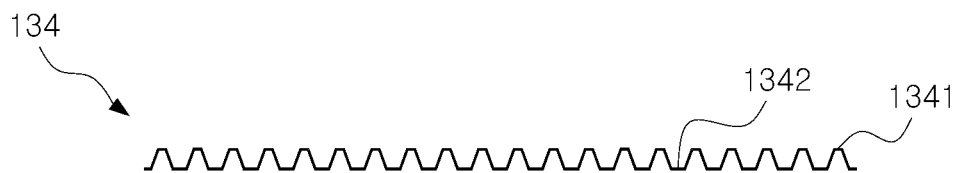
FIG. 19 is a cross-sectional view taken along the line B-B' in FIG. 18.

The packing support 134 supports the packing 133 at the bottom thereof, and diffuses the preprocessed gas. Referring to FIGS. 18 and 19, the packing support 134 covers the flow path of the preprocessed gas, is placed on a protrusion member 1311*a*, which protrudes inward from the inner wall 1311 of the postprocessor housing 131, at the edge thereof, and supports the packing 133 placed thereon. In the present disclosure, the packing support 134 has a function of diffusing the preprocessed gas at the lower portion of the packing 133.

The packing support 134 includes an opening part 134*a* formed to allow the preprocessed gas to pass therethrough and a support part 134*b* supporting the packing. More specifically, the support part 134*b* is a strand having a cross structure, and the opening part 134*a* is a through-hole formed by the support part 134*b*. That is, the packing support 134 has an opening part 134*a* in the form of a mesh formed by the support part 134*b* having the cross structure. This mesh structure may lower the resistance, thereby reducing the pressure loss of the preprocessed gas.

It is preferable to increases the passage area of the preprocessed gas by increasing the ratio of the opening part 134*a* (i.e., the ratio of the through-holes in the mesh structure) of the packing support 134, compared to a general mesh structure, thereby minimizing the pressure loss of the preprocessed gas. More specifically, it is preferable to configure the ration of the area of the opening part 134*a* to the vertical projection area of the support part 134*b* to range approximately from 2:1 to 4:1.

Meanwhile, as shown in FIG. 18, at least a portion of the support part 134*b* preferably has a twisted structure. If the support part 134*b* has a twisted structure as described above, the preprocessed gas that collides with the support part 134*b*, among the preprocessed gas passing through the opening part 134*a*, is changed in its traveling direction along the twisted direction. As a result, the preprocessed gas may be diffused more widely, and more uniform and active dispersion and diffusion of the preprocessed gas may be realized.

In the present disclosure, the packing support 134 plays the role of evenly distributing the preprocessed gas introduced into the packing 133 over the entire lower area of the packing 133, as well as supporting the packing 133. As a result, it is possible to increase the absorption efficiency of SOx of the preprocessed gas in the packing 133 through the packing support 134, and to improve the capture efficiency of other harmful substances.

Meanwhile, the packing support 134 preferably has a corrugated structure in which the peaks 1341 and the valleys 1342 are alternately connected side by side. The above corrugated structure may improve the support force per unit area so that the packing 133 can be more stably supported by the peaks 1341. Furthermore, this structure allows the pressure of the preprocessed gas flowing toward the packing 133 to be uniformly distributed over the packing support 134, so that the preprocessed gas flowing to the packing 133 under the packing 133 may diffuse uniformly to the bottom of the packing 133.

The first postprocessor sprayer 135 is disposed in the flow path of the preprocessed gas inside the postprocessor housing 131 and sprays cleaning liquid to the preprocessed gas. The first postprocessor sprayer 135 is disposed above the packing 133 and sprays the cleaning liquid to the packing 133.

Figure 20:
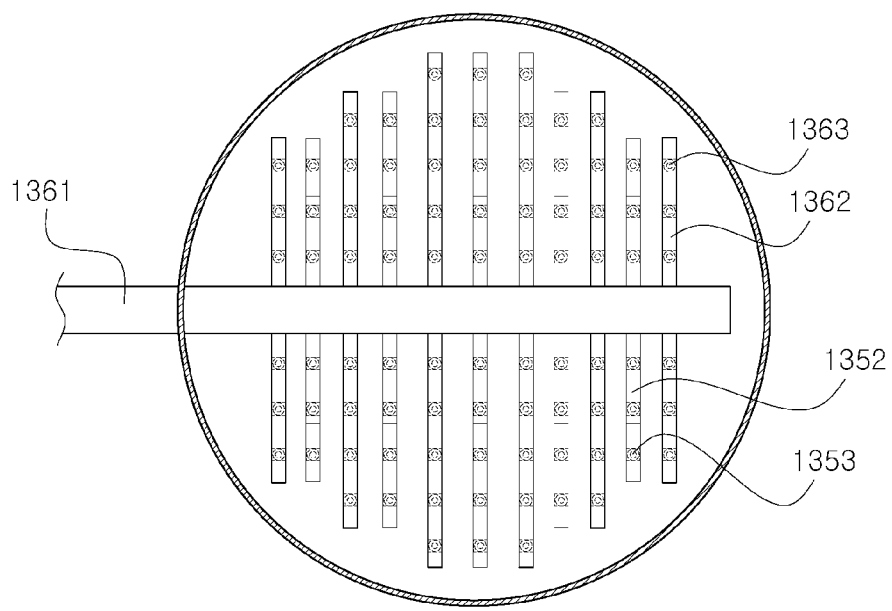
FIG. 20 is a cross-sectional view taken along the line e1-e1' in the section E in FIG. 14.
Figure 21:
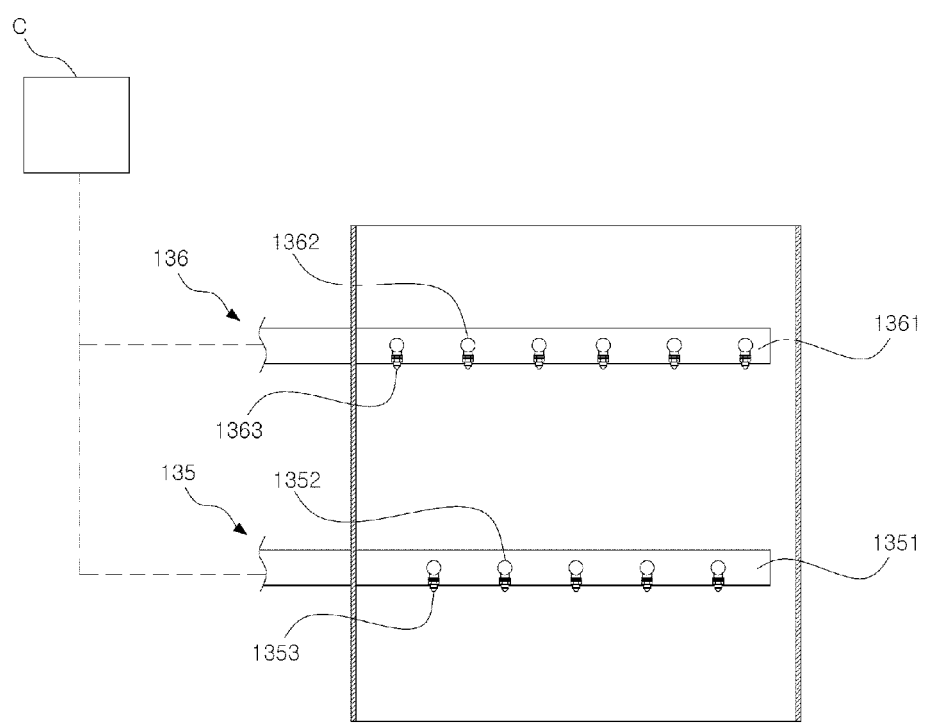
FIG. 21 is a cross-sectional view taken along the line e2-e2' in the section E in FIG. 14.

Referring to FIGS. 14, 20, and 21, in an embodiment of the present disclosure, the first postprocessor sprayer 135 may include a rod-type spray body 1351, a plurality of spray rods 1352 branching side by side from the spray body 1351 at a predetermined interval, and a plurality of spray nozzles 1353 formed on the respective spray rods 1352 at a predetermined interval, and may further include a cleaning liquid supply means (not shown) for supplying cleaning liquid and compressed air to the respective spray rods 1352 through the spray body 1351. The cleaning liquid and compressed air are supplied by the cleaning liquid supply means (not shown) to the spray body 1351 through the cleaning liquid inlet 1314. The spray body 1351 receives the cleaning liquid together with the compressed air and delivers the same to the respective spray rods 1352, and the spray nozzles 1353 spray the cleaning liquid to the exhaust gas.

The specific shape and arrangement of the first postprocessor sprayer 135 may vary depending on the spray capacity of the first postprocessor sprayer 135, the overall designed length of the postprocessor 13, and the like.

The second postprocessor sprayer 136 is disposed in the flow path of the preprocessed gas inside the postprocessor housing 131 so as to spray cleaning liquid to the preprocessed gas, but the second postprocessor sprayer 136 operates independently from the first postprocessor sprayer 135. Independent operation of the second postprocessor sprayer 136 may be performed under the control of the controller (C) as shown in FIG. 19. The controller (C) performs control such that the spray of cleaning liquid by the first postprocessor sprayer 135 is performed independently from that of the second postprocessor sprayer 136.

Referring to FIGS. 14, 20, and 21, in an embodiment of the present disclosure, the second postprocessor sprayer 136 may include a rod-type spray body 1361, a plurality of spray rods 1362 branching side by side from the spray body 1361 at a predetermined interval, and a plurality of spray nozzles 1363 formed on the respective spray rods 1362 at a predetermined interval, and may further include cleaning liquid supply means (not shown) for supplying cleaning liquid and compressed air to the respective spray rods 1362 through the spray body 1361. The cleaning liquid and compressed air are supplied by the cleaning liquid supply means (not shown) to the spray body 1361 through the cleaning liquid inlet 1314. The spray body 1361 receives the cleaning liquid together with the compressed air and delivers the same to the respective spray rods 1362, and the spray nozzles 1363 spray the cleaning liquid to the exhaust gas.

Like the description of the first postprocessor sprayer 135 above, the specific shape and arrangement of the second postprocessor sprayer 136 may vary depending on the spray capacity of the second postprocessor sprayer 136, the overall designed length of the postprocessor 13, and the like.

Independent operation of the second postprocessor sprayer 136 from the first postprocessor sprayer 135 means that the second postprocessor sprayer 136 may spray the cleaning liquid selectively or at the same time as the first postprocessor sprayer 135. Therefore, if the amount of the exhaust gas generated by combustion and the amount of the preprocessed gas introduced from the preprocessor 11 change according to the load of the engine, it is possible to appropriately spray the cleaning liquid according thereto, thereby ensuring economical operation of the postprocessor 13.

The second postprocessor sprayer 136 is disposed above the first postprocessor sprayer 135 at a predetermined interval. If the second postprocessor sprayer 136 and the first postprocessor sprayer 135 are disposed on the same horizontal plane in the flow path of the preprocessed gas, resistance to the flow of the preprocessed gas is increased. Therefore, it is preferably to arrange the second postprocessor sprayer 136 and the first postprocessor sprayer 135 at different heights.

Furthermore, it is more preferable to arrange the first postprocessor sprayer 135 and the second postprocessor sprayer 136 so as to cross each other in the flow path of the preprocessed gas when viewed from above while being disposed at different heights. This arrangement causes the cleaning liquid to be evenly sprayed to the preprocessed gas in the flow path thereof without a dead zone and enables more effective removal of harmful substances from the preprocessed gas.

Hereinafter, a mechanism for removing harmful substances from the preprocessed gas using the cleaning liquid sprayed by the first postprocessor sprayer 135 and the second postprocessor sprayer 136 will be described.

The preprocessed gas contains harmful substances, such as sulfur oxides (SOx), PM, and the like, which are acidic substances, and the first postprocessor sprayer 135 and the second postprocessor sprayer 136 spray cleaning liquid in order to neutralize or aggregate the harmful substances to then remove the same. In general, the PM 0.1 to 0.5 μm in size is first aggregated by microdroplets (100 to 200 μm) so that the size thereof is increased. In addition, in order to neutralize the acidic sulfur oxides (SOx), an alkaline cleaning liquid is required. In the case of using fresh water, separate alkaline additives are added to induce a neutralization reaction.

In this case, the alkaline additives may be NaOH (sodium hydroxide), Na2CO3 (sodium carbonate), NaHCO$_3$ (sodium bicarbonate), and the like. The neutralization reaction of sulfur oxides (SOx) by the cleaning liquid having NaOH added thereto is as follows.

$$SO2(g)+2NaOH(aq)+(1/2)O2(g) \rightarrow 2Na++SO42-+H2O$$

However, as described above, in the case where the present disclosure is applied to a ship, seawater, which is brine, may be used as cleaning liquid. In general, seawater contains salts, such as sodium chloride (NaCl), magnesium chloride (MgCl2), potassium chloride (KCl), and the like, and exhibits slight alkalinity of pH 7.8 to 8.3 due to anions Cl—, SO42-, Br—, and the like, which are produced by the solution of salts. Therefore, if such seawater is used as cleaning liquid, it is possible to neutralize sulfur oxides (SOx) without adding separate alkaline additives.

In this case, the neutralization reaction by seawater is as follows. First, sulfur dioxide (SO2) in a gaseous state is mixed with water.

$$SO_{2(g)}+H_2O_{(1)} \leftrightarrow H_2SO_{3(aq)}$$

Next, it reacts with a base in seawater.

$$2H_2SO_{3(aq)}+OH^- \leftrightarrow 2HSO_{3(aq)}^- + H^+_{(aq)} + H_2O_{(aq)}$$

$$2HSO_{3(aq)}^- + OH^-_{(aq)} \leftrightarrow 2SO_3^{2-}(aq) + H^+_{(aq)} + H_2O_{(aq)}$$

In other words, sulfur dioxide is absorbed into the seawater to form sulfates.

The gas/liquid separator 137 is disposed above the second postprocessor sprayer 136 inside the postprocessor housing 131 to separate microdroplets passing through the second postprocessor sprayer 136 and flowing along the flow path of the preprocessed gas. The gas/liquid separator 137 is disposed in such a manner that the edge thereof is placed on a protrusion member 1311a protruding inwards from the inner wall 1311 of the postprocessor housing 131.

The gas/liquid separator 137 separates, filters, and collects aerosol-type droplets or mist generated by contact between the preprocessed gas and the cleaning liquid. The gas/liquid separator 137 may include a plurality of blades arranged at a predetermined interval and each having a vertical cross section in a zigzag shape. In addition, the specific form of the gas/liquid separator 137 may vary depending on the design of the postprocessor 13, temperature, chemical characteristics, and the like.

The washing means 138 is disposed above the second postprocessor sprayer 136 and below the gas/liquid separator 137 inside the postprocessor housing 131 so as to spray cleaning liquid toward the gas/liquid separator 137.

Figure 22:
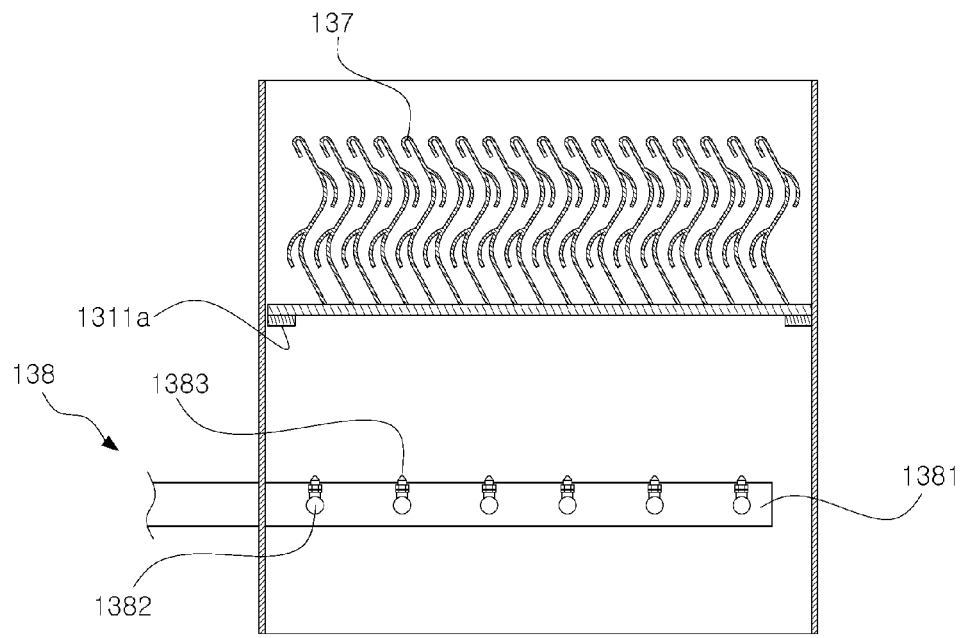
FIG. 22 is a cross-sectional view taken along the line f-f' in the section F in FIG. 14.
Figure 23:
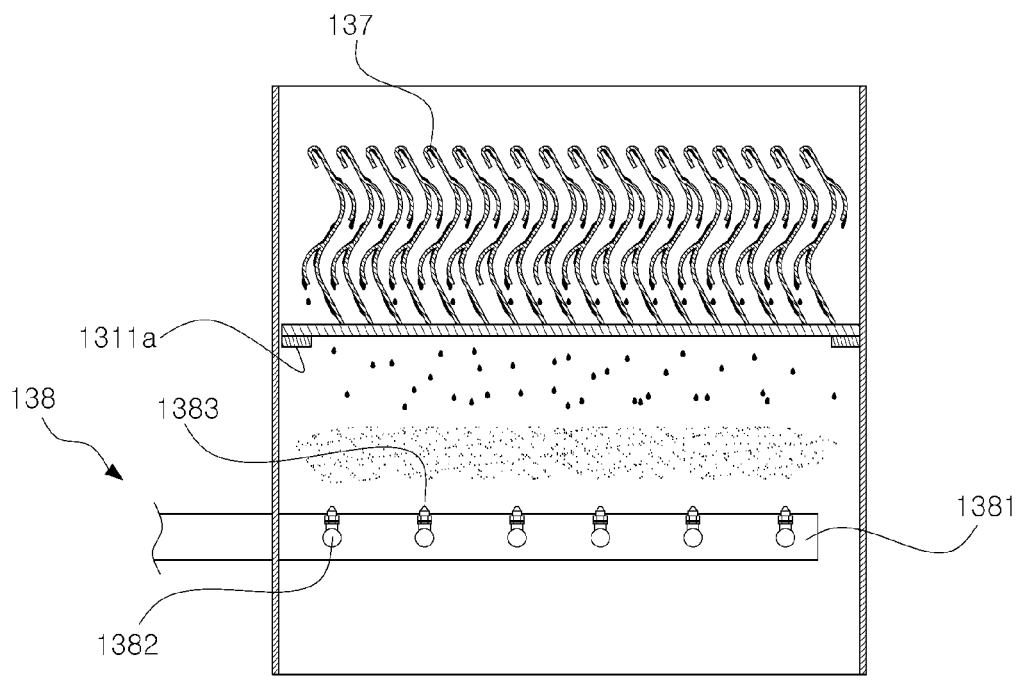
FIG. 23 is a reference diagram illustrating a washing process in FIG. 22.

Referring to FIGS. 14, 22 and 23, in an embodiment of the present disclosure, the washing means 138 may include a rod-type spray body 1381, a plurality of spray rods 1382 branching side by side from the spray body 1381 at a predetermined interval, and a plurality of spray nozzles 1383 formed at a predetermined interval on the respective spray rods 1382, and may further include cleaning liquid supply means (not shown) for supplying cleaning liquid and compressed air to the respective spray rods 1382 through the spray body 1381. The cleaning liquid and the compressed air are supplied from the cleaning liquid supply means (not shown) to the spray body 1381 through the cleaning liquid inlet 1314. The spray body 1381 receives the cleaning liquid together with the compressed air and delivers the same to the respective spray rods 1382, and the spray nozzles 1383 spray the cleaning liquid toward the gas/liquid separator 137.

The gas/liquid separator 137 may be contaminated or clogged in the process of separating, filtering, and collecting microdroplets or mist in the state of capturing harmful substances, such as PM and the like, in the preprocessed gas. The washing means 138 washes the gas/liquid separator 137 using cleaning liquid, thereby preventing contamination and blockage of the gas/liquid separator 137.

In addition, the washing means 138 increases the size of the microdroplets or mist separated by the gas/liquid separator 137 by spraying the cleaning liquid so that the microdroplets or mist having a larger size and having captured the harmful substances, may efficiently fall to the bottom of the postprocessor housing 131 or may flow down along the inner wall 1311 of the postprocessor housing 131.

Figure 24:
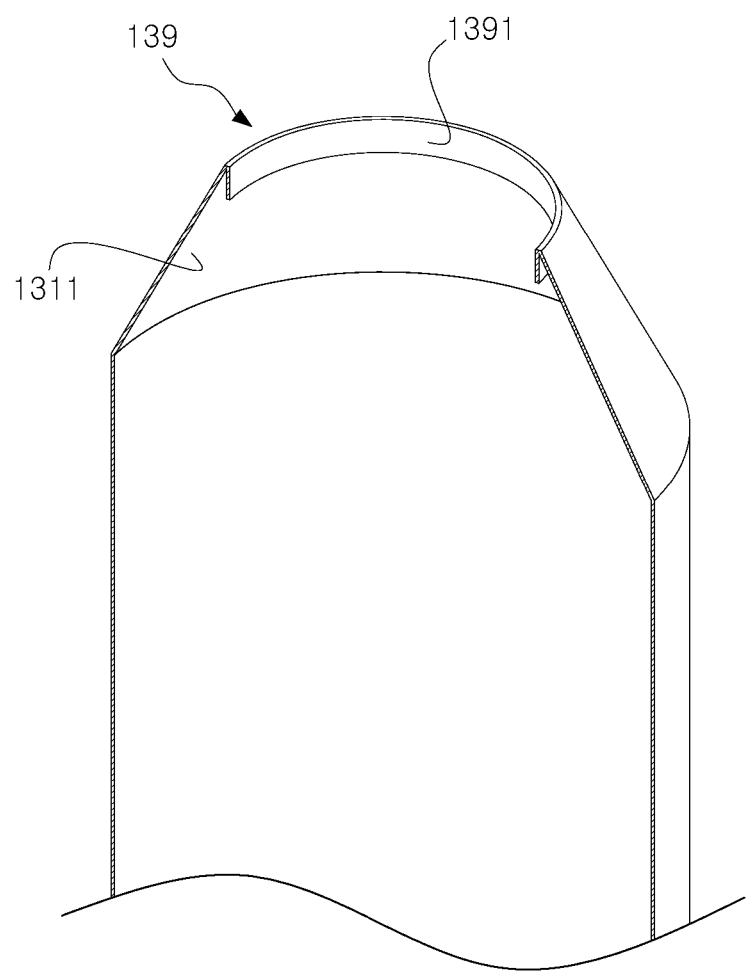
FIG. 24 is a cross-sectional view taken along the line g-g' in the section G in FIG. 14.
Figure 25:
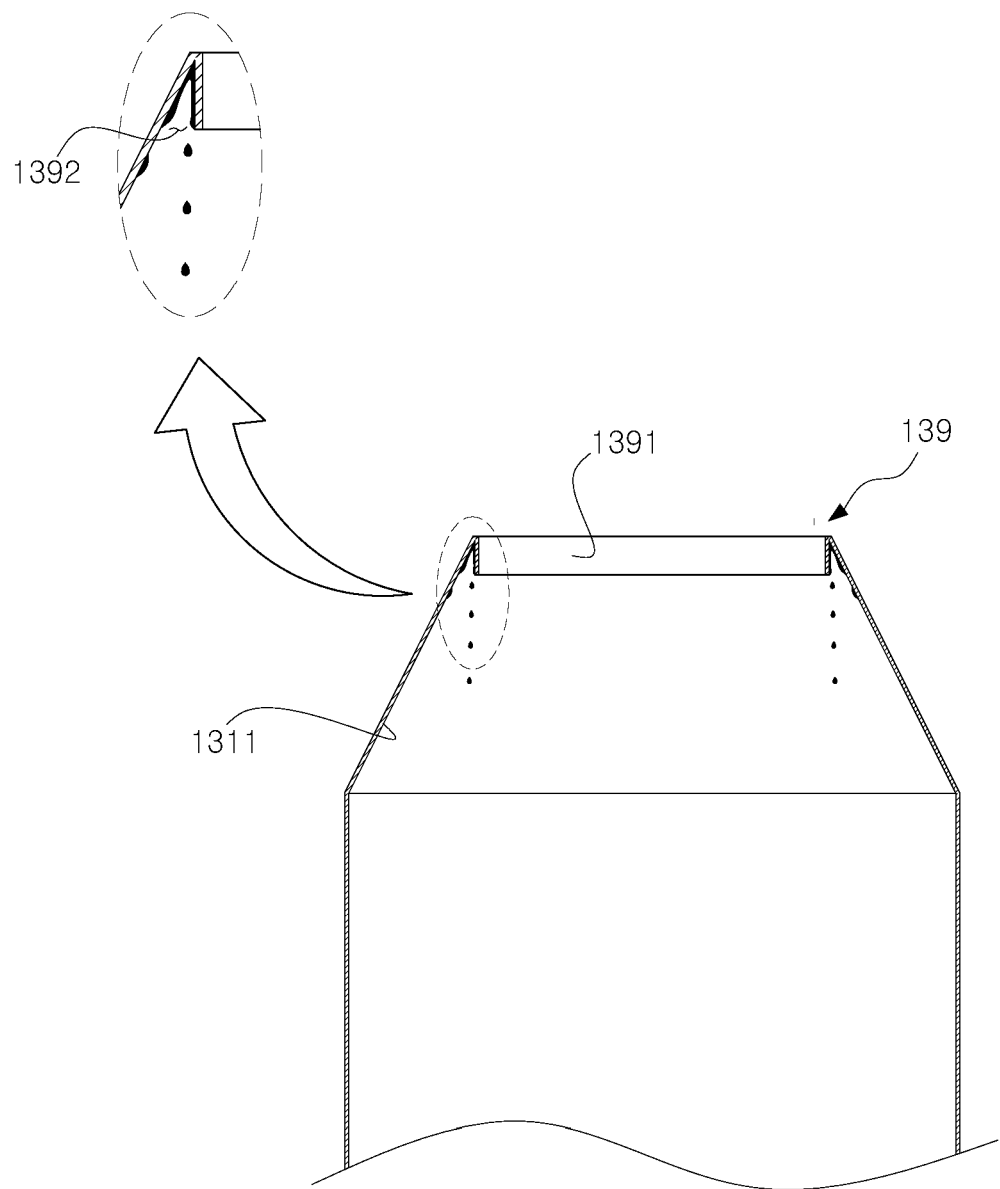
FIG. 25 is a reference diagram illustrating a droplet blocking process in FIG. 24.

The droplet blocker 139 blocks droplets rising along the inner wall 1311 of the postprocessor housing 131 and flowing out through the postprocessed gas outlet 1313. Referring to FIGS. 14, 24, and 25, the drop blocker 139 includes a blocking wall 1391. In addition, the droplet blocker 139 has a capturing space 1392 for capturing the droplets in the vicinity of the postprocessed gas outlet 1313 to prevent outflow of the droplets. The capturing space 1392 is shaped so as to allow the captured droplets to drop to the bottom.

The postprocessed gas outlet 1313 is formed in an upward direction at the top of the postprocessor housing 131, and the droplet blocker 139 includes the blocking wall 1391 extending down from the edge of the postprocessed gas outlet 1313. A capturing space 1392 is formed between the blocking wall 1391 and the inner wall of the upper portion of the postprocessor housing 131. The inner wall 1311 of the upper portion of the postprocessor housing 131 is inclined to converge toward the postprocessed gas outlet, and the blocking wall 1391 extends down in the vertical direction in order to effectively form the capturing space 1392 and efficiently block the outflow of the droplets.

Harmful substances are further removed from the preprocessed gas while the preprocessed gas rises along the flow path thereof formed inside the postprocessor 13, and the postprocessed gas obtained as a result of the removal of the harmful substances is discharged through the postprocessed gas outlet 1313. During the process, some of the droplets including the cleaning liquid capturing the harmful substances in the preprocessed gas rise along the inner wall 1311 of the postprocessor housing 131 and move toward the postprocessed gas outlet 1313.

The droplets reaching the vicinity of the edge of the postprocessed gas outlet 1313 along the upper inner wall 1311 of the postprocessor housing 131 are caught by the blocking wall 1391. In addition, since the capturing space 1392 is formed between the blocking wall 1391 and the inner wall 1311 of the postprocessor housing 131 around the postprocessed gas outlet 1313 for aggregating the droplets, the droplets aggregate in the capturing space 1392 to increase the size and weight thereof, thereby falling to the bottom of the postprocessor housing 131.

As described above, the droplet blocker 139 blocks droplets having captured harmful substances in the preprocessed gas from being discharged to the outside through the postprocessed gas outlet 1313 and facilitates separation of the droplets and falling thereof to the bottom of the postprocessor housing 131.

Next, an exhaust gas treatment apparatus 1b according to a second embodiment will be described.

Figure 26:
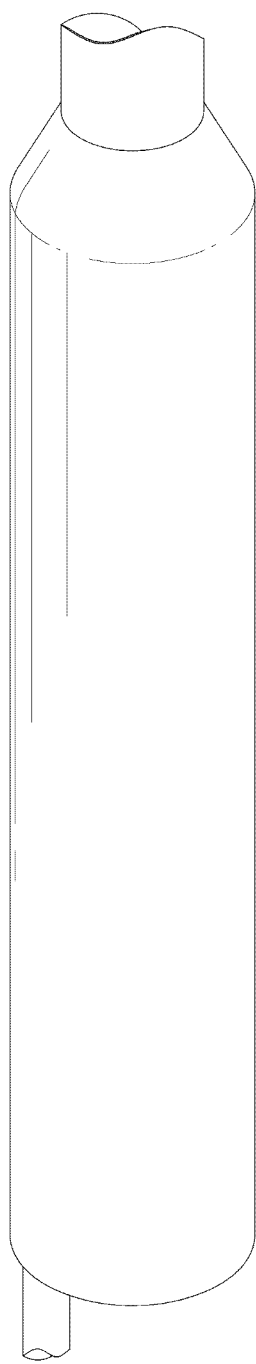
FIG. 26 is a perspective view of an exhaust gas treatment apparatus according to a second embodiment.

Referring to FIG. 26, the exhaust gas containing harmful substances, such as sulfur oxides (SOx), nitrous oxides (NOx), particulate matter (hereinafter, referred to as "PM"), and the like, flows from an engine or a boiler to an exhaust gas treatment apparatus 1b according to a second embodiment. The exhaust gas treatment apparatus 1b according to the second embodiment may include a housing 171 provided with a plurality of means for reducing the harmful substances in stages.

Figure 27:
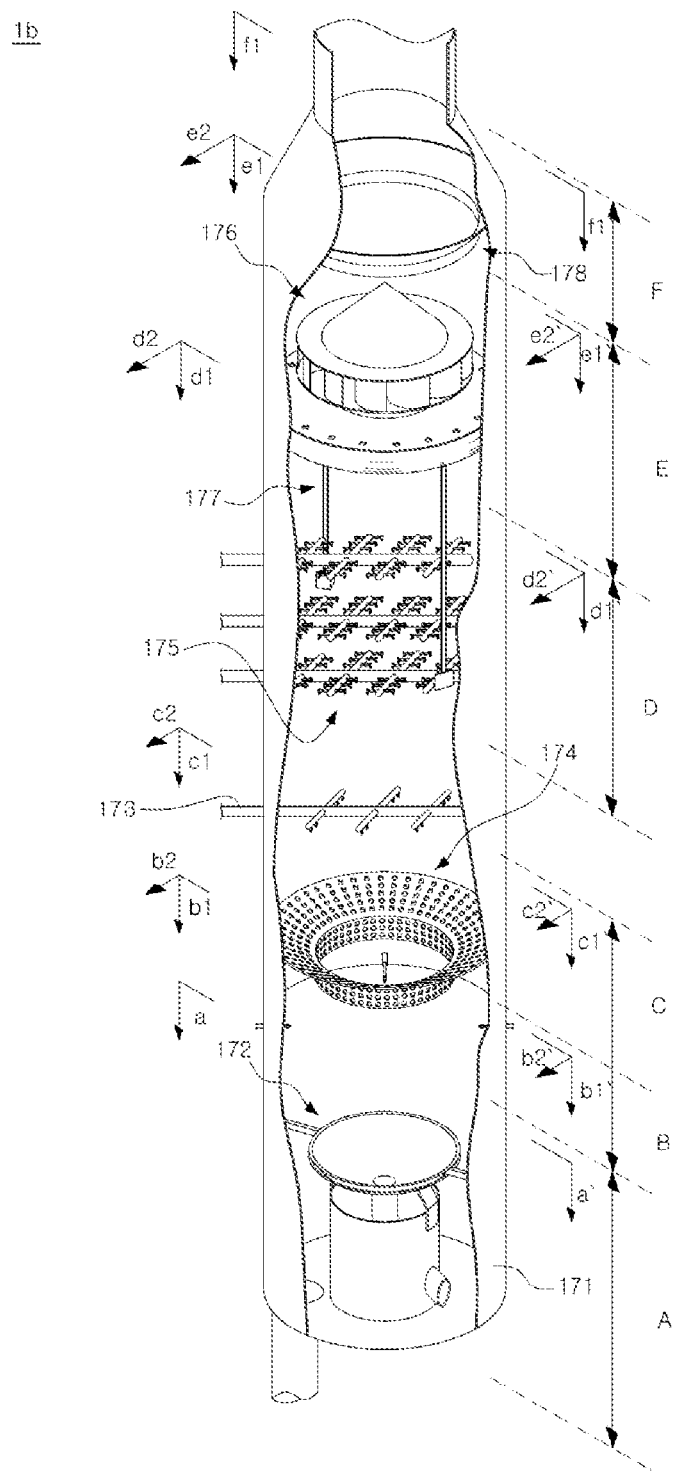
FIG. 27 is a cutaway perspective view of an exhaust gas treatment apparatus according to a second embodiment.
Figure 28:
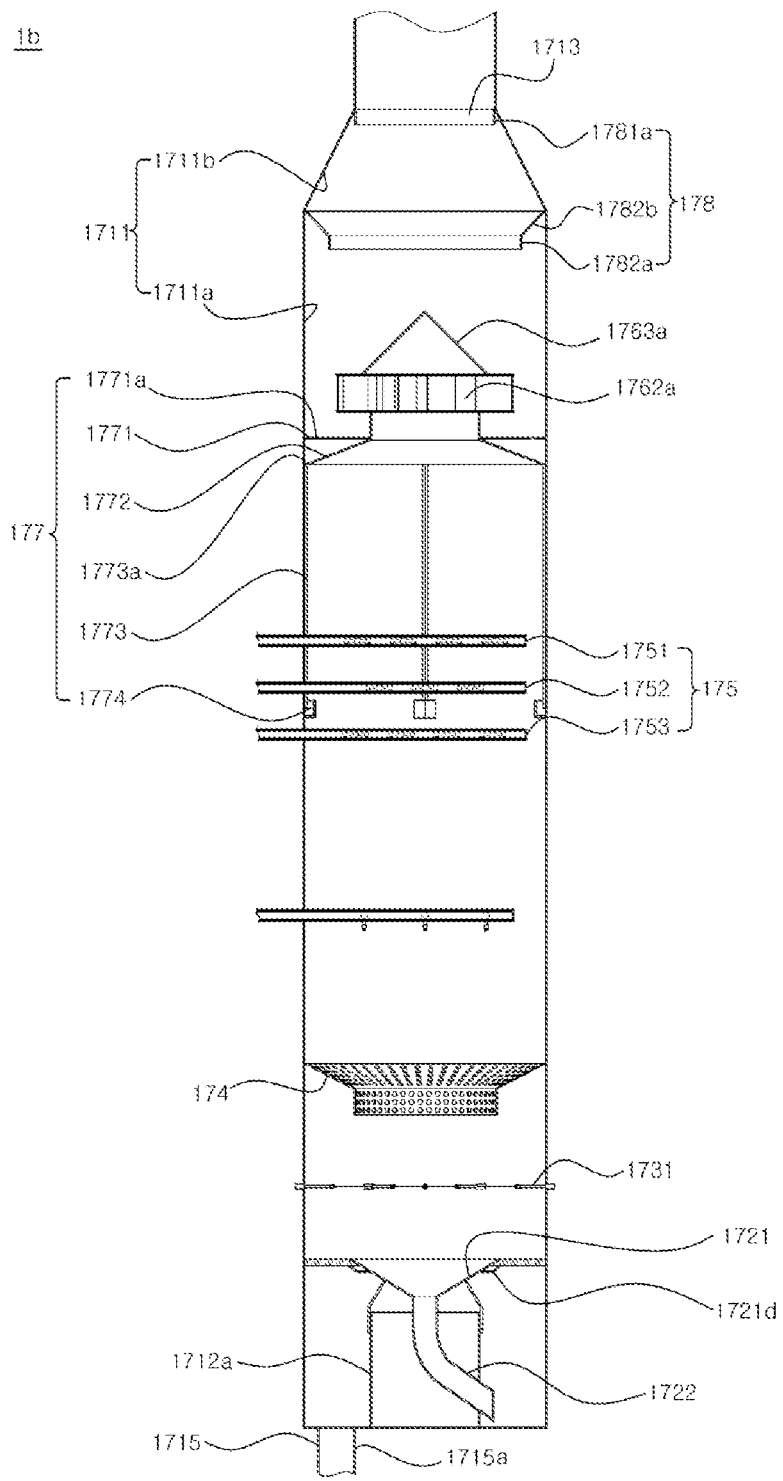
FIG. 28 is a cross-sectional view taken along the line f1-f1' in FIG. 27.

Referring to FIGS. 27 and 28, the housing 171 may be in the form of a large hollow container having any of various shapes, but generally a cylindrical housing 171 is provided. The housing 171 may have an inner wall 1711 forming the outer shape of the housing 171 on the side thereof, a gas inlet 1712 formed at the lower portion of the housing 171, through which exhaust gas is introduced, a cleaning liquid outlet 1715 through which the sprayed cleaning liquid is discharged, and a gas outlet 1713 provided at the top of the housing 171, through which the exhaust gas is discharged.

The inner wall 1711 may include a vertical surface 1711a extending straight in the vertical direction and an inclined surface 1711b extending from the vertical surface 1711a so as to be inclined toward the center in the vicinity of the gas outlet 1713. The cleaning liquid introduced from a sprayer 173, which will be described later, may flow up along the inner wall 1711 according to the flow of exhaust gas.

The gas inlet 1712 may include a gas inlet pipe 1712a that protrudes to the inside of the housing 171 and leads to one side of a diffuser 172, which will be described later. The gas inlet 1712 may be configured as any of various forms, and in general may be configured as a hollow cylinder that functions as a passage through which exhaust gas is introduced.

The cleaning liquid, washing harmful substances, flows down and is discharged to the outside of the housing 171 through the cleaning liquid outlet 1715. The cleaning liquid outlet 1715 may include a cleaning liquid discharge pipe 1715a extending downwards from one side of the bottom of the housing 171 by a predetermined length, which is generally formed in a hollow cylinder for discharging the cleaning liquid. In the case where the housing 171 is installed in a ship, the cleaning liquid accumulated at one side can be effectively discharged according to rolling in which the ship tilts from side to side and pitching in which the ship tilts forwards and backwards even if the bottom thereof is not provided sloped.

The clean gas from which harmful substances have been removed in the exhaust gas treatment apparatus 1b according to the second embodiment may be discharged into the air through the gas outlet 1713. The gas outlet 1713 has a big opening to discharge the clean gas therethrough, which may be connected to a droplet blocker 178, which will be described later, so as to block droplets rising along the inner wall 1711.

Next, various means for cleaning the exhaust gas introduced into the housing 171 of the exhaust gas treatment apparatus 1b in stages and ultimately discharging the clean gas from which sulfur oxides (SOx) and particulate matter (PM) are removed will be described with reference to FIGS. 27 to 56.

First, referring to FIGS. 27 and 28, the exhaust gas treatment apparatus 1b may include a diffuser 172 provided above the gas inlet 1712 and distributing the exhaust gas evenly inside the housing 171, a sprayer 173 for spraying cleaning liquid to the diffuser 172, a distributor 174 for dispersing the exhaust gas over the sprayer 173, a multi-sprayer 175 provided above the distributor 174 and including a plurality of sprayers arranged parallel to each other, a droplet separator 176 provided above the multi-sprayer 175 and inducing a spiral flow of exhaust gas, a droplet collector 177 for collecting separated droplets under the droplet separator 176, and a droplet blocker 178 for dropping the droplets rising along the inner wall 1711 in the vicinity of the gas outlet 1713.

Referring to FIGS. 29 to 32, the diffuser 172 may have a function of evenly dispersing the exhaust gas introduced through the gas inlet 1712 in the housing 171, and may include a gas diffuser 1721 having a shape that gets wider as it goes upwards and a discharge path 1722 for discharging the cleaning liquid accumulated inside the gas diffuser 1721 without disturbing the flow of the exhaust gas.

Figure 29:
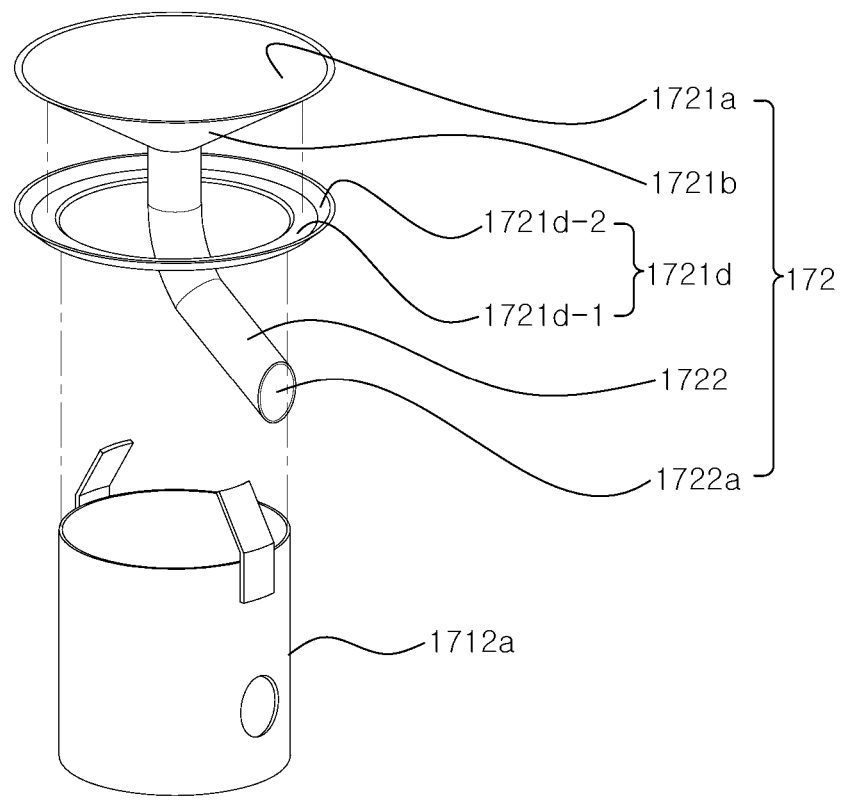
FIG. 29 is an exploded perspective view illustrating a diffuser of an exhaust gas treatment apparatus according to a second embodiment.
Figure 30:
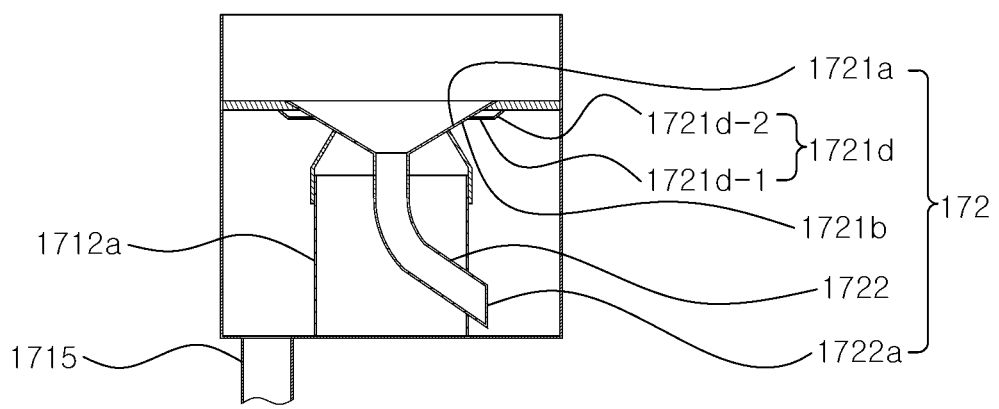
FIG. 30 is a cross-sectional view taken along the line a-a' in the section A in FIG. 27.

Referring to FIGS. 29 and 30, the gas diffuser 1721 may include thin inner and outer surfaces 1721a and 1721b, which are shaped such that the diameters thereof increases as it goes upwards and have a space therebetween, a rim 1721c constituting a boundary of the two surfaces 1721a and 1721b, and a blocking part 1721d extending toward the outside of the gas diffuser 1721 along the circumference of the outer surface 1721b.

The outer surface 1721b has a function by which the exhaust gas introduced through the gas inlet 1712 flows up along the outer surface 1721b to then be widely dispersed inside the housing 171.

The prior art is also equipped with a gas diffuser provided above the gas inlet, but the gas diffuser of the prior art has a shape that gets narrower as it goes upwards so that falling cleaning liquid flows down along the surface of the gas diffuser to disturb the flow of the exhaust gas. As a result, this causes pressure loss of the exhaust gas, thereby degrading the overall function of the exhaust gas treatment apparatus. In addition, the conventional gas diffuser usually has a triangular pyramidal or cone shape that gets narrower as it goes upwards. In this case, the exhaust gas introduced through the gas inlet collides with and bypasses the bottom surface of the cone and spreads widely inside the housing, thereby forming upward flow, which causes severe pressure loss. Although the pressure loss per unit height (mmAq/m) of the exhaust gas treatment apparatus is important enough to quantify and use as an indicator to represent the performance thereof, the pressure loss due to the conventional gas diffuser having the above configuration is enormous.

Therefore, since the gas diffuser 1721 according to the present disclosure has a shape that gets wider as it goes upwards and since the exhaust gas introduced through the gas inlet 1712 gradually disperses while flowing up along the outer surface 1721b of the gas diffuser 1721, the exhaust gas can be widely distributed inside the housing 171 without pressure loss. In particular, the gas diffuser 1721 has a shape that gets wider as it goes upwards, and may, preferably, have an inverted cone shape.

The inner surface 1721a may collect the cleaning liquid sprayed from the sprayer 173, which will be described later, and flowing down, and may not disturb the flow of the exhaust gas flowing up along the outer surface 1721b of the gas diffuser 1721, thereby preventing pressure loss.

The blocking part 1721d may be configured to extend outwards along the circumference of the outer surface 1721b so as to be positioned under the rim 1721c, and may include a first surface 1721d-1 extending horizontally and a second surface 1721d-2 extending vertically.

Figure 31:
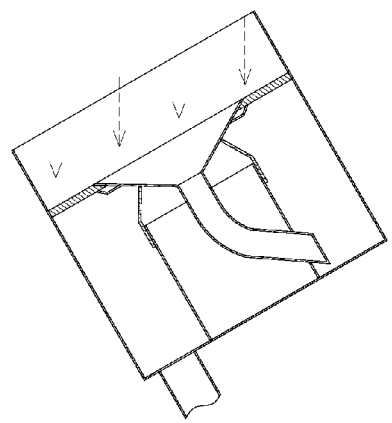
FIG. 31 is a cross-sectional view taken along the line a-a' in the section A in FIG. 27 and illustrating an inclined state due to rolling of a ship.

FIG. 31 illustrates the exhaust gas treatment apparatus 1b used in a ship in the state of pitching in which the ship tilts backwards and forwards due to waves, or rolling, in which the ship tilts from side to side when turning or the like. In this case, the housing 171 also tilts backwards and forwards or side to side, and if the gas diffuser 1721 tilts along with the housing 171 to the extent that the outer surface 1721b thereof deviates from the vertical line, the cleaning liquid sprayed from the sprayer 173, which will be described later, may flow into the gas inlet 1712. If the cleaning liquid flowing into the gas inlet 1712 flows back into the engine (E) or the boiler (B), there is a risk of causing serious problems such as failure. Therefore, in order to prevent the above problem, the blocking part 1721d should be designed to have a size determined in consideration of the size of the vessel, rolling and pitching angles, and the like. More specifically, the degree of outward protrusion of the blocking part 1721d from the outer surface 1721b may be adjusted by changing the length of the first surface 1721d-1 and the length of the second surface 1721d-2, thereby preventing backflow of the cleaning liquid into the gas inlet 1712 even when the ship is tilted. In this case, the angle at which the outer surface 1721b extends is also preferably designed in consideration of rolling and pitching.

In addition, the blocking part 1721d may be configured such that the cleaning liquid accumulated in the blocking part 1721d drops to the bottom of the housing 171, instead of flowing into the gas inlet 1712, when the rolling or pitching occurs. To this end, the extension angle of the second surface 1721d-2 is designed in consideration of rolling and pitching.

The discharge path 1722 is configured to discharge the cleaning liquid collected on the inner surface 1721a of the gas diffuser 1721 to the bottom of the housing 171 in order to prevent the cleaning liquid from overflowing, and is configured to lead to the inner surface 1721a at the lower portion of the gas diffuser 1721. In this case, the discharge path 1722 may be formed to extend to the inside of the gas inlet pipe 1712a, which is formed by the gas inlet 1712 protruding and extending into the housing 171, and may include a discharge outlet 1722a leading to the inner surface of the gas inlet pipe 1712a for discharge of the cleaning liquid. In this case, the discharge path 1722 is inclined so as to extend from the lower end of the gas diffuser 1721 to the inner surface of the gas inlet pipe 1712a so that the discharge outlet 1722a may be formed at one side of the gas inlet pipe 1712a.

The cleaning liquid discharged from the discharge path 1722 accumulates at the bottom of the housing 171, and the accumulated cleaning liquid is discharged to the outside of the exhaust gas treatment apparatus 1b through the cleaning liquid outlet 1715 extending down from one side of the bottom of the housing 171 at a predetermined angle. At this time, even if the cleaning liquid outlet 1715 is formed in one side of the bottom of the housing 171, and even if there is no separate inclined surface thereon, since the overall housing 171 is tilted due to pitching in which the ship tilts backwards and forwards due to waves or acceleration/deceleration during the travelling of the ship, or rolling, in which the ship tilts from side to side when turning or the like, the cleaning liquid can be effectively discharged, thereby preventing excessive accumulation of the cleaning liquid at the bottom. Tilting of the housing 171 can be seen in more detail in FIG. 31.

Figure 32:
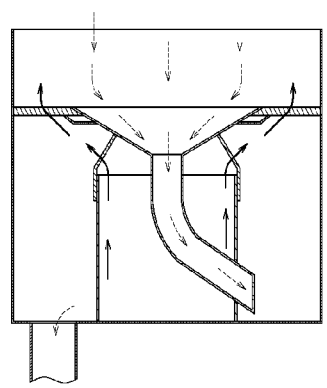
FIG. 32 is a cross-sectional view taken along the line a-a' in the section A in FIG. 27 and illustrating the flow of exhaust gas.

Referring to FIG. 32, it can be seen that the above configuration allows the cleaning liquid collected by the inner surface 1721a of the gas diffuser 1721 to drop without affecting the flow of the exhaust gas passing through the gas inlet pipe 1712a, thereby preventing the pressure loss thereof (see the dotted line), and allows the exhaust gas to naturally disperse inside the housing 171 without the pressure loss caused by the structure (see the solid line).

Referring to FIGS. 33 to 36, the sprayer 173 has a function of cleaning the exhaust gas containing sulfur oxides (SOx) and PM by spraying cleaning liquid thereon from the upper side of the diffuser 172. In particular, the sprayer 173 may include one or more lateral sprayers 1731 for spraying the cleaning liquid in the direction crossing the flow direction of the exhaust gas.

Figure 33:
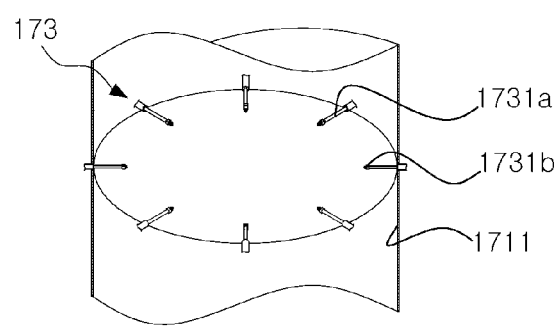
FIG. 33 is a perspective view illustrating sprayers of an exhaust gas treatment apparatus according to a second embodiment.

Referring to FIG. 33, the lateral sprayer 1731 may include a spray body 1731a and a spray nozzle 1731b for spraying cleaning liquid to the exhaust gas.

The spray body 1731a is a rod-shaped supply pipe for supplying cleaning liquid and is coupled to the inner wall 1711 of the housing 171. In the case of a cylindrical housing 171, the spray bodies 1731a may also be arranged in a circular pattern. In particular, if the spray body 1731a is located in a space formed to be recessed by a predetermined depth to the outside from the inner wall 1711, it is possible to prevent pressure loss attributable to the structure in which that the sprayer 1731 itself disturbs the flow of the exhaust gas.

The spray nozzle 1731b is formed at one end of the spray body 1731a to face the side surface of the housing and sprays the cleaning liquid toward the side surface.

The exhaust gas produced by combustion inside the engine (E) or the boiler (B) contains harmful substances, such as sulfur oxides (SOx), PM, and the like, which are acidic substances, and the sprayer 173 sprays cleaning liquid in order to remove the harmful substances by neutralizing or aggregating the same. In general, PM of 0.1 to 0.5 μm first agglomerates with microdroplets of 100 to 200 μm to become bigger in size. In addition, alkaline cleaning liquid is required in order to neutralize acidic sulfur oxides (SOx). In the case of using fresh water, separate alkaline additives are added to induce a neutralization reaction.

In this case, the alkaline additives may be NaOH (sodium hydroxide), $Na_2CO_3$ (sodium carbonate), $NaHCO^3$ (sodium bicarbonate), and the like. The neutralization reaction of sulfur oxides (SOx) by the cleaning liquid with NaOH added thereto is as follows.

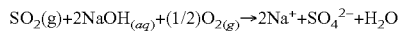

$$SO_2(g)+2NaOH_{(aq)}+(1/2)O_{2(g)} \rightarrow 2Na^+ + SO_4^{2-} + H_2O$$

However, in the case where the exhaust gas treatment apparatus 1b is installed in a ship travelling on the sea, seawater, which is brine, may be used. In general, seawater contains salts, such as sodium chloride (NaCl), magnesium chloride ($MgCl^2$), potassium chloride (KCl), and the like, and exhibits slight alkalinity of pH 7.8 to 8.3 due to anions Cl—, $SO_4^{2-}$, Br—, and the like, which are produced by dissolving of the salts. Therefore, if such seawater is used as cleaning liquid, it is possible to neutralize sulfur oxides (SOx) without adding separate alkaline additives.

In this case, the neutralization reaction by seawater is as follows. First, sulfur dioxide (SO2) in a gaseous state is mixed with water.

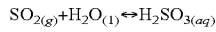

$$SO_{2(g)} + H_2O_{(l)} \leftrightarrow H_2SO_{3(aq)}$$

Next, it reacts with a base in seawater, as follows.

$$2H_2SO_{3(aq)} + OH^- \leftrightarrow 2HSO_{3(aq)}^- + H^+_{(aq)} + H_2O_{(aq)}$$

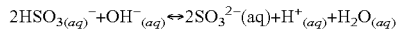

$$2HSO_{3(aq)}^- + OH^-_{(aq)} \leftrightarrow 2SO_3^{2-}(aq) + H^+_{(aq)} + H_2O_{(aq)}$$

In other words, sulfur dioxides are absorbed into the seawater to form sulfates.

The sprayer may spray two fluids, which further contain compressed air in addition to the cleaning liquid including seawater or fresh water, to disperse the cleaning liquid inside the housing 171, thereby increasing the contact area between the cleaning liquid and the exhaust gas and improving cleaning efficiency.

In addition, the cleaning liquid and the compressed air may have a function of lowering the temperature of the exhaust gas, as well as cleaning harmful substances such as sulfur oxides (SOx), PM, or the like in the exhaust gas, thereby cooling the exhaust gas. In general, the exhaust gas produced as a byproduct of combustion in the engine (E) and the boiler (B) is a high temperature gas having a temperature of about 250 to 300 degrees C. at the time of entering the housing 171. If the high-temperature exhaust gas is released into the air without treatment, it may cause many problems, and the high-temperature exhaust gas may also cause heat injury to various components in the housing 171 or may impede a cleaning operation due to quick evaporation of the cleaning liquid, and the like. In addition, even if the cleaning liquid is sprayed, the PM may pass without aggregation at a high temperature. Therefore, the sprayer 173 cools the high-temperature exhaust gas introduced into the housing 171 through the gas inlet 1712 down to about 50 to 60 degrees C. by spraying a double-fluid, which is a mixture of seawater or fresh water and compressed air, to the same.

The function of the sprayer 173 described above may be more effective if the contact area and contact time with the exhaust gas are increased. However, existing sprayers of the exhaust gas treatment apparatus spray the cleaning liquid in the same direction as the flow direction of the exhaust gas, thereby providing a small contact area and a short contact time. Therefore, it is impossible to perform an effective cleaning operation and cooling operation using the conventional sprayers.

In addition, since the exhaust gas treatment apparatus for cleaning and cooling sulfur oxides (SOx) and PM is 5 m or more in height, although there is no problem installing the exhaust gas treatment apparatus in a power plant on land, if the exhaust gas treatment apparatus is installed in a ship, the large volume thereof may limit ship design, and may spoil the appearance of the ship. However, since the sprayer according to the prior art sprays the cleaning liquid parallel to the flow direction of the exhaust gas, in order to secure a sufficient contact area between the cleaning liquid and the exhaust gas, the exhaust gas treatment apparatus has to be made longer.

In many cases of the prior art, the sprayer sprays the cleaning liquid from the top to the bottom against the flow of the exhaust gas. In this case, the forward flow of the exhaust gas is obstructed, causing severe pressure loss. As described above, the pressure loss of the exhaust gas treatment apparatus is important enough to be quantified (unit: mmAq/m) and used as an indicator to represent the performance thereof, but the prior art faces many obstacles in reducing the pressure loss.

Figure 34:
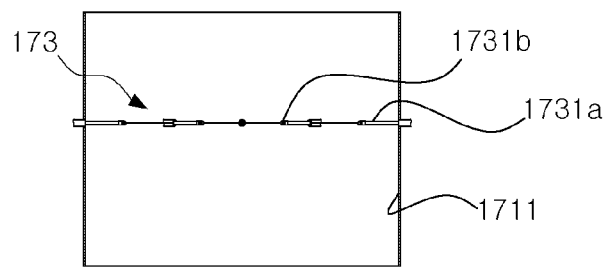
FIG. 34 is a cross-sectional view taken along the line b1-b1' in the section B in FIG. 27.
Figure 35:
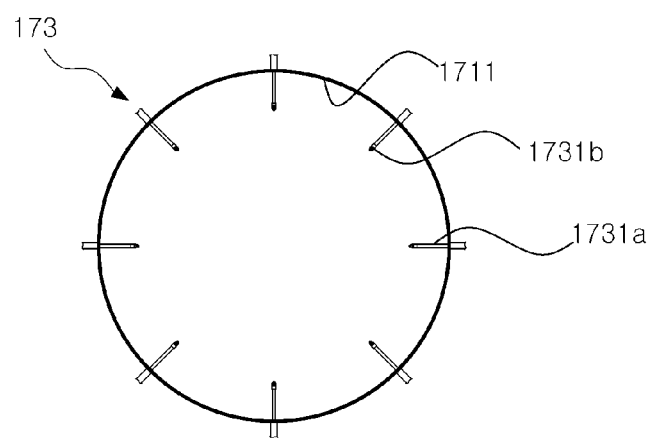
FIG. 35 is a cross-sectional view taken along the line b2-b2' in the section B in FIG. 27.

However, as can be seen in FIGS. 33 to 35, the exhaust gas treatment apparatus 1b includes the lateral sprayers 1731 inside the housing 171 so as to spray the cleaning liquid and the compressed air from the side relative to the flow of the exhaust gas so that a sufficient contact area and contact time between the exhaust gas and the cleaning liquid may be secured without increasing the length of the housing 171, thereby facilitating the neutralization reaction of sulfur oxides (SOx), aggregation of PM, and the cooling reaction of all of the exhaust gas. In particular, if the lateral sprayers are installed below an inclined portion 1741 of the distributor 174, which will be described later, it is possible to actively mix the exhaust gas with the cleaning liquid by spraying the cleaning liquid to the point where a vortex is formed. Furthermore, when the temperature is lowered by the above cooling, the air shrinks, and thus the volume thereof is reduced, thereby causing the PM particles to aggregate and become bigger. In addition, since force is applied from the side, there is no pressure loss in the flow direction of the exhaust gas. Preferably, the cleaning liquid is sprayed in a direction perpendicular to the flow direction of the exhaust gas.

Figure 36:
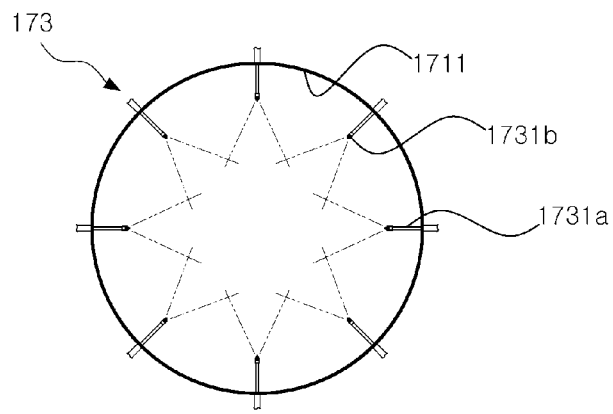
FIG. 36 is a conceptual diagram illustrating the state in which sprayers of an exhaust gas treatment apparatus spray cleaning liquid according to a second embodiment.

In addition, referring to FIG. 36, it is possible to maximize the contact area with the exhaust gas and the contact time thereof by distributing the two liquids, that is, the cleaning liquid and the compressed air, in a conical shape, thereby increasing operation efficiency.

Referring to FIGS. 37 to 40, the distributor 174 is positioned above the sprayer 173 and is configured as a mesh structure including a plurality of small through-holes 174a. The distributor 174 may include an inclined portion 1741 inclined to one side and a guide portion 1742 extending down from the bottom of the inclined portion 1741.

Figure 37:
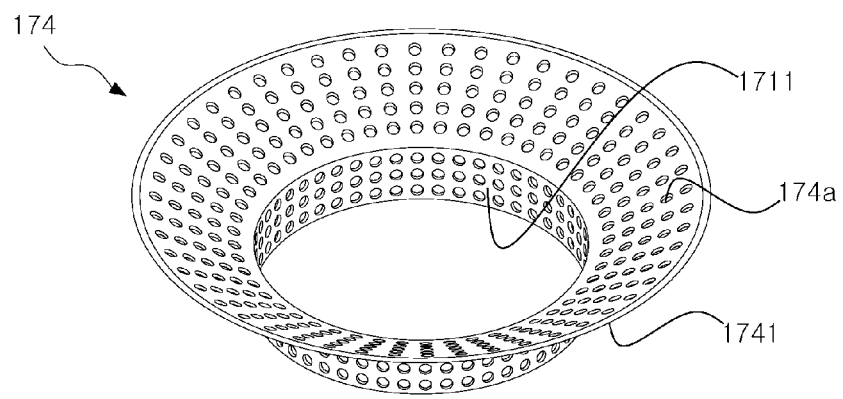
FIG. 37 is a perspective view illustrating a distributor of an exhaust gas treatment apparatus according to a second embodiment.
Figure 38:
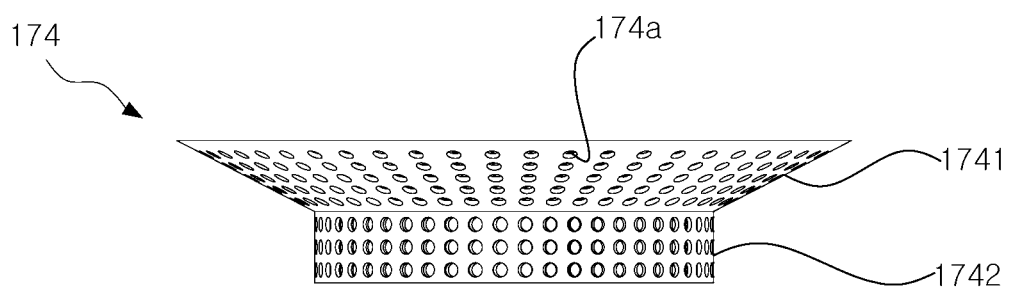
FIG. 38 is a cross-sectional view taken along the line c1-c1' in the section C in FIG. 27.

Referring to FIGS. 37 and 38, the inclined portion 1741 has a shape such that the diameter thereof increases as it goes upwards, which is intended to attract the flow of exhaust gas to the center and to form a vortex flow under the inclined portion 1741, thereby mixing the exhaust gas with the cleaning liquid.

The exhaust gas treatment apparatus 1b is required to evenly distribute the exhaust gas inside the housing 171 in order to increase the contact area and the contact time between the cleaning liquid and the exhaust gas for effective reaction thereof. The exhaust gas passing through the diffuser 172 tends to flow up to be deflected toward the inner wall 1711 of the housing 171 due to the influence of the inverted conical gas diffuser 1721. Therefore, in order to return the upward flow of the exhaust gas deflected to the inner wall 1711 to the center, the distributor 174 is configured to have a plurality of small through-holes 174a and an overall shape that gets wider as it goes upwards. This configuration causes the exhaust gas, which flows upwards while being deflected to the inner wall 1711 of the housing 171, to change its flow to the center by passing through the plurality of through-holes 174a inclined downwards and toward the center, to then be dispersed. In addition, some of the exhaust gas that has failed to move up through the through-holes 174a collides with the lower surface of the inclined portion 1741 and is diverted downwards to generate a vortex flow so that the cleaning liquid and the exhaust gas may be mixed and a neutralization reaction of sulfur oxides (SOx) and the aggregation reaction of PM may be actively performed, thereby improving the cleaning effect.

Figure 39:
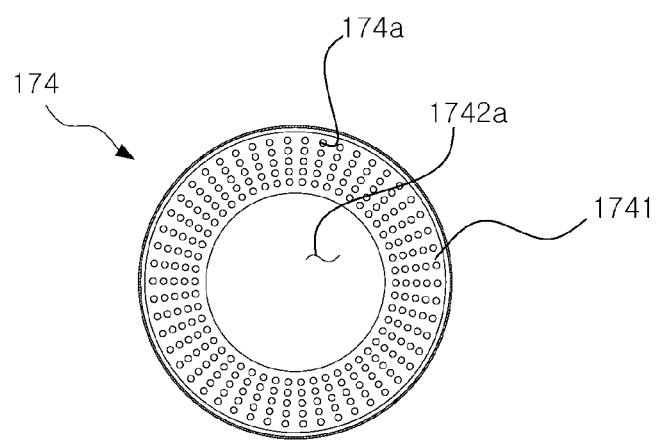
FIG. 39 is a cross-sectional view taken along the line c2-c2' in the section C in FIG. 27.
Figure 40:
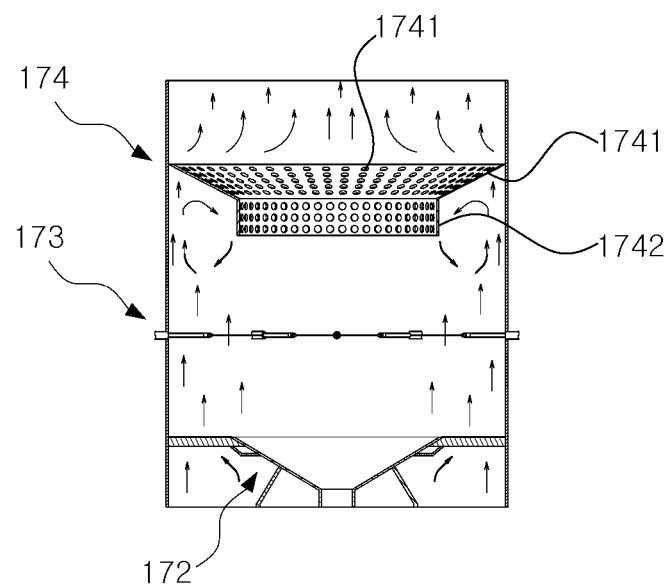
FIG. 40 is a cross-sectional view taken along the line c1-c1' in the sections A, B, and C in FIG. 27 and illustrating the flow of exhaust gas.

Referring to FIGS. 37 and 39, the guide portion 1742 has a large inlet opening 1742a in the center thereof and has an empty structure through which a large amount of exhaust gas may pass.

Figure 41:
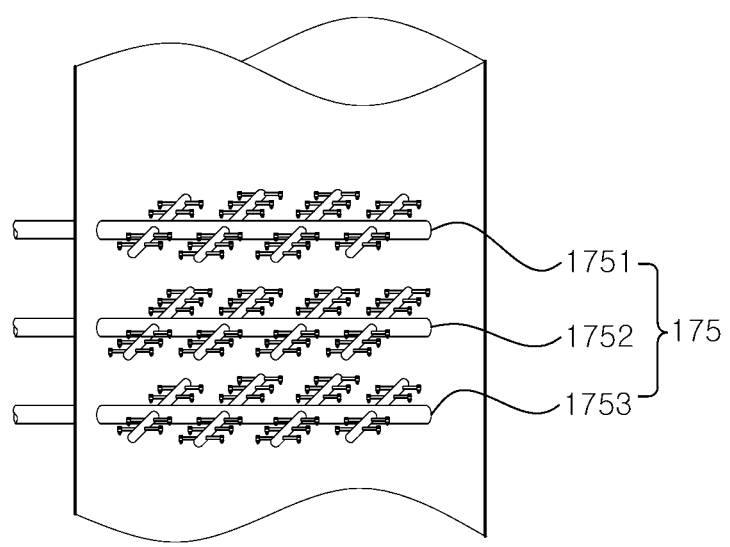
FIG. 41 is a perspective view illustrating a multi-sprayer of an exhaust gas treatment apparatus according to a second embodiment.

Although the above-described inclined portion 1741 has an effect of attracting the exhaust gas flowing on the side of the inner wall 1711 to the center, the large inlet opening 1742a is provided in the center of the distributor 174 to ensure more effective functional operation. The above configuration may uniformly distribute the exhaust gas, whirling and diverted under the inclined portion 1741, toward the center, thereby improving cleaning efficiency. In addition, the vertical guide portion 1742 guides the flow of exhaust gas in order to improve the above distribution effect. The flow of the exhaust gas is illustrated in FIG. 41.

Referring to FIGS. 41 to 44, the multi-sprayer 175 is located above the distributor 174 and includes a plurality of sprayers arranged in the vertical direction.

Figure 42:
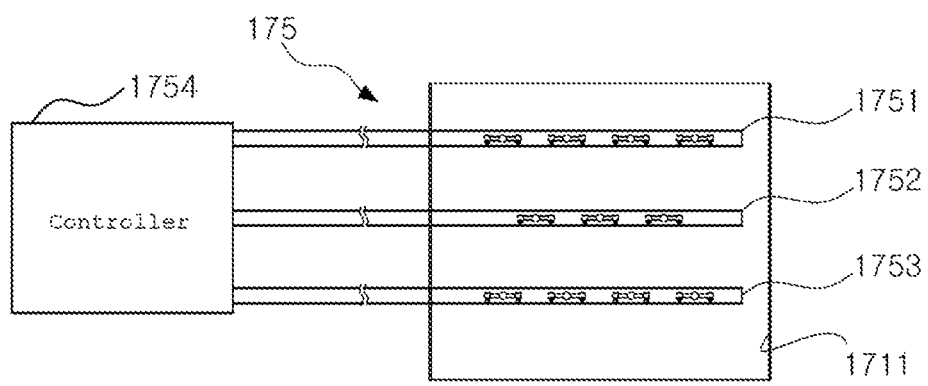
FIG. 42 is a cross-sectional view taken along the line d1-d1' in the section D in FIG. 27.

Referring to FIG. 42, the multi-sprayer 175 may include a first sprayer 1751, a second sprayer 1752, and a third sprayer 1753.

Figure 43:
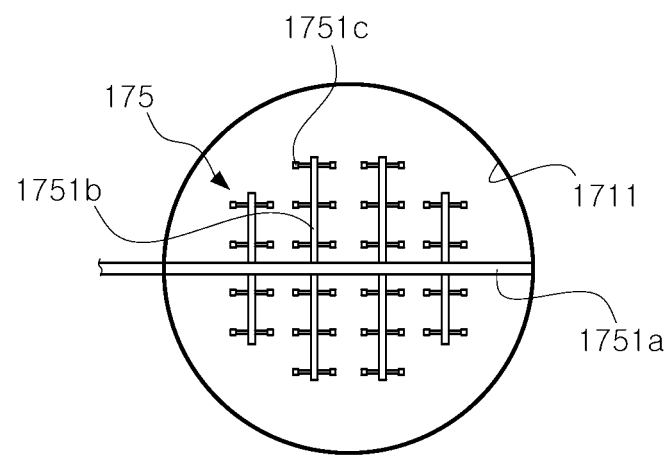
FIGS. 43 and 44 are cross-sectional views taken along the line d2-d2' in the section D in FIG. 27.

Referring to FIG. 43, the first sprayer 1751 may include a rod-type spray body 1751a, a plurality of spray rods 1751b branching side by side from the spray body 1751a at a predetermined interval, and a plurality of spray nozzles 1751c formed at a predetermined interval on the respective spray rods 1751b.

The spray body 1751a is a supply pipe for supplying cleaning liquid from the outside and is coupled to the inner wall 1711 of the housing 171.

The spray rod 1751b may branch from the spray body 1751a to spray the cleaning liquid to a larger space, and may be arranged alternately with the spray rods 1752b of the second sprayer 1752, thereby maximizing the contact area with the exhaust gas. In addition, it is possible to prevent harmful substances from being released into the air by eliminating a dead zone of the exhaust gas.

A plurality of spray nozzles 1751c is provided at predetermined positions of the spray rod 1751b to spray a mixture of the cleaning liquid and the compressed air.

Figure 44:
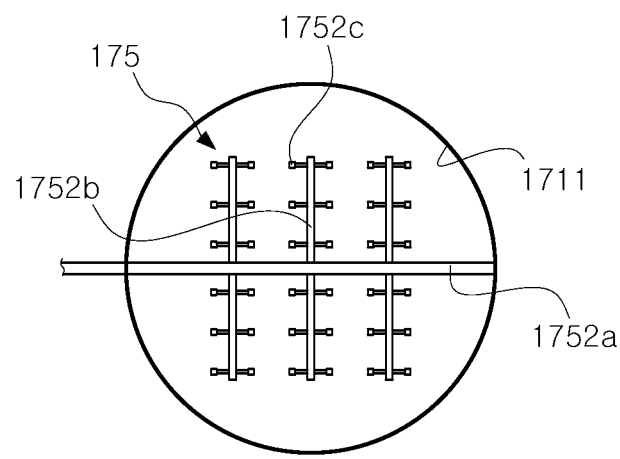

Referring to FIG. 44, the second sprayer 1752 also includes a spray body 1752a, spray rods 1752b, and spray nozzles 1752c, and the spray rods 1752b are alternately arranged as described above. This configuration may maximize the contact area between the cleaning liquid sprayed by the respective sprayers and the exhaust gas, so that the neutralization reaction of sulfur oxides (SOx) and the aggregation reaction of PM may be effectively performed.

In addition, the first sprayer 1751 and the second sprayer 1752 may be selectively operated according to the operation state of the engine (E), the boiler (B), or the like. In this case, a controller 1754 may be further included for selective spraying so as to flexibly control the spray in response to the driving state of the engine or the boiler.

In general, the operation of the engine (E) used in ships constantly changes according to the case where the ship is accelerating or decelerating, where a drilling machine is operated for seabed drilling, or where the use of the power system is increased. In addition, the operation of the boiler (B) also varies depending on time, such as on hot summer days, on which the boiler is rarely used, cold winter days, on which the boiler is frequently used to maintain the body temperature of the crews and control the cargo temperature, or the like. The change in the operation state of the engine (E) or the boiler (B) described above means that the amount of fuel combustion changes. In addition, the change in the amount of fuel combustion changes the amount of exhaust gas produced by combustion of the fuel. As a result, if the amount of exhaust gas changes, the amount of harmful substances, such as sulfur oxides (SOx), PM, and the like, also changes.

However, if the amount of the cleaning liquid sprayed by the exhaust gas treatment apparatus 1b is constant even in the case where the amount of exhaust gas decreases, it means that excessive cleaning liquid is sprayed. A pump is required to be operated in order to spray the cleaning liquid, and unnecessary spraying wastes the power consumed by the pump. In addition, unlike the case of spraying the cleaning liquid using seawater of about pH 8.3, which is slightly alkaline, the cleaning liquid using fresh water requires alkaline additives. Thus, if excessive cleaning liquid is sprayed, the alkaline additives are also wasted. Therefore, it is necessary to adjust the amount of cleaning liquid spray depending on the amount of exhaust gas, which varies depending on the operation state of the engine (E) or boiler (B).

In order to solve the above problems, the multi-sprayer 175 of the exhaust gas treatment apparatus 1*b* selectively operates the first sprayer 1751 or the second sprayer 1752 according to the operation rate of the engine (E) or the boiler (B), thereby spraying the cleaning liquid. According to the above configuration, in the case where a small amount of exhaust gas is discharged, only some of the sprayers are operated to spray the cleaning liquid, thereby preventing waste of power for the operation of the pump and saving alkaline additives.

In addition, the multi-sprayer 175 further includes a third sprayer 1753 above the first sprayer 1751 and the second sprayer 1752, thereby efficiently cleaning harmful substances in the exhaust gas.

In this case, similar to the relationship between the first sprayer 1751 and the second sprayer 1752, the third sprayer 1753 is alternately disposed with the second sprayer 1752, thereby increasing the contact area between the cleaning liquid and the exhaust gas and more effectively inducing the neutralization reaction of sulfur oxides (SOx) and the aggregation of PM.

In addition, the third sprayer 1753 also operates selectively in response to the amount of exhaust gas, which varies depending on the operation rate of the engine (E) or the boiler (B), to prevent waste of power of the pump for supplying the cleaning liquid and to save alkaline additives.

The first sprayer 1751, the second sprayer 1752, and the third sprayer 1753 may be configured to spray a double fluid containing cleaning liquid including seawater or fresh water and compressed air faster and over a wider area such that the double fluid reaches far, thereby increasing the contact time and the contact area of the sulfur oxides (SOx) and the cleaning liquid for an effective neutralization reaction. In addition, the cooling operation by the compressed air may be performed more effectively.

Referring to FIGS. 45 to 52, the droplet separator 176 is located above the multi-sprayer 175, and is roughly divided into two types.

Figure 45:
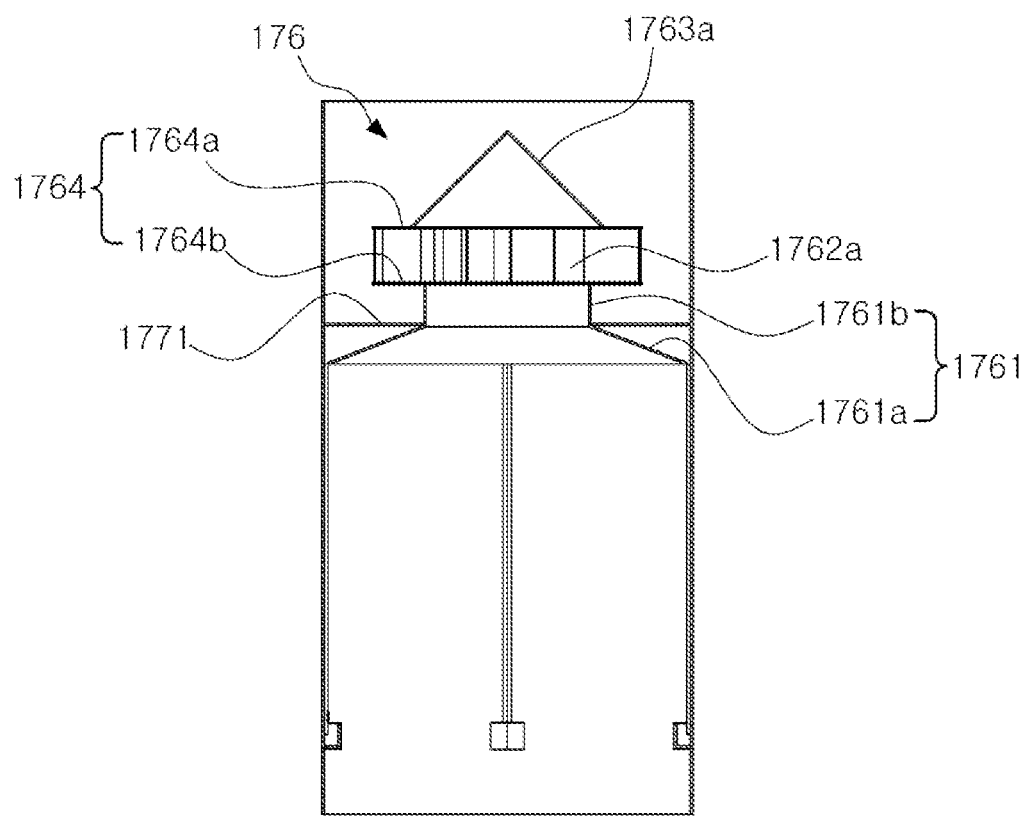
FIG. 45 is an exploded perspective view illustrating a first type of droplet separator of an exhaust gas treatment apparatus according to a second embodiment.

Referring to FIG. 45, the first type of droplet separator may include a guide part 1761 for guiding the flow of the exhaust gas flowing up while being cleaned by the cleaning liquid, one or more horizontal blades 1762*a* making a spiral flow of the exhaust gas flowing up through the guide part 1761, a cap 1764 for blocking the flow of the exhaust gas above/under the blades 1762*a* and guiding the exhaust gas to flow in a predetermined direction, and a first negative-pressure prevention means 1763*a* for preventing the differential pressure on the upper side of the horizontal blades 1762*a*.

Figure 49:
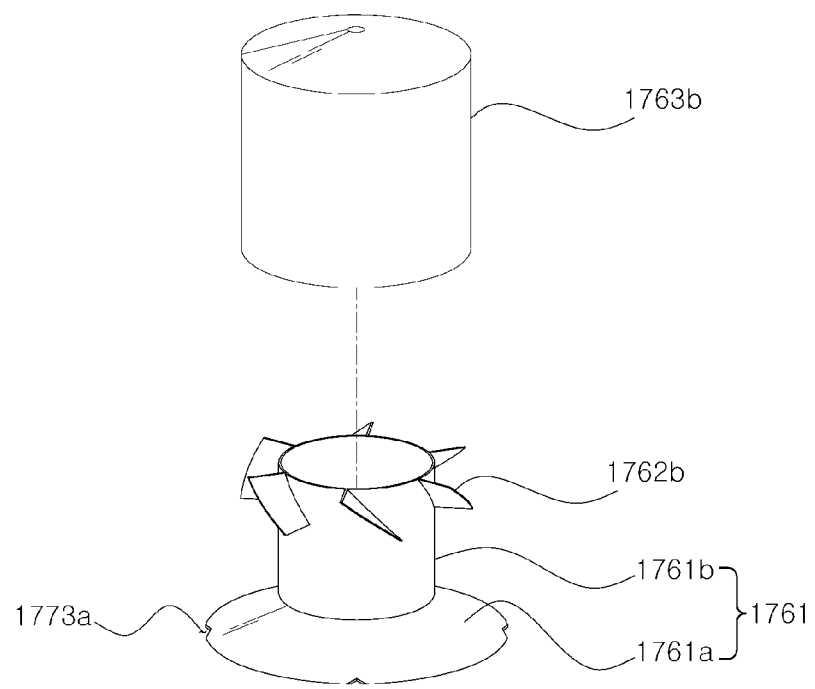
FIG. 49 is an exploded perspective view illustrating a second type of droplet separator of an exhaust gas treatment apparatus according to a second embodiment.
Figure 50:
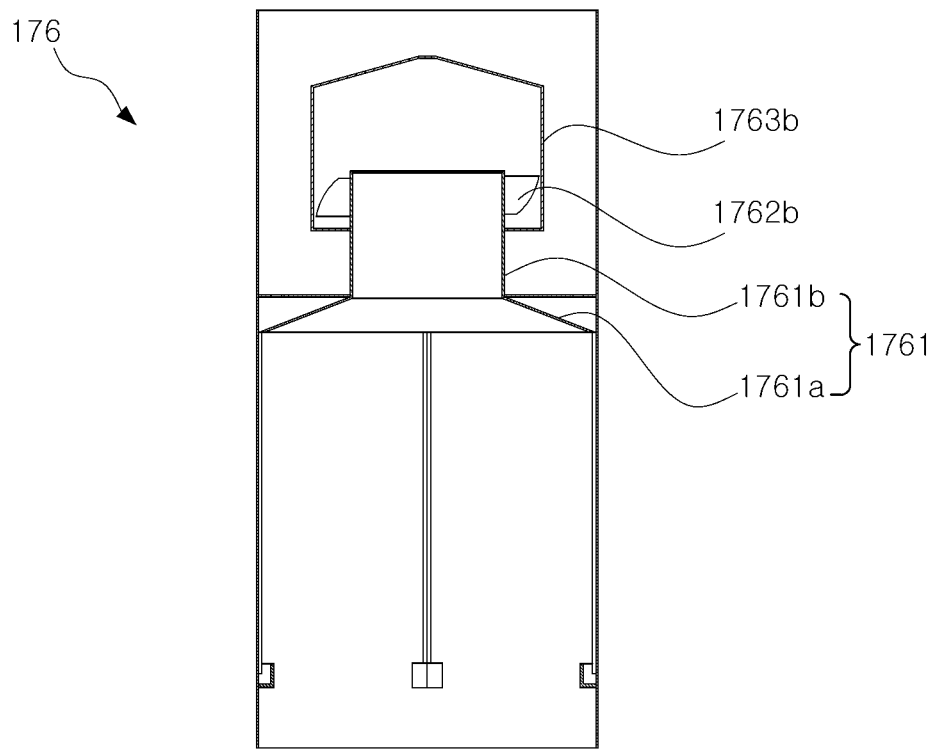
FIG. 50 is a cross-sectional view taken along the line e1-e1' in the section E in FIG. 27.

Referring to FIG. 49, the second type of droplet separator may include a guide part 1761 for guiding the flow of the exhaust gas flowing up while being cleaned by the cleaning liquid, one or more torsion blades 1762*b* for making a spiral flow of the exhaust gas flowing up through the guide part 1761, and a second negative-pressure prevention means 1763*b* for preventing the differential pressure on the upper side and the lateral side of the torsion blades 1762*b*.

Referring to FIGS. 45, 46, 49, and 50, the guide part 1761, which is an element common to both types, may include a guide plate 1761*a* having a shape that gets narrower as it goes upwards and a guide pipe 1761*b* extending up from the top of the guide plate 1761*a*.

The guide plate 1761*a* is preferably formed in the shape of a hollow truncated cone, and has a function of guiding the exhaust gas flowing up through the multi-sprayer 175 to the center. In this case, the guide plate 1761*a* may have a circumference corresponding to the cross section of the housing 171 so as to hermetically and snugly fit the inner wall 1711 thereof, thereby guiding the exhaust gas to one side without leakage of the exhaust gas.

The guide pipe 1761*b* may be formed to extend upwards from the top of the guide plate 1761*a* so as to serve as a passage through which the exhaust gas guided to one side by the guide plate 1761*a* flows upwards and to this end, may be configured in a hollow cylindrical shape.

Figure 46:
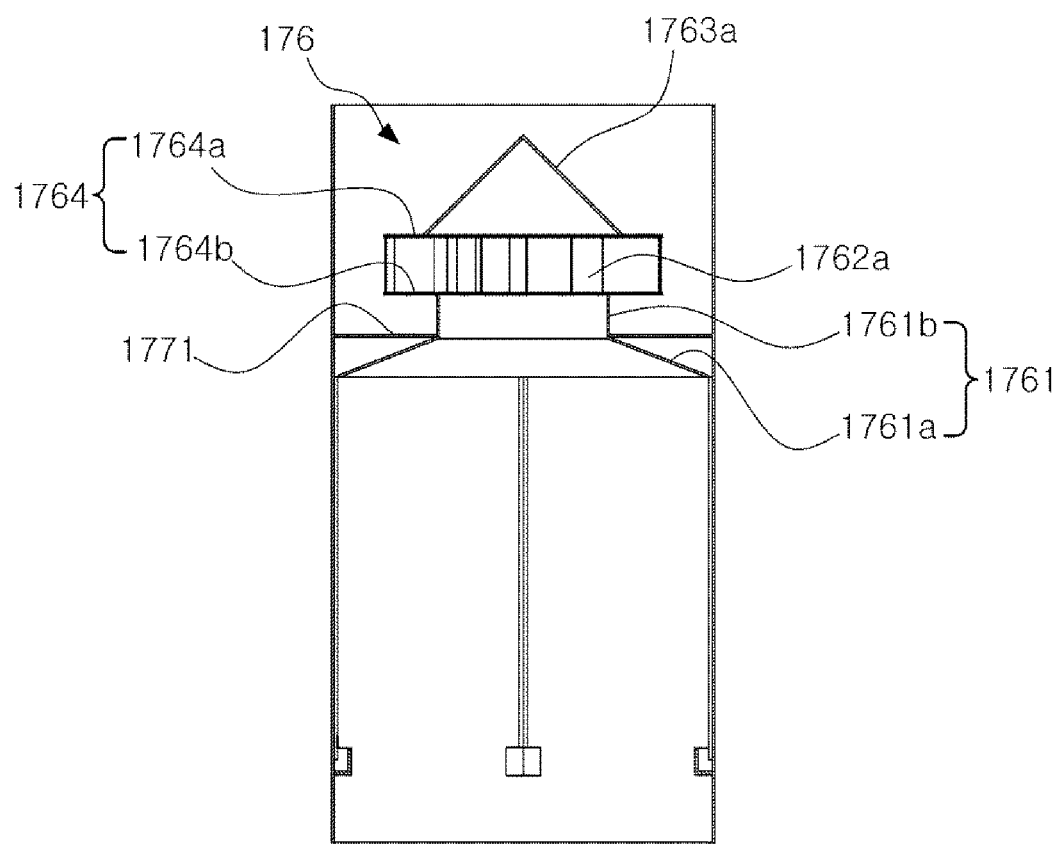
FIG. 46 is a cross-sectional view taken along the line e1-e1' in the section E in FIG. 27.

Referring to FIG. 46, one or more horizontal blades 1762*a* of the first type of droplet separator are arranged to stand side by side on the lower plate 1764*b*, which will be described later, and each blade has a predetermined curvature. In addition, the horizontal blades 1762*a* are spaced a predetermined distance apart from each other so as to allow the exhaust gas to pass therebetween. The horizontal blades 1762*a* having the above shape induces a radial flow, in which the exhaust gas moving up through the guide pipe 1761*b* flows in a spiral pattern to the side.

The cleaning liquid sprayed from the multi-sprayer 175 is present in the form of small droplets in the exhaust gas while containing a large amount of harmful substances such as sulfur oxides (SOx), PM, and the like. Therefore, the cleaning liquid must be prevented from being discharged along with the exhaust gas to the atmosphere. To this end, the blades 1762*a* induces a spiral flow of the exhaust gas, and the relatively heavy droplets are moved outwards to the inner wall 1711 by the centrifugal force generated by the spiral flow of the exhaust gas, so that the exhaust gas and the droplets may be separated from each other.

In addition, all of the horizontal blades 1762*a* may include stationary stators because, if the horizontal blades 1762*a* rotate along with a compressor, the speed thereof is too high to obtain sufficient contact time between the exhaust gas and the cleaning liquid, thereby lowering cleaning efficiency.

The cap 1764 may include an upper plate 1764*a* and a lower plate 1764*b* that cover upper and lower sides of the horizontal blades 1762*a*, respectively, to prevent the exhaust gas from escaping up and down without forming a spiral flow. In the case where the horizontal blades 1762*a* are arranged in a circle, the upper plate 1764*a* and the lower plate 1764*b* may be configured as a circular plate.

If the exhaust gas is made to flow in a spiral pattern by the blades 1762*a*, centrifugal force is applied to the fluid to be directed to the inner wall 1711, so that the center of flow has a relatively low pressure. In this case, the spiral flow may not be appropriately formed due to the differential pressure, or the upward movement of the exhaust gas may be hindered because the pressure is lower than that of the air on the upper side. Therefore, it is necessary to prevent the negative pressure by placing a mass in the center of the spiral flow.

Accordingly, the first negative-pressure prevention means 1763*a* may be positioned above the horizontal blades 1762*a* so as to prevent a differential pressure due to the spiral flow of the exhaust gas, and preferably may have a conical shape on the upper plate 1764*a*. The flow of the exhaust gas by the first negative-pressure prevention means 1763*a* can be seen in FIG. 48.

Figure 51:
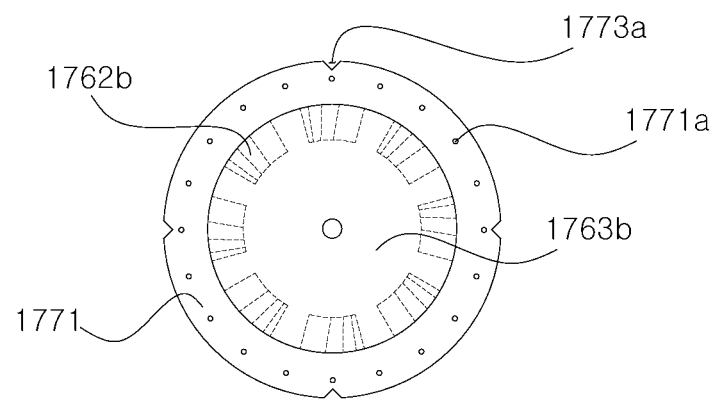
FIG. 51 is a cross-sectional view taken along the line e2-e2' in the section E in FIG. 27.
Figure 52:
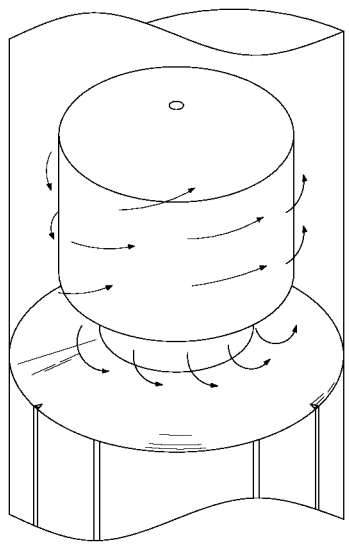
FIG. 52 is a perspective view illustrating the flow of exhaust gas by the second type of droplet separator of an exhaust gas treatment apparatus according to a second embodiment.

Referring to FIGS. 49 and 51, one or more torsion blades 1762*b* are arranged on the outer surface of the guide pipe 1761*b* so as to radially extend from the outer surface of the guide pipe 1761*b* toward the inner wall 1711 of the housing 171 by a predetermined length. At this time, the torsion blade 1762 may be configured in a twisted form overall such that the angle (stagger angle "a") between the chord at the root in contact with the outer surface of the guide pipe 1761b and the axis of the guide pipe 1761b is different from the angle (stagger angle "b") between the chord at the tip and the axis of the guide pipe 1761b. In general, the angle "b" is greater than the angle "a". The torsion blade 1762b twisted as described above guides an oblique flow in which the air exiting the guide pipe 1761b spreads down in a spiral pattern. Preferably, the stagger angle gradually increases as it goes from the root to the tip, thereby more effectively guiding the exhaust gas flow.

Referring to FIG. 51, the torsion blades 1762b are spaced apart from each other so that a sufficient space is formed therebetween when viewed from above, and, preferably, the torsion blades 1762b may be arranged at an interval of 30 degrees. Thereby, it is possible to minimize the pressure loss of the exhaust gas exiting the guide pipe 1761b and to produce a spiral bypass flow. In addition, all of the torsion blades 1762b may include stationary stators because, if the torsion blades 1762b rotate along with a compressor, the speed thereof is too high to obtain sufficient contact time between the exhaust gas and the cleaning liquid, thereby lowering cleaning efficiency.

The second negative-pressure prevention means 1763b may extend to the bottom of the torsion blade 1762b so as to cover both the torsion blades 1762b and the guide pipe 1761b, so that the exhaust gas flowing up through the guide pipe 1761b may make a detour and escape downwards. As a result, when the droplets of the cleaning liquid containing harmful substances in the exhaust gas are separated by centrifugal force, they are also forced downwards so that effective separation is possible. The second negative-pressure prevention means 1763b is formed in the form of a hollow cylinder for the flow of exhaust gas, and preferably has a cylindrical shape to effectively prevent the differential pressure. Alternatively, a first negative-pressure prevention means 1763a in a conical shape may be further provided on the second negative-pressure prevention means 1763b. The spiral bypass flow of the exhaust gas due to the above configuration is illustrated in more detail in FIG. 52.

Figure 53:
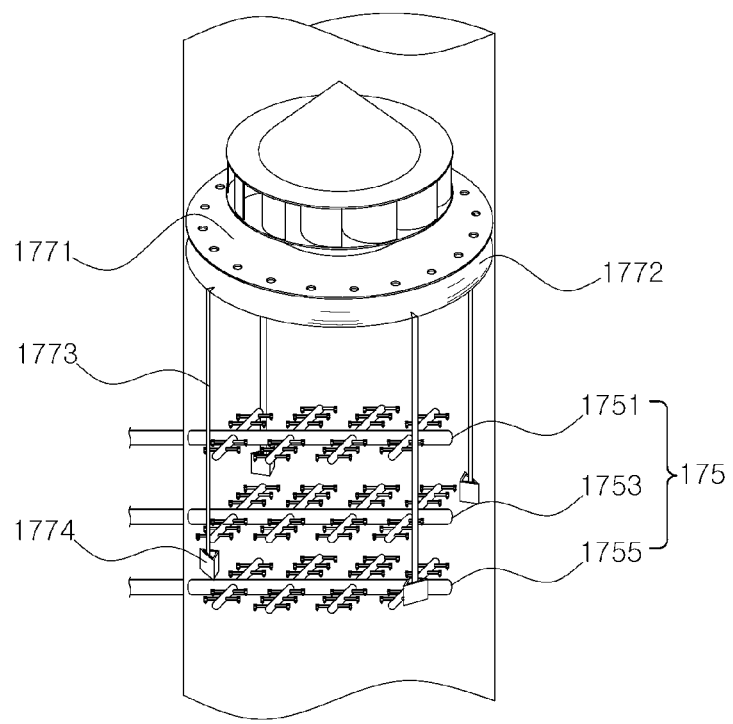
FIG. 53 is a perspective view illustrating the sections D and E in FIG. 27.
Figure 54:
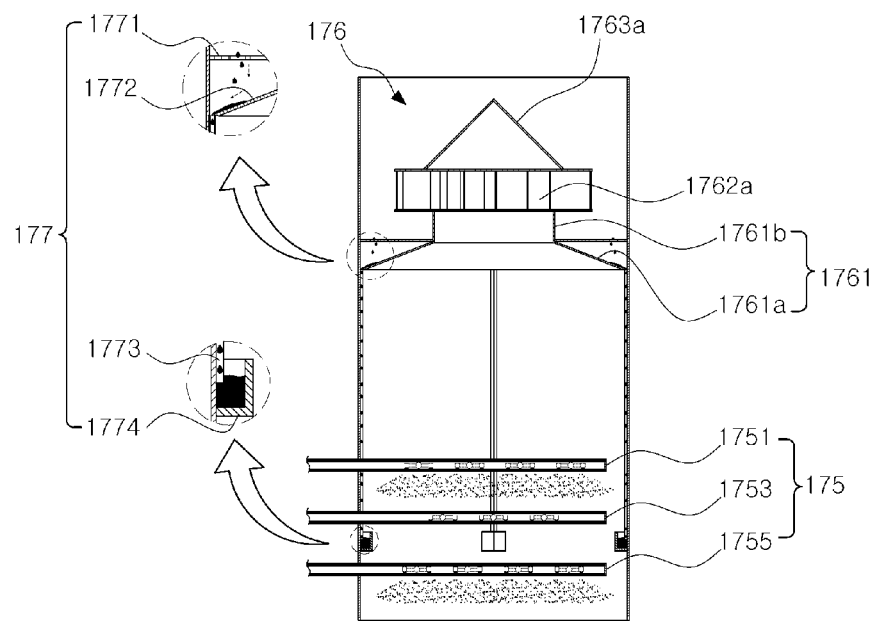
FIG. 54 is a cross-sectional view taken along the line e1-e1' in the sections D and E in FIG. 27.

Referring to FIGS. 53 and 54, the droplet collector 177 may be configured to collect droplets separated from the exhaust gas under the droplet separator 176, and may include a partition plate 1771 surrounding the guide pipe 1761b and having the same shape as the cross section of the housing 171, an inclined plate 1772 having the same configuration as the guide plate or extending in parallel thereto, a drop pipe 1773 extending downwards from one side of the inclined plate 1772, and a collecting container 1774 located at the lower end of the drop pipe 1773.

The droplet separator 176 is configured to separate droplets from the exhaust gas and deflects cleaning liquid containing harmful substances, such as sulfur oxides (SOx), PM, and the like, to the inner wall 1711 by means of centrifugal force. The separated droplets is required to drop to the bottom before rising again due to the influence of the flow of the exhaust gas, and it is necessary to prevent the exhaust gas from rising through the passage in which the droplets drop.

Figure 47:
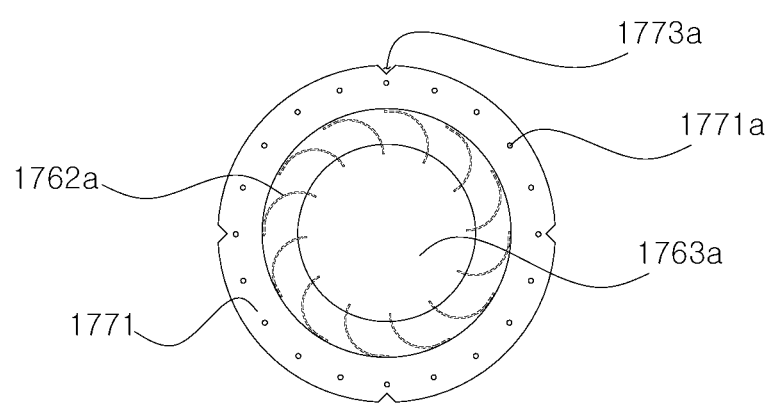
FIG. 47 is a cross-sectional view taken along the line e2-e2' in the section E in FIG. 27.
Figure 48:
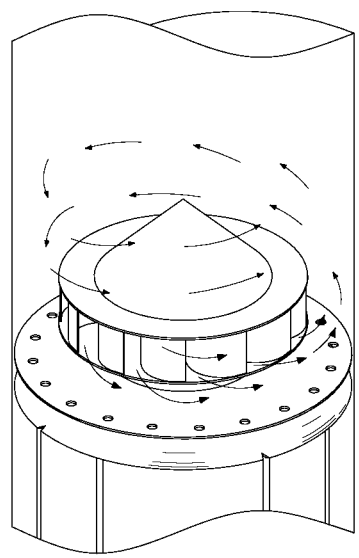
FIG. 48 is a perspective view illustrating the flow of exhaust gas by the first type of droplet separator of an exhaust gas treatment apparatus according to a second embodiment.

Referring to FIGS. 47, 51, and 53, the partition plate 1771 includes a plurality of through-holes 1771a in the vicinity of the circumference thereof, through which the droplets separated by the droplet separator 176 drops. In the case where the exhaust gas treatment apparatus 1b is installed in a ship, the droplets may flow into the through-holes 1771a due to rolling and pitching of the ship, even if the partition plate 1771 is not included.

The inclined plate 1772 extends to have a predetermined inclination such that the droplets passing through the through-holes 1771a in the partition plate 1771 may flow outwards, and preferably has a conical shape. One or more drop holes 1773a are provided at one side of the inclined plate 1772 to allow the droplets flowing outwards to drop, and preferably, four drop holes are provided at an interval of 90 degrees.

The drop pipe 1773 extends down from the drop hole 1772a formed at one side of the inclined plate 1772 so as to drop the droplets to the bottom of the housing 171. Although the drop pipe 1773 may have any of various shapes, the drop pipe 1773 preferably has a cross section matching the drop hole 1772a. Since the drop hole 1772a is configured in a triangle in the case of FIG. 29, the drop pipe 1773 may also have the shape of a triangular prism.

Referring to FIGS. 53 and 54, the collecting container 1774 collects droplets dropping through the drop pipe 1773 and is located below the third sprayer 1753 so as to always be full of the sprayed cleaning liquid. In addition, if the drop pipe 1773 extends to the inside of the collecting container 1774 such that the end thereof is completely immersed in the cleaning liquid sprayed from the third sprayer 1753, the exhaust gas is prevented from rising along the drop pipe 1773 and being discharged without passing through the droplet separator 176.

Figure 55:
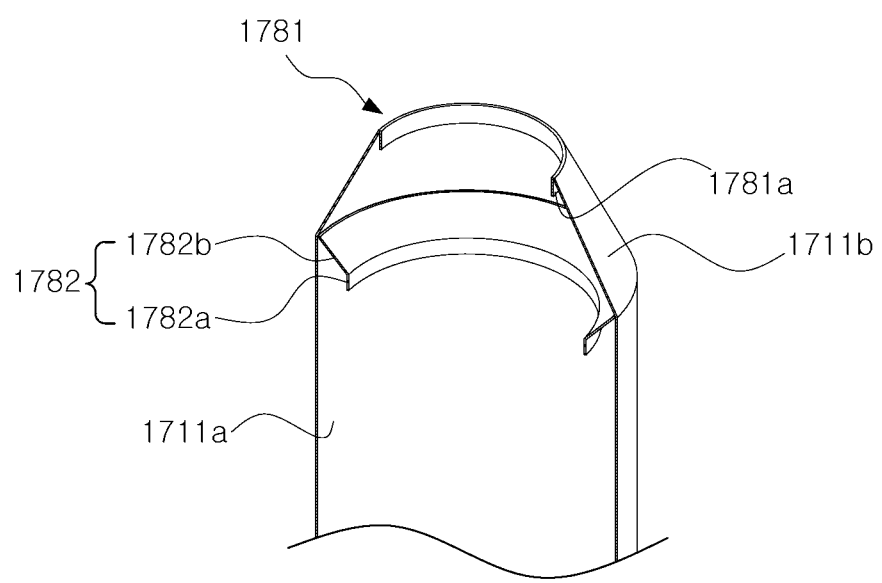
FIG. 55 is a partially cutaway perspective view illustrating a droplet blocker of the exhaust gas treatment apparatus according to a second embodiment.
Figure 56:
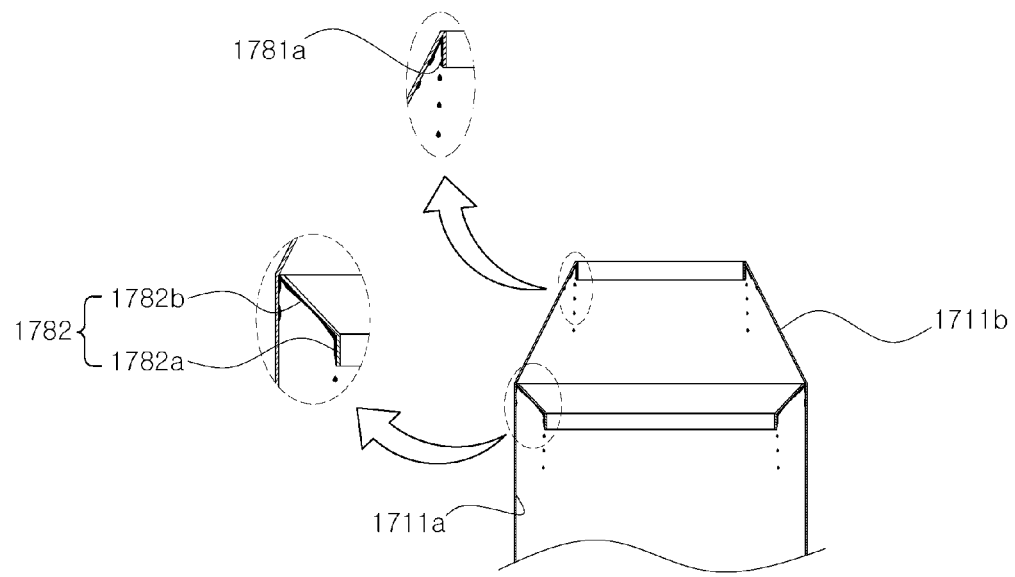
FIG. 56 is a cross-sectional view taken along the line f1-f1' in the section F in FIG. 27.

Referring to FIGS. 55 and 56, a droplet blocker 178 may include a first blocker 1781 and a second blocker 1782 located above the droplet separator 176 so as to block some of the droplets separated from the exhaust gas and rising along the inner wall 1711 of the housing 171 under the influence of the flow of the exhaust gas without falling down, thereby preventing the droplets containing harmful substances from being discharged into the air.

Since the cleaning liquid including seawater or fresh water sprayed from the sprayers 173 and 175 has a function of neutralizing sulfur oxides (SOx) and aggregating PM, the cleaning liquid droplets remaining in the upper portion of the exhaust gas treatment apparatus 1b contain a number of harmful substances in the exhaust gas. If the cleaning liquid droplets are discharged to the atmosphere together with the cleaned exhaust gas, the exhaust gas treatment apparatus 1b itself becomes meaningless. Thus, the discharge of droplets into the air must be prevented.

To this end, the horizontal blades 1762a of the droplet separator 176 induce spiral flow of the exhaust gas including the cleaning liquid droplets, thereby deflecting the relatively heavy liquid droplets toward the inner wall 1711 of the housing 171 using centrifugal force. Alternatively, the torsion blades 1762b of the droplet separator 176 bypass the exhaust gas downwards to induce spiral flow so that the droplets are directed downwards and toward the inner wall 1711 by centrifugal force. In addition, the droplets of the cleaning liquid deflected to the inner wall 1711 drop down due to gravity and are collected by the droplet collector 177 to then fall to the bottom of the housing 171, thereby preventing the discharge thereof to the atmosphere.

However, despite the droplet collector 177, some of the droplets of the cleaning liquid separated by the droplet separator 176 may be deflected to the inner wall 1711 of the housing 171, and may flow up along the inner wall 1711 of the housing 171 under the influence of the flow of the exhaust gas rising due to the pressure difference, instead of dropping. The droplets rising along the inner wall 1711 as described above may reach the top of the housing 171, and may be discharged into the air. Thus, it is necessary to prevent the discharge of harmful substances by blocking the same.

Referring to FIG. 55, to this end, the inner wall 1711 may include a vertical surface 1711*a* extending straight in the vertical direction and an inclined surface 1711*b* extending from the vertical surface 1711*a* so as to curve toward the center of the housing in the vicinity of the gas outlet 1713. The inclined surface 1711*b* may block the droplets rising along the vertical surface 1711*a* under the influence of the exhaust gas to some extent. However, since the exhaust gas changes its flow path to conform to the inclined surface 1711*b* when the exhaust gas collides with the inclined surface 1711*b*, the droplets affected by the exhaust gas may also rise along the inclined surface 1711*b* to be discharged into the air.

In order to prevent the above discharge, the first blocker 1781 may include a blocking wall 1781*a* extending down from one side of the inclined surface 1711*b*. The blocking wall 1781*a* is provided in the form of a thick strip along the boundary of the gas outlet 1713. In the case where the gas outlet 1713 is circular, the blocking wall 1781*a* has a hollow cylindrical shape. According to the above configuration, the droplets rising along the inner wall 1711 flows down along the blocking wall 1781*a* through the inclined surface 1711*b*, and since there is no surface along which the droplets can rise at the lower end of the blocking wall 1781*a*, the droplets drop down. Preferably, the blocking wall 1781*a* may extend in the direction in which gravity acts, thereby further improving the blocking effect. The flow of droplets described above can be seen in more detail in FIG. 56.

The second blocker 1782 may be positioned below the first blocker 1781, and may include a downwardly inclined surface 1782*b* and another blocking wall 1782*a*.

The downwardly inclined surface 1782*b* extends from one side of the vertical surface 1711*a* of the housing 171 toward the center thereof at a predetermined angle, and guides the droplets rising along the vertical surface 1711*a* to the blocking wall 1782*a*. In this case, it is preferable that the inclined surface be formed downwards at an angle of more than 90 degrees for effective guidance of the droplets.

The blocking wall 1782*a* extends downwards from the end of the downwardly inclined surface 1782*b*, and preferably extends in the direction in which gravity acts. The droplets moving down along the downwardly inclined surface 1782*b* meet the blocking wall 1782*a* and flow down in the vertical direction to then drop down at the end of the blocking wall 1782*a* due to gravity because there is no longer any surface along which the droplets may flow.

The two blockers 1781 and 1782 may prevent the droplets of the cleaning liquid containing harmful substances, such as sulfur oxide (SOx), PM, and the like, from being released into the air together with the clean gas.

Based on the above-described configuration, a process in which exhaust gas generated by combustion in an engine or a boiler is processed into clean gas by removing harmful substances, such as sulfur oxides (SOx), particulate matter (PM), and the like, while passing through the exhaust gas treatment apparatus 1*b* will be described with reference to FIGS. 27 and 28.

Referring to FIGS. 27 and 28, exhaust gas enters the housing 171 through the gas inlet 1712. The exhaust gas meets the diffuser 172 above the gas inlet pipe 1712*a* to then be dispersed, and PM in the exhaust gas is aggregated by the mixture of the cleaning liquid sprayed from the sprayer 173 and the compressed air. At this time, the exhaust gas forms a flow deflected toward the inner wall 1712 by the diffuser 172 and passes through the distributor 174 to be evenly distributed to the center. The exhaust gas evenly distributed throughout the cross section of the housing 171 causes neutralization of sulfur oxides (SOx) and aggregation of PM by the cleaning liquid sprayed from the multi-sprayer 175, and the spiral flow formed by the droplet separator 176 allows the droplets to move outwards to then be separated by centrifugal force. The separated droplets drop from the droplet collector 177, and the exhaust gas whirls in a spiral pattern and continues to rise.

However, some droplets that rise along the inner wall 1711 without falling due to the influence of the exhaust gas flow are blocked by the blocker 178 and thus drop down, thereby preventing the discharge of harmful substances into the air.

According to the above-described configuration and process, the exhaust gas is processed into clean gas by separating harmful substances, such as sulfur oxides (SOx), particulate matter (PM), and the like, and is released into the air.

Hereinafter, a method for removing noxious gas from the cleaning liquid discharged from the exhaust gas treatment apparatus of the present disclosure will be described.

Figure 57:
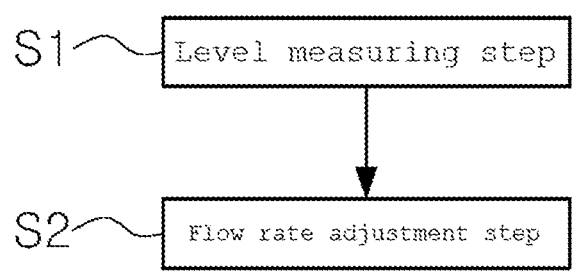
FIG. 57 is a flowchart illustrating a method for removing noxious gas from cleaning liquid discharged from an exhaust gas treatment apparatus according to an embodiment of the present disclosure.

FIG. 57 is a flowchart illustrating a method for removing noxious gas from cleaning liquid discharged from an exhaust gas treatment apparatus according to an embodiment of the present disclosure. Referring to FIG. 57, a method for removing noxious gas from the cleaning liquid discharged from the exhaust gas treatment apparatus includes a level measuring step S1 and a flow rate adjustment step S2.

In the level measuring step S1, the level measuring unit 4 measures the level of the cleaning liquid in the noxious gas removal unit 3 for removing noxious gas remaining in the gaseous state in the cleaning liquid discharged from the exhaust gas treatment apparatus 1, which receives the exhaust gas generated by combustion, removes the noxious gas from the exhaust gas by spraying cleaning liquid to the exhaust gas, and discharges the sprayed cleaning liquid, and discharging the cleaning liquid from which the gaseous noxious gas has been removed.

The configuration of the exhaust gas treatment apparatus 1 and the noxious gas removal unit 3, as well as the level measuring unit 4, has been described in connection with the system for removing noxious gas from the cleaning liquid discharged from the exhaust gas treatment apparatus of the present disclosure.

The level measuring step S1 may be performed in such a manner that the level measuring unit 4 measures the level of the cleaning liquid in the noxious gas removal unit 3 on the basis of the pressure in the noxious gas removal unit 3. In this case, the level measuring unit 4 may include a pressure sensor (i.e., a transducer) that detects a change in pressure according to a change in the level of the cleaning liquid inside the noxious gas removal unit 3, an amplifier for amplifying an electrical signal transmitted from the transducer, a connector for connecting the amplifier with the transducer, and the like. As described above, the level measuring unit 4 is not limited to the above pressure measurement method, and other methods, such as ultrasonic measurement, may be applied thereto.

In the flow rate adjustment step S2, the flow rate regulator 5 adjusts the discharge rate of the cleaning liquid in the noxious gas removal unit 3 on the basis of the result of measurement of the level measuring unit 4. The configuration of the flow rate regulator 5 has also been described in connection with the system for removing noxious gas from the cleaning liquid discharged from the exhaust gas treatment apparatus of the present disclosure.

The flow rate adjustment step S2 is preferably performed in such a manner that the flow rate regulator 5 adjusts the discharge rate of the cleaning liquid in real time such that the level of the cleaning liquid in the noxious gas removal unit 3 falls within a predetermined range. This is due to the fact that the level of the cleaning liquid remaining in the noxious gas removal unit 3 may be maintained at a level suitable for removal of the noxious gas in this manner.

To this end, the flow rate regulator 5 may include a controller connected to the level measuring unit 4 by circuits or by wired/wireless communication and regulation means for adjusting the discharge rate of the noxious gas removal unit 3 under the control of the controller, and a throttle valve may be applied as the regulation means.

Figure 58:
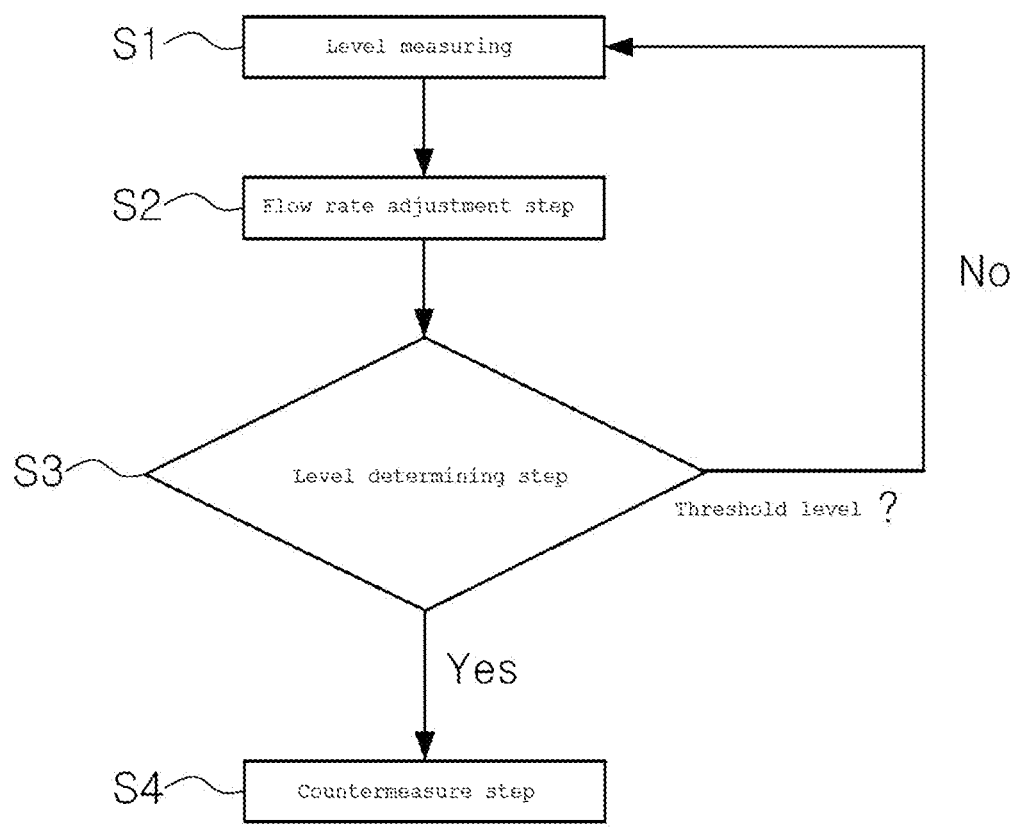
FIG. 58 is a flowchart illustrating a method for removing noxious gas from cleaning liquid discharged from an exhaust gas treatment apparatus according to another embodiment of the present disclosure.

FIG. 58 is a flowchart illustrating a method for removing noxious gas from cleaning liquid discharged from an exhaust gas treatment apparatus according to another embodiment of the present disclosure. Referring to FIG. 58, a method for removing noxious gas from cleaning liquid discharged from an exhaust gas treatment apparatus according to another embodiment of the present disclosure includes a level determining step S3 and a countermeasure step S4 in addition to the level measuring step S1 and the flow rate adjustment step S2.

The level determining step S3, in which the level determiner 6 determines whether or not the level of the cleaning liquid remaining in the exhaust gas treatment apparatus 1, which is to move to the noxious gas removal unit 3, reaches a predetermined threshold level, is performed after or at the same time as the flow rate adjustment step S2.

Since the discharge rate of the cleaning liquid of the noxious gas removal unit 3 is appropriately adjusted through the level measuring step S1 and the flow rate adjustment step S2, the level of the cleaning liquid in the exhaust gas treatment apparatus 1 may also be generally maintained at an appropriate level. However, if the cleaning liquid is not appropriately discharged through the noxious gas removal unit 3 due to malfunction of at least one of the noxious gas removal unit 3, the level measuring unit 4, and the flow rate regulator 5 in the level measuring step S1 and the flow rate adjustment step S2, and if the level of the cleaning liquid exceeds a threshold level in the exhaust gas treatment apparatus 1 according thereto, the durability or performance of the exhaust gas treatment apparatus 1 may be degraded. The level determining step S3 is intended to prevent this problem.

In the level determining step S3, the level determiner 6 serves to determine whether or not the level of the cleaning liquid remaining in the exhaust gas treatment apparatus 1, which is to move to the noxious gas removal unit 3, reaches a predetermined threshold level. The level determiner 6 may include a level switch that is provided at a position at which it is possible to measure the level of the cleaning liquid in the exhaust gas treatment apparatus 1, and if the level of the cleaning liquid exceeds a predetermined level, gives notification thereof.

In the countermeasure step S4, if the level of the cleaning liquid remaining in the exhaust gas treatment apparatus 1, which is to move to the noxious gas removal unit 3, reaches a predetermined threshold level as a result of a determination by the level determiner 6, the countermeasure unit 7 may perform at least one of generation of a danger warning and control so as to stop spraying of the cleaning liquid in the exhaust gas treatment apparatus 1.

The countermeasure step S4 may be performed in such a manner that the countermeasure unit 7 generates a danger warning through visible and audible means or stops the overall operation of the exhaust gas treatment apparatus 1 in order to interrupt the spray of cleaning liquid in the exhaust gas treatment apparatus 1. The countermeasure unit 7 may include a controller that is connected to the level determiner 6 through circuits or wired/wireless communication and generates a warning or controls the exhaust gas treatment apparatus or the like. Through the countermeasure step S4, it is possible to prevent deterioration of durability or failure of the exhaust gas treatment apparatus 1 due to the backflow of the cleaning liquid.

Although the applicant has described various embodiments of the present disclosure above, these embodiments are merely examples for implementing the technical concept of the present disclosure, and any changes or modifications thereof should be construed as falling within the scope of the present disclosure as long as the technical concept of the present disclosure is implemented.

What is claimed is:

1. A system for removing noxious gas from cleaning liquid discharged from an exhaust gas treatment apparatus, comprising:
    an exhaust gas treatment apparatus configured to receive exhaust gas generated by the combustion and flowing thereinto, remove noxious gas from the exhaust gas by spraying cleaning liquid to the exhaust gas, and discharge the sprayed cleaning liquid;
    a noxious gas removal unit connected to the exhaust gas treatment apparatus and configured to remove the noxious gas remaining in a gaseous state in the cleaning liquid discharged from the exhaust gas treatment apparatus and discharge the cleaning liquid from which the noxious gas in the gaseous state has been removed;
    a level measuring unit configured to measure a level of the cleaning liquid in the noxious gas removal unit; and
    a flow rate regulator configured to adjust a discharge rate of the cleaning liquid in the noxious gas removal unit on the basis of a result of measurement by the level measuring unit.

2. The system of claim 1, wherein the level measuring unit measures the level of the cleaning liquid in the noxious gas removal unit on the basis of pressure in the noxious gas removal unit.

3. The system of claim 1, wherein the flow rate regulator adjusts the discharge rate of the cleaning liquid such that the level of the cleaning liquid in the noxious gas removal unit falls within a predetermined range.

4. The system of claim 1, wherein the noxious gas removal unit comprises a conduit having one end leading to a cleaning liquid outlet of the exhaust gas treatment apparatus and an opposite end connected to the flow rate regulator.

5. The system of claim 1, further comprising a level determiner configured to determine whether or not the level of the cleaning liquid remaining in the exhaust gas treatment apparatus, which is to move to the noxious gas removal unit, reaches a predetermined threshold level.

6. The system of claim 5, further comprising a countermeasure unit configured to, if the level of the cleaning liquid remaining in the exhaust gas treatment apparatus, which is to move to the noxious gas removal unit, reaches a predetermined threshold level as a result of a determination by the level determiner, perform at least one of generation of a danger warning and control so as to stop spraying of the cleaning liquid in the exhaust gas treatment apparatus.

7. The system of claim 5, wherein the level determiner is disposed to lead to a cleaning liquid outlet of the exhaust gas treatment apparatus.

8. The system of claim 1, wherein the system for removing noxious gas from cleaning liquid discharged from an exhaust gas treatment apparatus is installed in a ship.

9. The system of claim 8, wherein the noxious gas is sulfur oxides (SOx), and the cleaning liquid is seawater or fresh water containing alkaline additives.

10. The system of claim 1, wherein the exhaust gas treatment apparatus comprises:
a preprocessor configured to primarily reduce harmful substances in the exhaust gas produced by combustion; and
a postprocessor configured to further remove harmful substances from preprocessed gas, which is the exhaust gas from which the harmful substances have been primarily reduced by the preprocessor, and connected to the noxious gas removal unit, and
wherein the preprocessor comprises:
a preprocessor housing having an exhaust gas inlet through which the exhaust gas is introduced and a preprocessed gas outlet through which the preprocessed gas, which is the exhaust gas from which the harmful substances have been primarily reduced by the preprocessor, is discharged and forming a flow path of the exhaust gas therein;
an agitator configured to cause the exhaust gas in the flow path to flow in a curved pattern;
a first preprocessor sprayer disposed between the exhaust gas inlet and the agitator and configured to spray cleaning liquid to the exhaust gas introduced through the exhaust gas inlet; and
a second preprocessor sprayer disposed between the agitator and the preprocessed gas outlet and configured to spray cleaning liquid to the exhaust gas that flows in a curved pattern through the agitator in the flow path.

11. The system of claim 10, wherein the postprocessor comprises:
a postprocessor housing having a preprocessed gas inlet through which the preprocessed gas is introduced and a postprocessed gas outlet through which postprocessed gas from which harmful substances have been removed by the postprocessor is discharged and forming a flow path of the preprocessed gas therein; and
a droplet blocker configured to block droplets that rise along an inner wall of the postprocessor housing and are discharged through the postprocessed gas outlet.

12. The system of claim 11, wherein the postprocessor further comprises:
a first postprocessor sprayer disposed in the flow path of the preprocessed gas below the drop blocker and configured to spray cleaning liquid to the preprocessed gas; and
a second postprocessor sprayer disposed in the flow path of the preprocessed gas below the drop blocker and configured to spray cleaning liquid to the preprocessed gas and operate independently from the first postprocessor sprayer.

13. The system of claim 12, wherein the postprocessor further comprises:
a packing disposed under the first postprocessor sprayer and the second postprocessor sprayer in the postprocessor housing; and
a packing support configured to support the packing at the bottom and having a function of diffusing the preprocessed gas under the packing.

14. The system of claim 13, wherein the postprocessor further comprises a diffuser disposed adjacent to the preprocessed gas inlet and configured to diffuse the preprocessed gas introduced through the preprocessed gas inlet.

15. The system of claim 1, wherein the exhaust gas treatment apparatus comprises a diffuser, and
wherein the diffuser comprises a gas diffuser having a shape that gets wider as it goes upwards so that the exhaust gas introduced through the gas inlet is widely dispersed in the housing to enable an efficient cleaning operation and to prevent pressure loss caused by the falling cleaning liquid and pressure loss by the diffuser itself.

16. The system of claim 15, wherein the exhaust gas treatment apparatus further comprises a cleaning liquid sprayer above the diffuser, and
wherein the sprayer comprises a lateral sprayer configured to spray cleaning liquid to the side, thereby improving work efficiency by increasing the contact area between the exhaust gas dispersed by the diffuser and the cleaning liquid and improving space utilization by reducing the height of the housing.

17. The system of claim 16, wherein the exhaust gas treatment apparatus further comprises a distributor above the sprayer, and
wherein the distributor is configured as a mesh structure including a plurality of small through-holes and has an inclined portion the diameter of which increases as it goes upwards and a large inlet opening formed in the lower portion of the inclined portion so as to evenly distribute the flow of the exhaust gas deflected to the inner wall, thereby improving treatment efficiency.

18. The system of claim 17, wherein the exhaust gas treatment apparatus comprises a multi-sprayer having a first sprayer, a second sprayer, and a third sprayer above the distributor, and
wherein the first sprayer, the second sprayer, and the third sprayer are alternately arranged in the vertical direction to increase the contact area with the exhaust gas and selectively operate according to a load of an engine or a boiler, thereby enabling efficient operation.

19. The system of claim 18, wherein the exhaust gas treatment apparatus comprises a droplet separator above the multi-sprayer,
wherein the droplet separator comprises a guide part through which exhaust gas enters at the center thereof and one or more blades formed at an upper portion of the guide part so as to induce a spiral flow of the exhaust gas exiting from the guide part.

20. The system of claim 19, wherein the exhaust gas treatment apparatus comprises a droplet collector configured to collect the droplets separated by the droplet separator to prevent harmful substances from being discharged into the air.

21. The system of claim 20, wherein the exhaust gas treatment apparatus comprises a droplet blocker configured to block droplets rising along the inclined surface of the housing above the droplet separator, and
wherein the droplet blocker comprises a blocking wall extending downwards from one side of the inclined surface to effectively block droplets rising along the inner wall.

22. A method for removing noxious gas from cleaning liquid discharged from an exhaust gas treatment apparatus, the method comprising:
a level measuring step in which a level measuring unit measures a level of cleaning liquid in a noxious gas removal unit for removing noxious gas remaining in a gaseous state in cleaning liquid discharged from an exhaust gas treatment apparatus, which receives exhaust gas generated by combustion, removes the noxious gas from the exhaust gas by spraying the cleaning liquid to the exhaust gas, and discharges the sprayed cleaning liquid, and discharging the cleaning liquid from which the gaseous noxious gas has been removed; and a flow rate adjustment step in which a flow rate regulator adjusts a discharge rate of the cleaning liquid in the noxious gas removal unit on the basis of a result of measurement of the level measuring unit.

23. The method of claim 21, wherein the flow rate adjustment step is performed in such a manner that the flow rate regulator adjusts the discharge rate of the cleaning liquid in real time such that the level of the cleaning liquid in the noxious gas removal unit falls within a predetermined range.

24. The method of claim 22, further comprising a level determining step in which the level determiner determines whether or not the level of the cleaning liquid remaining in the exhaust gas treatment apparatus, which is to move to the noxious gas removal unit, reaches a predetermined threshold level after or at the same time as the flow rate adjustment step.

25. The method of claim 24, further comprising a countermeasure step in which, if the level of the cleaning liquid remaining in the exhaust gas treatment apparatus, which is to move to the noxious gas removal unit, reaches a predetermined threshold level as a result of a determination by the level determiner, a countermeasure unit performs at least one of generation of a danger warning and control so as to stop spraying of the cleaning liquid in the exhaust gas treatment apparatus.

* * * * *